United States Patent [19]

Spademan et al.

[11] 3,764,986

[45] Oct. 9, 1973

[54] MAGNETIC TAPE DATA PROCESSING SYSTEM

[75] Inventors: Charles F. Spademan, North Worthington; Joseph P. Marsalka, Columbus, both of Ohio

[73] Assignee: $MI_2$, Columbus, Ohio

[22] Filed: Aug. 9, 1972

[21] Appl. No.: 279,070

Related U.S. Application Data

[63] Continuation-in-part of Ser. No. 203,245, Nov. 30, 1971, and a continuation-in-part of Ser. No. 123,187, March 11, 1971.

[52] U.S. Cl. ........................................... 340/172.5
[51] Int. Cl. ........................................... G11b 27/02
[58] Field of Search .................................. 340/172.5

[56] References Cited

UNITED STATES PATENTS

| | | | |
|---|---|---|---|
| 3,618,032 | 11/1971 | Goldsberry et al. | 340/172.5 |
| 3,610,902 | 10/1971 | Rahenkamp et al. | 340/172.5 |
| 3,569,940 | 3/1971 | McFadden et al. | 340/172.5 |
| 3,346,853 | 10/1967 | Koster et al. | 340/172.5 |

*Primary Examiner*—Gareth D. Shaw
*Attorney*—Robert E. Leblanc et al.

[57] ABSTRACT

There is disclosed a data handling system for use as a terminal or word processor including input-output means, intermediate memory and a magnetic tape cassette principal memory. Incoming data is accumulated alternately in one of the intermediate memories until its capacity is reached, then the data block is transferred to the principal memory at a high speed. An inverse sequence is followed for playback.

For data editing, a special editing memory and associated control logic are provided. Blocks of data are transferred from the principal memory to one of the intermediate memories. The data is entered in the editing memory either continuously or on a character-by-character basis controlled by the user. Data may be added or deleted as desired, after which, individual data blocks are returned to the principal memory. (Space in the latter is automatically allowed when data is recorded to accommodate added characters.)

During editing, line length adjustment is provided by converting "spaces" near the end of an edited line into "carrier returns". Carrier returns far from the end of an edited line become "spaces".

Search capability based on selectable identifying characters, both in forward and reverse directions of tape travel is also available. Searches may be part of the editing operation or simply in preparation for editing or a normal playback.

38 Claims, 24 Drawing Figures

| I/O LOGIC UNIT 202 | |
|---|---|
| SIGNAL INPUT | SOURCE |
| CHAR. PRES. | 306 |
| #2, #3, #5, #6 | 306 |
| DELETE, RECORD, TAPE STORE, PLAY EOM STROBE | 302 |
| SKIP PRINTOUT, ROM ENTER | 301 |
| I/O CLAMP | 222 |
| UT. DEV. READY ENTER DATA | EXT |

| SH REGISTER 204, 206 | |
|---|---|
| SIGNAL INPUT | SOURCE |
| EOM STROBE, REF STORE | 302 |
| ROM ENTER | 301 |
| ENT. DATA | EXT |

| INT. MEM. CONTROL UNIT 222 | |
|---|---|
| SIGNAL INPUT | SOURCE |
| SEARCH, SEARCH RECORD, RECORD, PLAYBACK FF, REV. | 302 |
| TAPE RUN, TAPE RUN TAPE START DELAY LOAD, LOAD | 304 |
| EDIT, EDIT MODE 1, EDIT MODE 2, EDIT MODE 3, SCI | 301 |
| RECORD CLK, MR DATA STROBE INH A, INH B | 306 |
| #2 | 306 |

FIG 2B

| EDIT CONTR LOGIC 301 | |
|---|---|
| SIGNAL INPUT | SOURCE |
| PLAY FF, TAPE STORE ON LINE, SEARCH PARALLEL, SEARCH KEY PLAY, PLAY | 302 |
| #6, #7, #8, #9 M.R., DATA STROBE CHAR. PRES | 306 |
| 9600 Hz | 312 |
| SER. START ENT. DATA | EXT |
| I/O ADV. | 206 |
| A-1280, A ADV | 222 |

| TAPE CONTROL UNIT 304 | |
|---|---|
| SIGNAL INPUT | SOURCE |
| A-0, B-0, A TAPE ASSO B TAPE ASSO, STOP TAPE START TAPE | 222 |
| MR | 306 |
| EDIT, EDIT REVERSE MODE 1, MODE 2 MODE 3, SC1 | 301 |
| RECORD, TAPE STORE LOCAL, SEARCH REVERSE, REV. TAPE EDIT REVERSE | 302 |

| MODE SEL. UNIT 302 | |
|---|---|
| SIGNAL INPUT | SOURCE |
| AUG. REV., START SKIP, END SKIP, EDIT MODE 2, MODE 2, EOP MODE 4, SKIP/FWD | 301 |
| #7, DATA STROBE, MR | 306 |
| SEARCH COINC | 218 |
| EOM STOP | 222 |

| SEQ CONTROL UNIT 306 | |
|---|---|
| SIGNAL INPUT | SOURCE |
| START EOM XFER | 222 |
| EOM-1280, A TAPE ASSO B TAPE ASSO | 222 |
| START P/O CYCLE | 202 |
| NAND 13140, EDIT SET MODE 2, SKIP/FWD | 301 |
| RECORD, EOM ENTER DELETE, PARALLEL RECORD, SEARCH TAPE STORE, SEARCH KEY | 302 |
| LOAD | 304 |
| SER. START, ENT. DATA | EXT |

FIG 3B

| | |
|---|---|
| S = 0<br>R = I | "I" IS HIGH<br>"0" IS LOW |
| R = 0<br>S = I | "I" IS LOW<br>"0" IS HIGH |
| S = 0<br>R = 0 | "I" IS HIGH<br>"0" IS HIGH |

| R | J | K | $Q_n$ | $Q_{n-1}$ |
|---|---|---|---|---|
| 0 | – | – | 0 | – |
| I | 0 | 0 | 0 | 0 |
| I | 0 | 0 | I | I |
| I | I | 0 | I | 0 |
| I | I | 0 | I | I |
| I | 0 | I | 0 | 0 |
| I | 0 | I | 0 | I |
| I | I | I | I | 0 |
| I | I | I | 0 | I |

MAGNETIC TAPE DATA PROCESSING SYSTEM

INTRODUCTION AND BACKGROUND

The present application is a continuation-in-part of copending application Ser. No. 203,245 filed Nov. 30, 1971 entitled Magnetic Tape Data Handling System Employing Dual Data Block Buffers, which application is, in turn, a continuation-in-part of copending application Ser. No. 123,187, filed Mar. 11, 1971 entitled Magnetic Tape Data System. This application itself is a continuation-in-part of said application Ser. No. 123,187. The disclosures of said applications, Ser. No. 123,187 and Ser. No. 203,245, are fully incorporated by reference herein.

Our aforementioned parent applications are directed to so-called "terminal equipment" used for data transmission, for obtaining access to, and for controlling a computer. This invention relates to such terminals which provide capability for editing, correcting, updating, augumenting, or otherwise changing previously stored data, which is relatively inexpensive, reliable and durable, and sufficiently versatile, to be compatible with commonly used information transmission and processing formats, and data transmission rates.

Editing is best accomplished locally and "off-line" since it is a fairly slow "real time" operation. The capabilities of the equipment here disclosed are particularly adapted to complement our aforementioned terminal systems, but the principles of the invention are readily adapted to comparable terminal systems of other kinds.

With systems of the type in question, a letter or other message is prepared in draft and stored in a suitable memory medium. For editing, the original draft is retrieved, and the necessary corrections are inserted. No new draft is made, but the corrections are entered in the memory for subsequent retrieval to prepare the final draft (or for further revision).

Operational features required for highly flexible editing include automatic playback for rapid advance through the message individual character-by-character playback to reach a particular character for correction, multiple character insertion, and deletion. The latter should include deletion of an individual character, or character group such as words, sentences, lines etc. Additionally since the editing operation is likely to change line lengths, capability should exist for adjusting lines by converting "spaces" to "carrier returns" and vice versa to assure lines in the edited text of the proper length.

Also desirable is a search operation by which a message characterized by a selectable multiple character identifier code may be located in the data memory. For editing, this would be a high speed playback of controlled length.

So far as applicants are aware, all heretofore proposed and available systems providing full scale editing and data formatting functions employ two separate memory systems, one containing the original raw or draft data, and the other receiving the edited data so that the end of the editing operation, the entire revised message is contained in the second memory. Such an arrangement, while workable, possesses several important practical disadvantages.

For example, if a punched paper tape is used as a memory medium, then each revision requires a new, and non-reusable tape. Where a magnetic tape is used as a memory medium, the latter disadvantage is avoided, but offsetting this are the duplication of mechanical equipment for the tape transport, and inherent technical and economic factors making the tape transport itself one of the weakest links in the entire system. Moreover, irrespective of the type of memory medium, use of a second tape is an inconvenience and a complication for the operator both during training, and thereafter during routine use.

In accordance with the present invention, we have discovered that by appropriate utilization of solid state memory equipment, and proper data formatting, the multiple tape memory arrangement of prior systems can be dispensed with, and with the need for duplicate data handling equipment including tape transport, playback and record circuitry, etc. Indeed, by judicious choice of components, and system organization in accordance with this invention, it has been found possible to provide the data editing and formatting capabilities of the most expensive currently available systems at a substantially reduced cost and without the need for the inconvenience and complexity of the multiple memories previously employed.

All of the desirable data processing features mentioned above, including individual character, word, and line deletion, character substitution, and augumentation, character-by-character playback and controlled continuous playback, and even line length adjustment are inexpensively provided. The system also provides for counting the number of typed lines while the original draft is being prepared to permit control of the length of a typed page. Also provided is facility for inserting a gap in the principal memory for storage of data added during an editing operation.

All of the foregoing functions are accomplished in accordance with this invention by the utilization of a data accumulator or editing memory having a capacity for storing a large number of characters, for example, about 1,000. For the editing operation, data is transferred from the principal memory to the editing memory in data blocks of some convenient size. This is preferably accomplished by use of an intermediate memory unit as described in our above-mentioned parent applications. Data is transferred from the intermediate memory under operator control and is halted whenever a correction or addition is to be made. Line length adjustment proceeds automatically. After editing, the data block is returned to the tape through the intermediate memory and stored in the same place on the tape from which it was removed.

If the editing operation results in deletion of part of a data block, then storage is not effected until there is accumulated in the editing memory *enough* data to form a complete data block. If the editing operation results in augumenting the data block, then only that part of the accumulated data forming one data block is returned to the tape. The remainder is retained in the accumulator, and becomes part of the next data block to be returned to the tape. the aforementioned process continues with excess data accumulating in the editing memory until the editing process for an entire message is completed, after which any remaining data is stored in the expansion space provided on the tape for this purpose. The editing operation is controlled by circuitry described below, in conjunction with a read only memory (ROM) in which reference characters such as carriage return, spaces, etc. are stored. The various functions of the terminal equipment described in our parent application are retained, and in addition the capability is provided for backward, as well as forward search.

OBJECTS OF THE INVENTION

Accordingly, it is among the objects of this invention:

to provide an improved magnetic tape data storage and processing system or use as a data terminal and local message preparation and editing center;

to provide a keyboard controlled magnetic tape data processing machine which is simpler and less expensive than currently available devices, yet reliable and capable of providing a wide range of data editing and augmenting functions;

to provide a magnetic tape data processing system having data editing capabilities in which information is transferred to and from the principal tape memory for editing in large data blocks, and processes in an accumulator or temporary editing memory, and is thereafter returned to the principal memory;

to provide a data editing system in which data is transferred from the tape memory to an editing memory through an intermediate memory unit;

to provide such a system in which data is played into the editing memory from the intermediate memory unit under control of the operator, on a character-by-character basis, or continuously, until halted, either manually upon recognition of a preselected character combination;

to provide a data editing system in which data correction in the editing memory is effected by adding one or more characters by means of an external keyboard device, either serially or in parallel;

to provide a data editing system including a read only memory for storing a number of reference characters used during various data deletion operations to permit identification of the reference characters as part of the data to be deleted;

to provide a data editing system permitting line adjustment to accommodate increase or decreases in number of characters in message;

to provide such line adjustment by converting spaces near the desired end of an edited line to carrier returns, and converting carrier returns remote from the desired end of a line into spaces;

to provide such line adjustment in which carrier returns at the end of a paragraph are not converted to spaces even if they appear remote from the desired line end; and to provide a data editing system capable of search of the principal memory for a desired character combination in either direction on the tape, and in the forward direction as part of the editing operation.

The exact nature of this invention, together with other general and specific objects and advantages thereof, will be apparent from consideration of the following detailed description and the accompanying drawings.

BRIEF DESCRIPTION OF DRAWINGS

FIGS. 2B and 3B show in chart form the control signal input to and from the circuit blocks;

Figure 1:
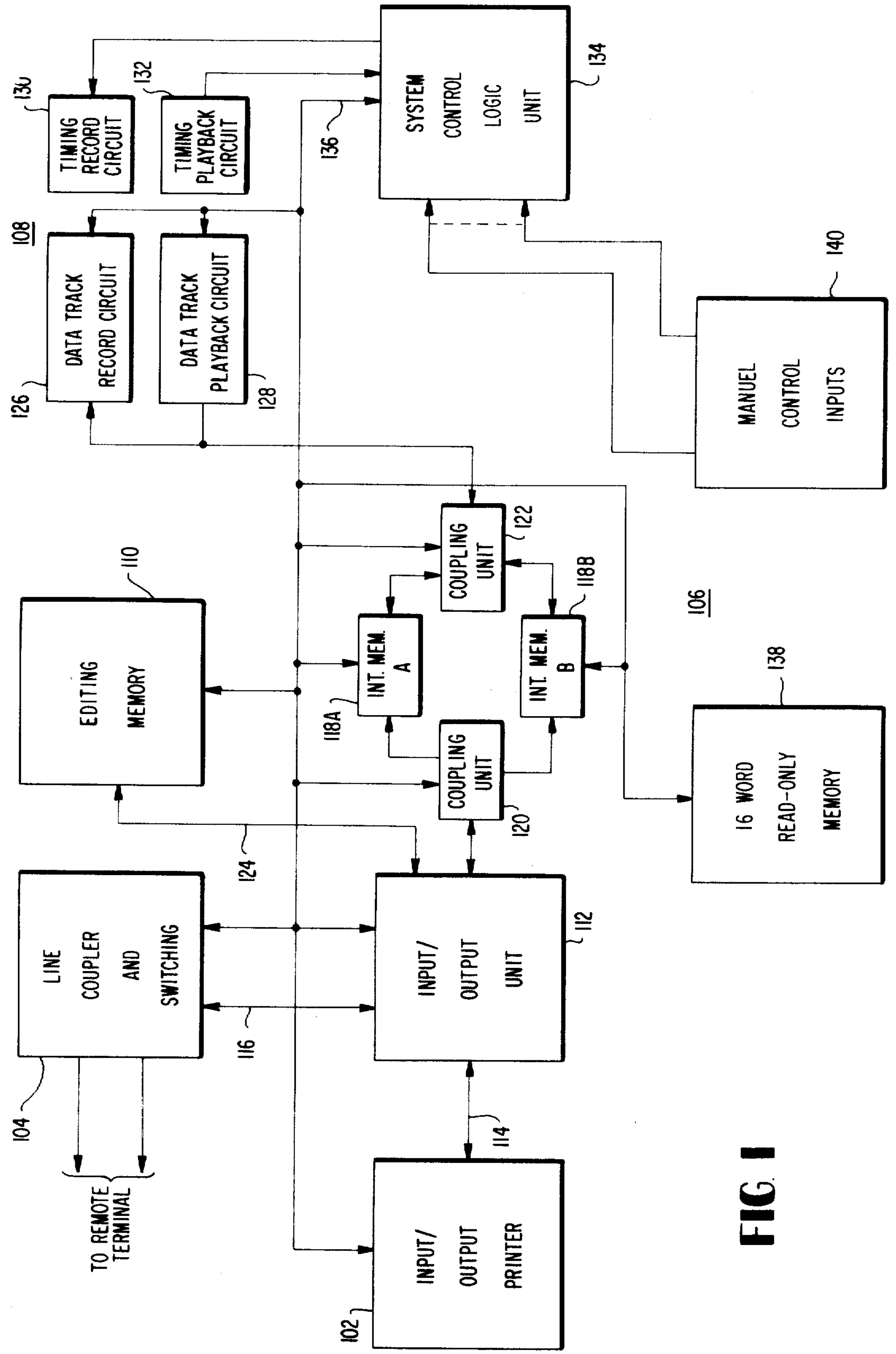
FIG. 1 is an overall block diagram of an editing subsystem according to the invention in a data terminal as disclosed in our parent application Ser. No. 203,245.

For convenient reference and correlation between the detailed description and the drawings, a reference numerical scheme has been adopted wherein the first digit or digits represent the FIGURE number on which the reference numeral first appears. Thus, an item bearing the reference numeral 604 first appears on and is described in connection with FIG. 6, and items bearing the reference numerals 1208 and 1294 first appear on and are described in connection with FIG. 12.

OVERALL SYSTEM ORGANIZATION (FIG. 1)

The data editing subsystem is incorporated in a data terminal as described in our parent applications, but description of the overall system will be omitted, where possible. The reader is referred to our parent applications for such information if it is desired. Briefly, however, with reference to FIG. 1, a terminal or data handling system of the type with which this inventin is to be used includes an input/output printer 102, a communication line coupler or modem 104 to interface with a communication channel, such as a telephone or telegraph line, a temporary data storage and processing unit 106, a principal memory unit 108 preferably including a magnetic tape cassette drive, and an associated magnetic tape cassette as the memory medium, and an editing memory 110.

Printer 102 may be a serial machine such as a "teletype". Since the terminal is directly compatible with such a machine, a customer already possessing or preferring a teletype may readily convert the same into a tape storage terminal with all the attendant benefits of this invention.

Where letter writing or other typing functions are a principal intended use, a more versatile printer, such as that described and claimed in assignee's copending U. S. Patent applications Ser. No. 79,202 filed Oct. 8, 1970 entitled Input-Output Typewriter Apparatus; Ser. No. 98,627, filed Dec. 16, 1970, entitled Solenoid Drive Circuit; and Ser. No. 101,502, filed Dec. 1970, entitled Improved Solenoid Drive Circuit is preferred. The latter is a parallel machine, and the equipment described is directly compatible with these, as well as with the serial machines.

Data storage and processing unit 106 is comprised of an input-output (I/O) uit 112 including an input/output buffer and required control logic, connected to printer 102 by cable 114, and to coupler 104 by cable 116. Data storage and processing unit 106 also includes a pair of intermediate memory units 118A and B, connected respectively to input/out unit 112 by coupling unit 120 and to tape memory unit 108 by coupling unit 122. Each intermediate memory unit is preferably constructed of one or more random access memory units (RAM's) providing a data capacity of at least 1,280 bits per unit. While two RAM's are preferred, a single one may be provided, as in our parent application Ser. No. 123,187.

Editing memory 110 is also preferably comprised of RAM units, and advantageously should provide substantially greater storage capacity than expected for the majority of anticipated editing operations. A capacity of about 1,000 characters is preferred, but more may be provided where desired, if the resulting cost increase is acceptable. The editing memory is associated with one of the intermediate memories such as 118A if two are used, but data transfer is provided through coupling unit 120, and I/O unit 112 as indicated by signal path 124, and as described in detail below.

The principal memory includes the actual tape transport (not shown) and record and playback circuits. Preferably separate tape tracks are provided, one for data and one for timing control pulses. Separate record circuits 126 and 130, and playback circuits 127 nd 132, couple the data and timing control pulses respectively to and from the tape.

A main control logic unit 134 is coupled to the system components mentioned above by signalling path 136 while a set of manual control inputs collectively denoted 140 provide external comman input capability. External controls for the various system operations are mounted on an auxiliary keyboard or control panel (not illustrated) on printer 102 or otherwise within convenient reach of the operator The tape unit may be part of a console containing the system electronics.

DETAILED FUNCTIONAL DESCRIPTION

Figure 2A:
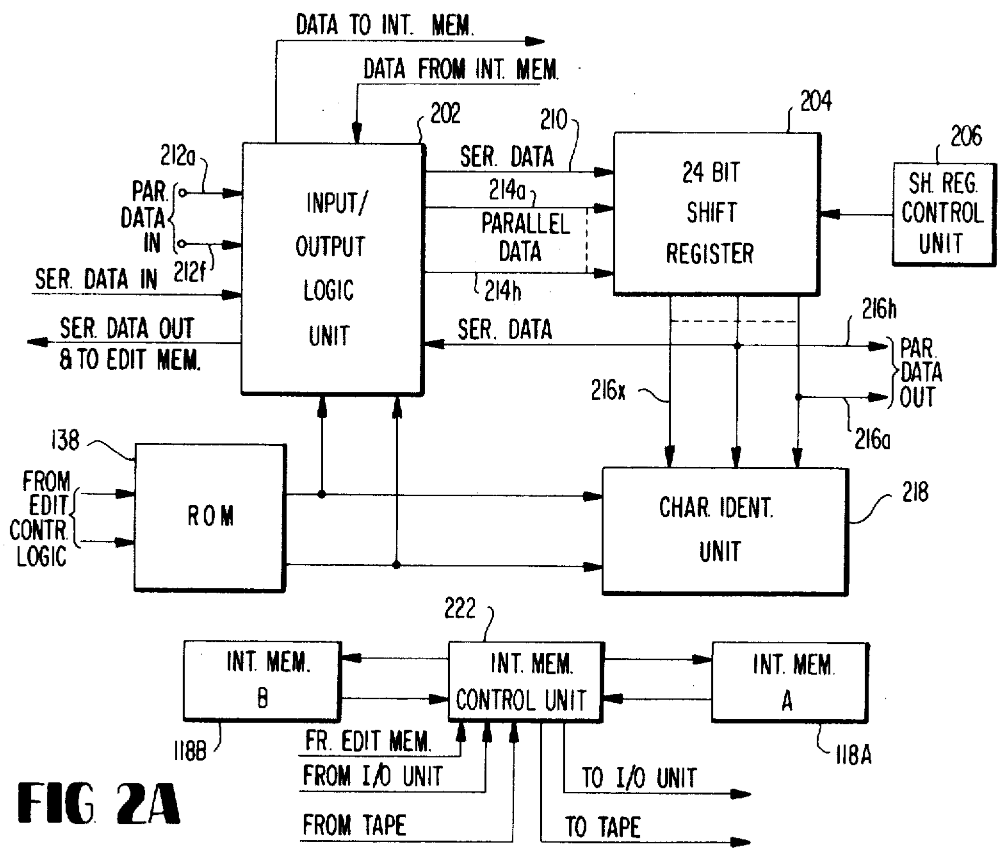
FIGS. 2A and 3A show the actual circuitry in block form with signal flow paths for data included.
Figure 3A:
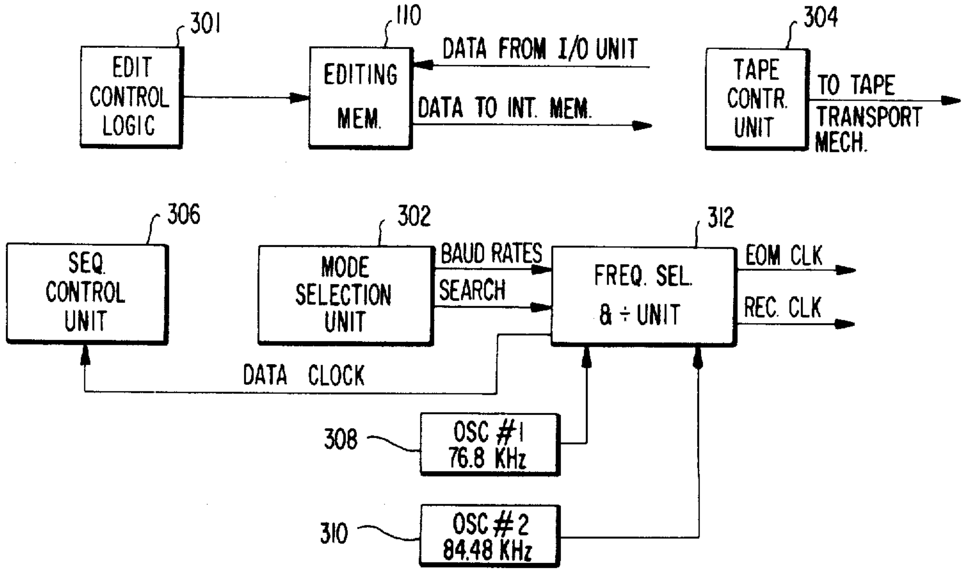
Figure 4A:
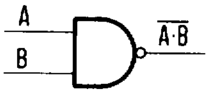
FIGS. 4A – 4G show the operating characteristics of certain circuit elements employed in the system.
Figure 4B:
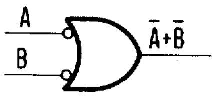
Figure 4C:
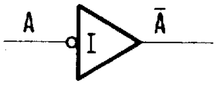
Figure 4D:
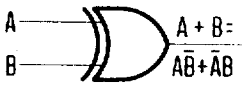
Figure 4E:
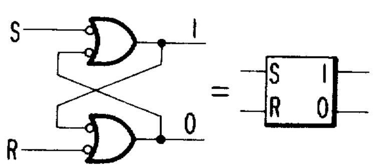
Figure 4F:
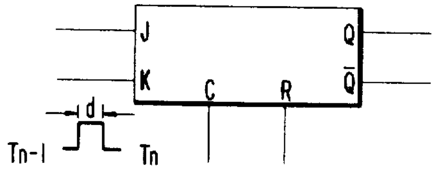
Figure 4G:
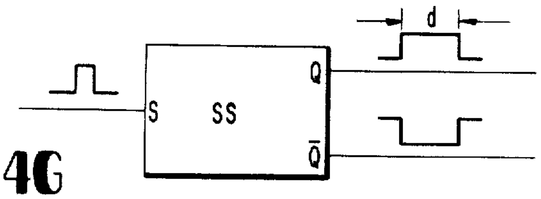

FIGS. 2A and 3A show the actual circuity in block form with signal flow paths for data included. FIGS. 2B and 3B show in chart form the control signal input to and from the circuit blocks.

Referring to FIGS. 2A and 3A, there are shown an input/output unit 202, a three character (24bits) shift register 204, and a shift register control unit 206, a character identification unit 218, an intermediate memory control unit 222, an operating mode selection unit 302, a tape control unit 304, a master sequence control unit or programmer 306, a pair of master oscillators 308 and 310, an associated frequency selection and division unit 312, and an editing control unit 301. Also illustrated in FIG. 2A are intermediate memory units 118A and 118B, and read only memory unit (ROM) 138. FIG. 3A also illustrates the editing memory 110.

Broadly stated, input/output logic unit 202 receives incoming serial data over a lead 208, and provides the same over a lead 210 to the serial input of shift register 204. Parallel input data is received from a local source over leads 212*a* through 212*f*, and after suitable input processing, is provided over leads 214 to the parallel inputs of the shift register. Parallel inputs to the shift register are also provided by ROM 138, as explained below for carrier return/space conversion and "EOM" code insertion.

Parallel outputs are provided by the shift register over 24 leads 216*a*–216*x*. These are provided to the character identification unit 218 described below for use during search and edit operations. Also, the first eight bits on leads 216*a–h*, are provided to input/output unit 202 for utilization during local playback operation. The eighth bit alone, representing a serial output of the shift register in provided to the input/output unit on the lead 216*h* from which it is transferred serially to an intermediate memory control unit 222 over lead 224 for temporary storage in one of intermediate memory units or to appropriate serial utilization equipment over lead 226 during playback. Lead 226 also provides the data input to editing memory 110 for the edit operation.

For data output or "playback" operation, data is coupled serially from intermediate memory units 118A or B to input/output unit 202 over a lead 228 and then the shift register input over lead 210. The shift register data output is provided in parallel over leads 216 as previously noted, and then to printer 102, over a set of parallel leads 230.

As noted above, each of intermediate memory units 118A and B provides temporary storage for 1280 data bits before transfer to the tape memory in the "record" modes, or to other portions of the system in the playback, "search", or "edit" modes. For all operations except editing, data is stored alternately in each unit; while one unit receives data, the other emits data previously stored. For editing, only memory unit 118A is employed. Memory unit operation, including selection of the memory unit to receive data, is controlled by memory control unit 222.

Referring to FIGS. 1 and 2A, data transferred to the tape memory is provided to data record circuit 126, while data from the tape is provided by data playback circuit 128 over lead 242. Correspondingly, timing control signals are provided to record circuit 130 over lead 244, and control signals from the tape are provided by playback circuit 132 over lead 246.

Mode selection unit 302 provides selective actuating signals for the system as required to establish and maintain operation in the record, playback, and search modes. Tape control unit 304 includes the forward and reverse tape drive mechanism and other portions of the system required to transfer information to and from the data and timing tracks on the tape. Sequence control unit 306, master clocks 308 and 310, and frequency selection and division unit 312 provide the sequence of control signals to effect transfer of information between the memory units, and into and out of the system, and to initiate the required data processing operations, as hereinafter described in detail.

Edit control unit 301, ROM 138 and editing memory 110 control the editing functions and the length of a typed page as described in detail hereinafter. For this purpose, ROM 138 stores the reference characters (space, period, etc.) used in the edit operation, and the end of message (EOM) character. These are used for character identification during the skip functions, and for carrier return/space interchange during line length adjustment. ROM 138 also provides the EOM code word for tape storage when needed.

Control signals for the above described operations are coupled between the various circuit units in the manner indicated in FIGS. 2B and 38. The exact nature of the signals involved will be more meaningful after consideration of the detailed construction of the system subunits, and description is deferred for this reason.

Logic Elements

Operation is described in terms of various conventional logic elements as illustrated in FIGS. 4(*a*) through (*g*).

FIG. 4(*a*) shows a two-input NAND gate. The output is low if and only if both inputs are high. Conversely, the output is high if either input is low. As is well known, utilization of both the conjunctive (low) and the disjunctive (high) aspects of the NAND function allows implementation of any combinational logic function. This approach is followed here.

To distinguish the two functions, the logic device of FIG. 4(*a*) is used to represent the conjunctive and is referred to as a NAND gate. FIG. 4(*b*) shows a conventional NAND gate providing the disjunctive function, for which the output is high if either or both inputs are low. This is actually an OR logic function with inverted inputs and will be so referred to. For convenience, the designation OR* will be used. FIGS. 4(*c*) and 4(*d*) respectively show conventional inverter, and EXCLUSIVE OR circuits, while FIGS. 4(*e*) and 4(*f*) show two types of bi-stable multi-vibrators or flip-flops. FIG. 4(*e*) shows a set-reset flip-flop comprised of a pair of cross coupled OR* gates having a set input designated S, a reset input designated R and a pair of complementary outputs designated ONE and ZERO. A single block representation of the same unit is also shown, along with a truth table containing the inputs and outputs for the meaningful operating states.

FIG. 4(*f*) shows a J-K flip-flop having a pair of signal inputs designated J and K, clock input designated C, reset input designated R, and two complementary outputs Q and $\bar{Q}$. A truth table indicating the relationship between the previous output states designated Q*n*-1, the output state Q*n* after time *tn* (the time the clock input returns low) and the J and K inputs is also shown in FIG. 4(*f*).

FIG. 4(*g*) shows a mono-stable or single shot multivibrator. A high level at the set or S input produces a high signal at the Q output, and a low signal at the $\bar{Q}$ output for a delay period d, determined by the choice of the circuit parameters. At the end of the delay period, the circuit returns to its rest state with a low signal at the Q output and a high signal at the $\bar{Q}$ output. If the circuit is retriggered by input transition during the delay period, it remains set until input transitions fail to occur for a time exceeding the delay time. Then, the outputs return to their respective rest conditions.

Additional logic units, such as conventional counters, decoders, shift register units, and the read only and random access memories will be described and/or identified as appropriate throughout the following description.

Figure 5:
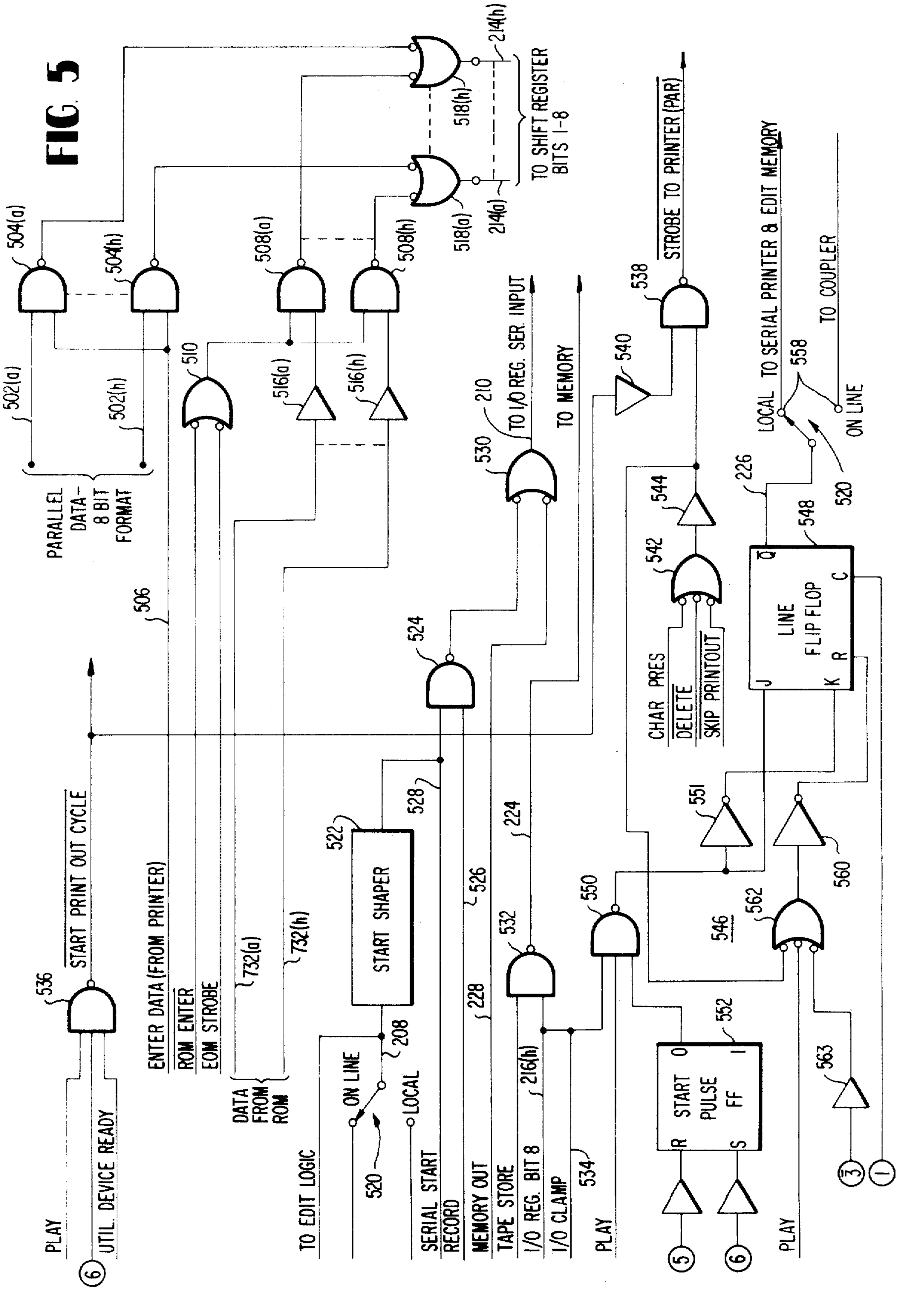
FIG. 5 is a detailed circuit diagram of the system input-output logic.

Input/Output Unit. (FIG. 5)

Considering now the details of the invention, inputs from a parallel data source are provided in an eight-bit format, including six character code bits, a parity bit and an eighth bit for compatibility with other code formats having seven information bits, plus a parity bit. These are provided over leads 502(*a*) through 502(*h*) to eight NAND gates 504(*a*)–504(*h*), controlled by an ENTER DATA signal from the data source.

A second set of eight parallel signals is coupled over leads 732(*a*)–(*h*) to eight NAND gates, 508(*a*)–508(*h*) from ROM 138. Control for NAND gates 508 is provided by an OR* gate 510, which, in turn, receives as inputs, the EOM STROBE and ROM ENTER signals from mode selection unit 302, and edit control unit 301, respectively. Data is stored in the read only memory in a negative true logic format and is converted to a positive logic format by inverters 516(*a*)–(*h*).

NAND gates 504(*a*)–(*h*) and 508(*a*)–(*h*) are coupled to eight OR* gates 518(*a*)–518(*h*), the outputs of which are coupled over leads 214(*a*)–214(*h*) as the parallel inputs for bit positions 1 through 8 of shift register 204 [See FIG. 2.]

Serial inputs are provided remotely through a suitable coupler, or locally by a serial input unit such as a teletypewriter. The serial input data is coupled through a pair of fixed contacts of ON LINE-LOCAL selection switch 520 and a suitable input signal shaping circuit 522 to a NAND gate 524, controlled by a RECORD signal over lead 526, from mode selection unit 302.

The output of signal shaper 522 also provides the SERIAL START signal on lead 528, which actuates sequence control unit 306 to transfer the incoming serial information through shift register 204 and into one of memory units 118A or B for storage. NAND gate 524 is coupled to an OR* gate 530, the output of which is connected over lead 210 as the serial input to shift register 204. [See FIG. 2.] The other input to OR* gate 530 is provided by the output of one of the memory units over lead 228.

Input/output logic unit 202 also provides for selective gating of information from the shift register to one of memory units 118A or B when the system is operating in the RECORD mode. This is accomplished by a NAND gate 532 which receives as inputs, the TAPE STORE signal from mode selection unit 302 and the output of the eighth bit position of shift register 202 over lead 216*h*. Lead 216*h* is also OR-tied to a lead 534 which provides the $\overline{\text{I/O CLAMP}}$ signal from edit control unit 301. This signal is high (and thus without effect) except during a special memory formatting sequence which simplifies certain operations following entry of an EOM character during a record sequence. [This is described more fully in connection with FIGS. 10 and 11 below.] The low level on lead 534 inhibits NAND gate 532 and maintains its output on lead 224 high — irrespective of the data output of the I/O register on lead 216h. The NAND gate output on lead 224 (see FIG. 2) provides the signal input to memory unit 118A or B.

Data outputs are provided either to a parallel printer, or serially to a teletype printer or to a suitable data coupler. For a parallel printout, the shift register data at the 1st eight bit positions, processed as described in our parent applications, is provided to the printer data input terminals Thereafter, the shift register is actuated, and a new code word is shifted serially from one of the intermediate memory units through OR* gate 530, and the parallel printout is repeated. Serial output data is provided through an output circuit 546, described below. A printout sequence is initiated by a $\overline{\text{START PRINTOUT CYCLE}}$ signal, generated by a NAND gate 536. This receives as its inputs, the PLAY signal from mode selection unit 302, and an output, denoted No. 6, from sequence control unit 306, indicating previous serial shift cycle to be completed. An addition input, denoted UTILIZATION DEVICE READY, indicating that the data receiving unit is ready to accept further data, is provided by the output printer or by the data coupler.

The $\overline{\text{START PRINTOUT CYCLE}}$ signal actuates the internal operations for shifting data from the intermediate memory units to the shift register during playback operation. To actuate a parallel output printer, there is provided a NAND gate 537 which receives as inputs, the START PRINTOUT CYCLE signal coupled through an inverter 544. OR* gate 542 receives as its inputs, the CHAR. PRESENT signal, from sequence control unit 306, and the DELETE and SKIP PRINTOUT signals from edit control unit 301.

OR* gate 542 inhibits data transfer from the I/O register, e.g. during certain editing operations or otherwise if the shift register is empty at the beginning of an operating cycle. Internal data transfer operations which result in movement of data from the intermediate memory to the shift register are not inhibited by OR* gate 542.

The remaining function of input/output logic unit 202 is to control serial transfer of information from shift register 204 to a data coupler during playback, or to the edit memory during editing operation. However, the operation of this portion of the system is largely dependant upon sequence control unit 306 and shift register 204. In the interest of clarity, therefore, description of the remainder of FIG. 5 is deferred until the sequence control unit and shift register has been described.

Figure 6:
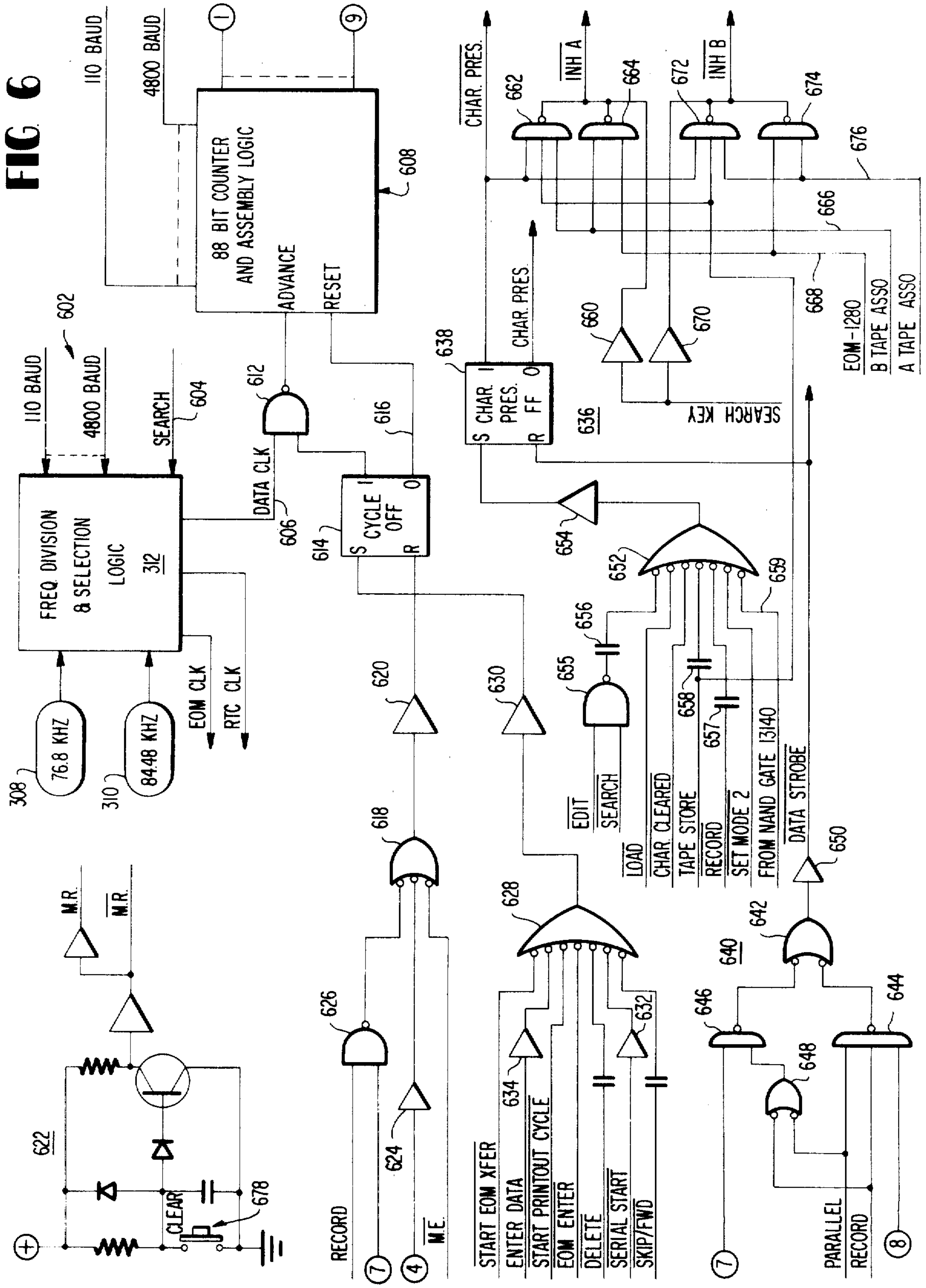
FIG. 6 shows the programming logic.

Timing and Sequence Control (FIG. 6.)

FIG. 6 shows master oscillators 308 and 310, frequency selection and division unit 312, and sequence control unit 306.

The circuits are essentially the same as described in our parent applications and the details are not repreated here. Briefly, however, master oscillators 308 and 310, which serve as the primary timing references, provide squarewave outputs at 76.8 kHz and 84.48 kHz, respectively. These are coupled as inputs to frequency selection and division unit 312, which generates the lower frequency signals required elsewhere in the system.

Logic circuit 312 comprises a plurality of integrated circuit divider units together with the required gating logic, and operates in response to baud rate selection signals over leads 602, and the SEARCH signal over lead 604, all from mode select logic unit 302. Signal outputs, denoted RECORD CLK and EOM CLK, are provided at frequencies of 9,600 Hz and 4,800 Hz, respectively. The RECORD CLK signal controls transfer of data from one of memory units 118A or 118B to the tape memory, while the EOM CLK signal is used to complete a data block after the EOM character is generated.

The remaining output of circuit 312 is the DATA CLK signal on lead 606 which controls the other data transfer operations. The frequency of the DATA CLK signal is determined by the desired data rate as indicated by one of the baud rate selection signals, or by the SEARCH signal indicating a search operation to be in progress. The frequencies are eight times the baud rate to permit eight counts between data gating pulses. This avoids synchronization problems, particularly for incoming serial data, as described in our parent applications. The following table gives the frequency of the DATA CLK signal for the various operating functions.

| Baud rate | DATA CLK Frequency |
|---|---|
| 110 | 880 |
| 132 | 1056 |
| 150 | 1200 |
| 300 | 2400 |
| 1200 | 9600 |
| 2400 | 19200 |
| 4800 | 38400 |
| SEARCH | 38400 |

The sequence control unit includes an 88-bit counter and associated combinational logic, denoted 608, and control circuits for advancing and resetting unit 608, and for generating other required sequencing signals for the system.

Counter 608 has an 88-count capacity and a reset or "0" count state. An "advance" input is provided by a NAND gate 612 coupled to the DATA CLK signal on lead 606, and to the ONE output of a set-reset flip-flop 614. The reset input for counter unit 608 is provided by the ZERO output of cycle flip-flop 614 to return the counter to its zero or rest state.

Cycle flip-flop 614 is reset by an OR* gate 618 through an inverter 620. OR* gate 618 receives as its inputs, an initial condition control signal M.R. from master reset circuit 622, described below, the No. 4 output of counter 608, also described below, coupled through an inverter 624, and the output of a NAND gate 626. The latter receives as inputs, the No. 7 output of counter 608 and the RECORD signal from mode select unit 302.

Cycle flip-flop 614 is set by an OR* gate 628 coupled through an inverter 630. The inputs for OR* gate 628 are provided by the SERIAL START, EOM ENTER, SKIP/FWD, START EOM XFER, DELETE, ENTER DATA and START PRINTOUT CYCLE signals generated elsewhere in the system. As illustrated, the DELETE and SKIP/FWD signals are AC coupled, while the SERIAL START and ENTER DATA signals are coupled through respective inverters 632 and 634.

The DATA CLK signal on lead 606 is a continuous pulse train. Thus, whenever cycle flip-flop 614 is set, counter 608 advances at the DATA CLK frequency, and the outputs representing the various count states are activated in succession. When cycle flip-flop 614 is reset, counter 608 is returned to the 0 state, (i.e., the 0 output is high) at which it remains until the cycle flip-flop is again set.

Certain of the 88-count states of counter 608 are used directly, while others are combined to produce multiple pulse sequences. This is summarized in the following table.

| Output No. | Count States |
|---|---|
| 1 | 4, 12, 20, 28, 36, 44, 52, 60, 68 |
| 2 | 12, 20, 28, 36, 44, 52, 60, 68 |
| 3 | 76* |
| 4 | 80** |
| 5 | 6 |
| 6 | 0 |
| 7 | 70 |
| 8 | 4 |
| 9 | 68 |

* 68 for 132 baud, 76 otherwise
** 88 for 110 baud, 72 for 132, 80 otherwise

Further details appear in our parent applications.

Sequence control unit 306 also includes an inhibit logic circuit 636 which provides a CHAR. PRES. signal to indicate the absence of data in bit positions 1–8 of shift register 204. This signal is developed by the ONE output of a flip-flop 638. Flip-flop 638 is reset by the DATA STROBE signal generated by a logic circuit 640.

Logic circuit 640 comprises on OR* gate 642 coupled to the outputs of a pair of NAND gates 644 and 646. NAND gate 644 receives as its inputs, the PARALLEL signal either hardwired in, or generated by a suitable parallel-serial switch by the RECORD signal from mode selection unit 302, and by the 4 count (No. 8) output of sequence control unit 606. The inputs for NAND gate 646 are provided by the 70 (No. 7) output of sequence control unit 606, and by the output of an OR* gate 648 which receives as its inputs, the PARALLEL and RECORD signals provided as inputs to NAND gate 644. OR* gate 642 is coupled through an inverter 650 to provide the complementary signal, DATA STROBE. This signal indicates that a complete character is present in the I/O shift register. Data is transferred from an intermediate memory unit to the I/O register, and from the I/O register to the intermediate memory for serial recording in 8-bit bursts ending at count 68 of each 88 count cycle. For record operation from a parallel source, however, data is entered in parallel at count 4, followed by direct transfer to the intermediate memory (ending at count 68.) Thus, for the latter, a complete character is present in the I/O register at count 4, but for the former, a complete character is not present until after count 68. The DATA STROBE signal is therefore low either at count 4 for parallel record operation or at count 70 otherwise.

Referring back to character presence flip-flop 638, the set input is provided by an OR* gate 652 coupled through an inverter 654. Inputs to OR* gate 652 are provided by a NAND gate 655, AC coupled through capacitor 656. NAND gate 655 receives as inputs the EDIT and SEARCH signals, whereby flip-flop 638 is set when the system comes out of the edit mode, and the EDIT signal goes high, or at the end of a search when the SEARCH signal goes high. (In the latter case, for a search occurring as part of the edit operation, as described below, the EDIT signal remains low, and termination of a search does not cause flip-flop 638 to be set.)

Other inputs for OR* gate 652 are provided by the TAPE STORE and RECORD signals AC coupled as indicated at 657 and 658, by the LOAD, SET MODE 2 and CHARACTER CLEARED signals, and by the output of a NAND gate 13140, described below, over lead 659. Low levels of any of these signals indicate conditions for which data is not present in the I/O register. The outputs of flip-flop 638 under these conditions are thus used to prevent transfer of meaningless data out of the I/O register.

Inhibit logic circuit 638 also generates inhibit control signals INH-A and INH-B, for the A and B memory units. The INH-A signal is provided by the OR-tied output of an inverter 660, and a pair of NAND gates 662 and 664. Inverter 660 is coupled to the SEARCH KEY signal generated by mode selection unit 306. NAND gate 662 receives as its inputs, the CHARACTER PRESENT, TAPE STORE, and B-TAPE ASSOCIATED signals. As hereinafter explained, the B-TAPE ASSOCIATED signal is high when the B memory is conditioned to receive data from the tape duing playback operation, or to provide data to the tape during record operation. NAND gate 664 also receives as one input, the B TAPE ASSOCIATED signal and the EOM-1280 signal on lead 668. This is generated by edit control unit 301 to indicate that the EOM character associated with a particular message appears in the last available memory site of one of the inter-mediate memory units.

A similarly constructed circuit provides the INH-B signal. An inverter 679 coupled to the SEARCH KEY signal has its output OR-tied to the outputs of a pair of NAND gates 672 and 674. The former receives as its inputs, the CHARACTER PRESENT, TAPE STORE, and A TAPE ASSOCIATED signals. The latter is analogous to the B TAPE ASSOCIATED signal, and is high when the A memory unit is conditioned to provide data to the tape during record operation, or to receive data from the tape during playback. NAND gate 674 also receives the A TAPE ASSOCIATED signal as an input, as well as the EOM-1280 signal previously mentioned.

Also illustrated in FIG. 6 is a master reset circuit 622 mentioned above. This circuit produces the M.R. and M.R. signals which are respectively high and low for a brief interval after power is applied to the system. These signals place certain critical logic elements in required initial operating condition when the system is first turned on. The circuit has been described in our parent applications, and is omitted here in the interest of brevity. It might be noted, however, that a clear switch 678 is added to the circuit to simulate the effect of power turn-off on the reset circuit. When switch 678 is released, power is effectively returned and the reset operation effected. This permits the operator to clear the system, if desired in preparation for further operation.

Figure 7:
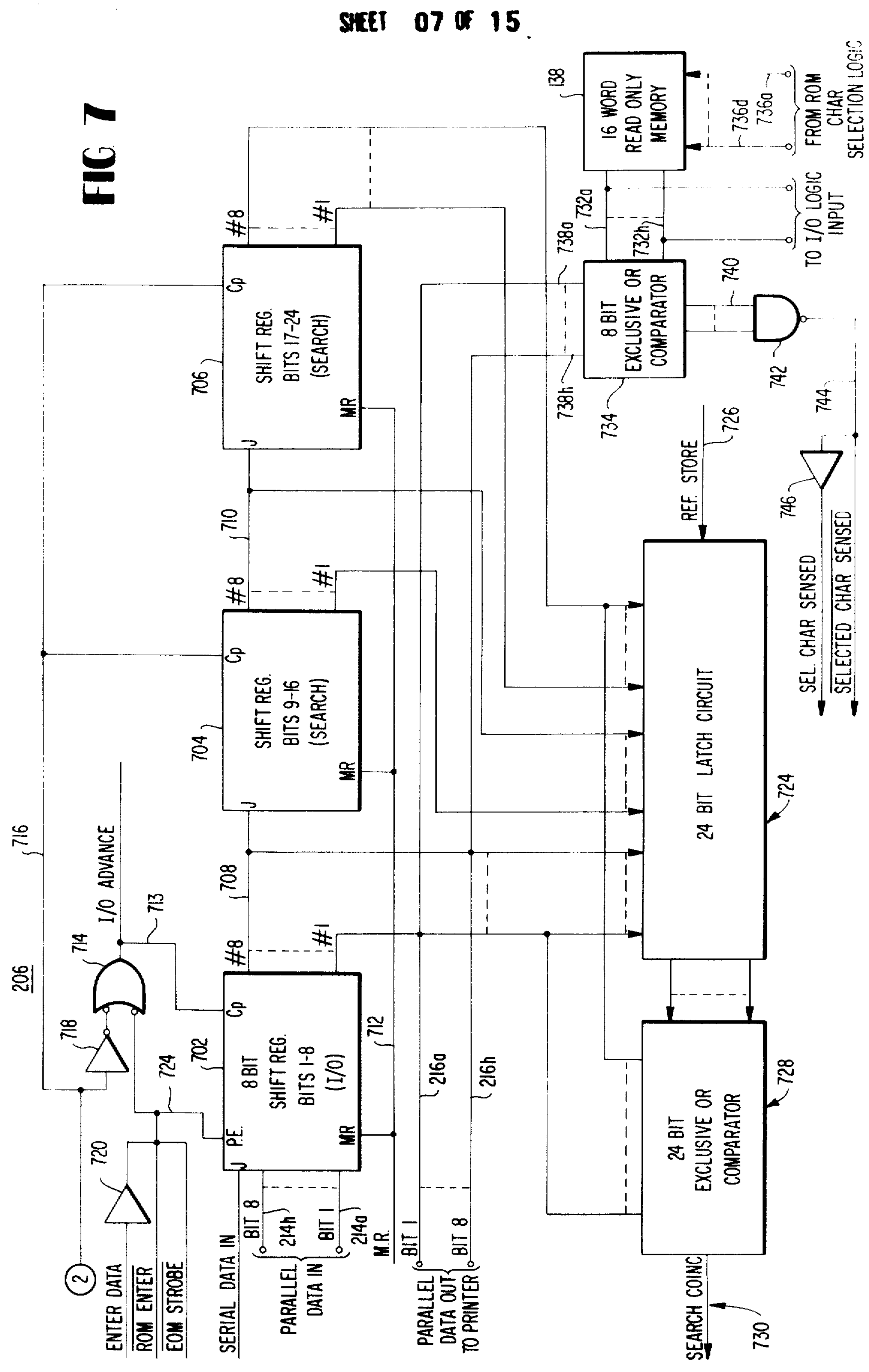
FIG. 7 shows the details of the input/output register, the associated control logic and the Read Only Memory.

Shift Register, Character Identification Logic and Read-Only-Memory (FIG. 7)

Twenty-four bit shift register 504 is constructed of three separate 8-bit subunits 702, 704, and 706. Subunit 702 is the input/output register, the primary purpose of which is to provide input parallel to serial conversion, output serial to parallel conversion, and data transfer to and from the intermediate memories, to the editing memory and from the ROM. Also, subunit 702 cooperates with subunits 704 and 706 in the implementation of the search operation, as described below.

The serial input J of shift register subunit 702 is connected to the serial data line 210 from input-output logic unit 202. The J input for shift register subunit 704 is coupled to the Bit No. 8 output of subunit 702 over lead 708. Lead 708 also provides the serial output from the shift register on lead 216$h$ to input-output logic unit 202 (see FIG. 5.) The J input of subunit 706 is, in turn, coupled to the Bit No. 8 output of subunit 704 over lead 710.

In addition to its serial input, subunit 702 includes eight parallel inputs denoted Bit 1 through Bit 8 provided by the outputs of OR* gates 518($a$–($h$) [see FIG. 5.] These represent the parallel keyboard inputs or special characters provided by ROM 138.

The reset (or "MR") inputs for all of shift register subunits 702 through 706 are provied in common by the M.R. signal when the system is turned on. A Clock input "CP" of subunit 702 is provided over lead 713 from shift register control unit 206 (see FIG. 2.) As illustrated in FIG. 7, the latter comprises an OR* gate 714 receiving as inputs the 12, 20, etc. (No. 2) output of sequence control unit 306 through an inverter 718 and the outputs of an inverter 720, OR-tied with EOM STROBE signal from mode selection unit 302 and the ROM ENTER from edit control unit 301. Inverter 720 receives as input, the ENTER DATA signal from the external data source. The output No. 2 of the sequence control unit is coupled directly over lead 716 as the $C_P$ input for shift register subunits 704 and 706.

The series of eight pulses constituting the No. 2 output of sequence control unit 306 transfer individual data bits into the shift register from printer 102 or the line coupler and out of the shift register into the intermediate memory when recording. Correspondingly, during playback, the No. 2 pulse group controls data transfer from the intermediate memory to the shift register and out of the shift register to the printer, or to the edit memory for the edit operation. A high $C_P$ input causes the signal value in each bit position to be transferred to the next bit position and to appear at the respective outputs in coincidence with the trailing edge of the advance pulse.

Data is entered into shift register 204 in parallel at bit positions 1 through 8 from the parallel inputs of subunit 702 when the P.E. input is low and the $C_P$ input is high, with the data appearing at the outputs upon return of the $C_P$ input to a low level. Actuation of the parallel entry control input for subunit 702 is provided directly by the OR-tied outputs of inverter 720, and the $\overline{\text{EOM STROBE}}$ and $\overline{\text{ROM ENTER}}$ signals.

For parallel entry, the ENTER DATA pulse simultaneously activates the P.E. and $C_P$ inputs of subunit 702 to enter the data on leads 214(*a*)–(*h*) in the first eight bit positions of the shift register. The $\overline{\text{EOM STROBE}}$ and ENTER DATA pulses also start 88-bit counter 608 (see FIG. 6) so the P.E. pulse on lead 724 is followed by the eight shift pulses comprising the No. 2 output of sequence control unit 306. This transfers the data just entered into bit positions 1–8 to positions 9–16, respectively, and also out along lead 216(*h*), one bit at a time. Since the data on lead 216(*h*) is gated directly into one of the intermediate memory units during record operation, the data in shift register subunits 704 and 706 are not needed. The same is true for serial operations, both record and playback, and for parallel (local) playback, where data is shifted into subunits 703 serially and sampled in parallel as noted in connection with FIG. 6 above.

For the search function, however, a three character address code capacity is provided. The reference code, entered from the external keyboard, is stored temporarily in the three subunits 702–706, and then transferred to a memory comprising a 24-bit latch unit of conventional construction. Also, as data from the tape is scanned for the reference characters all three shift register subunits are employed to store three characters for comparison with the reference characters.

The reference data is entered by the external keyboard into the shift register, one character at a time. These are transferred to latch circuit 724 under control of the REFERENCE STORE signal provided over lead 726 from mode selection unit 302 described below. The REFERENCE STORE signal actuates latch circuit 724 as each character is entered into the shift register. Thus, upon entry of the third reference character, the entire search address is located in the three shift register subunits, and the REFERENCE STORE signal enters the complete search address code in propoer sequence into the latch circuit.

The search operation itself constitutes a high speed transfer of data from intermediate memory units 118A and 118B into the shift register for comparison with the data contained in latch circuit 724. During the search operation, the passage of data to an external utilization device is blocked, but if the search is part of the editing operation, the data passes out of the shift register into the editing memory.

The actual comparison is accomplished by a 24-bit EXCLUSIVE-OR comparator unit 728, each EXCLUSIVE-OR circuit of which compares one bit stored in latch circuit 724 with the data in the corresponding bit position in the shift register. Each EXCLUSIVE-OR circuit produces a high output if and only if its two inputs are different and a low output of the two inputs are the same.

The individual latch elements such as Texas Instruments Type SN-7475, provide both direct and complementary outputs. The complementary latch outputs are provided to EXCLUSIVE-OR comparator unit 728 for comparison with the direct outputs of the shift register, so each individual EXCLUSIVE-OR element produces a high output upon data coincidence (as distinguished from input signal coincidence) for the particular bit position with which the EXCLUSIVE-OR element is associated, and a low output if data coincidence for that bit does not occur. Accordingly, by OR-tieing the outputs of all of the EXCLUSIVE-OR comparator elements together the common output provided on lead 730 (denoted SEARCH COINCIDENCE) there is provided a high signal if data coincidence exists for all 24 bits and a low signal otherwise.

This is coupled to mode selection unit 303 to terminate the search operation and to condition the system for operation either in the playback of edit mode.

As previously mentioned, both forward and reverse search operation are available with only the former available during editing. In forward search, the tape in the same direction as data was recorded, while in the reverse search, the tape plays backwards, but the search comparison itself is independent of the direction in which data is extracted from the tape. This is accomplished by entering data from the tape into the intermediate memory unit during reverse search in the opposite direction from that used for forward search, and by extracting the data from the intermediate memory in the normal order for both forward and reverse searches. Thus no need exists for the comparison circuitry to distinguish between the two types of operations.

FIG. 7 also illustrates the read only memory 138 and certain associated comparison logic. ROM 138 is of any conventional or desired construction, such as Model No. IM-5600 or the equivalent.

ROM 138 provides a 16 word storage capacity. Of this, six words are used as follows:

| ROM Memory Position | Stored Code |
|---|---|
| 1 (rest) | EOM |
| 2 | space |
| 3 | period |
| 4 | carrier return |
| 5 | question mark |
| 6 | exclamation mark |

The data output is provided over a set of eight leads 732(*a*)–(*h*). These are coupled through inverters 516(*a*)–(*h*) and OR gates 518(*a*)–(*h*) to the first eight-bit positions of the shift register, i.e., shift register stage 702, and also to the inputs of an eight-bit EXCLUSIVE-OR comparator circuit 734.

Control for ROM 138 is provided by a five-bit binary input pattern over leads 736(*a*)–(*e*) from the ROM character selection unit hereinafter described. Operation of ROM 138 is such that the binary pattern appearing on leads 736 selects the corresponding eight-bit output representing the desired character code word.

Referring again to EXCLUSIVE-OR comparator circuit 734, a second set of eight inputs is provided over leads 738(*a*)–(*h*) from the first eight bit positions of the shift register for comparison with the succession of words appearing at the output of ROM 138. EXCLUSIVE-OR comparator 734 operates identically to comparator 728, providing eight outputs which are connected as the inputs of a NAND gate 742. As in the case of comparator 728, to permit direct utilization of a high level of the signal on lead 744 as an indication of a data coincidence, the date stored in ROM 138 is the complement of the actual code words represented — inverters 516(*a*)–(*h*) are used to convert the data to the proper polarity before transfer to the shift register for other purposes. The output of NAND gate 742 on lead 744 is utilized directly as the $\overline{\text{SELECTED CHARACTER SENSED}}$ signal and coupled through inverter 746 to provide the SELECTED CHARACTER SENSED signal.

Figure 16:
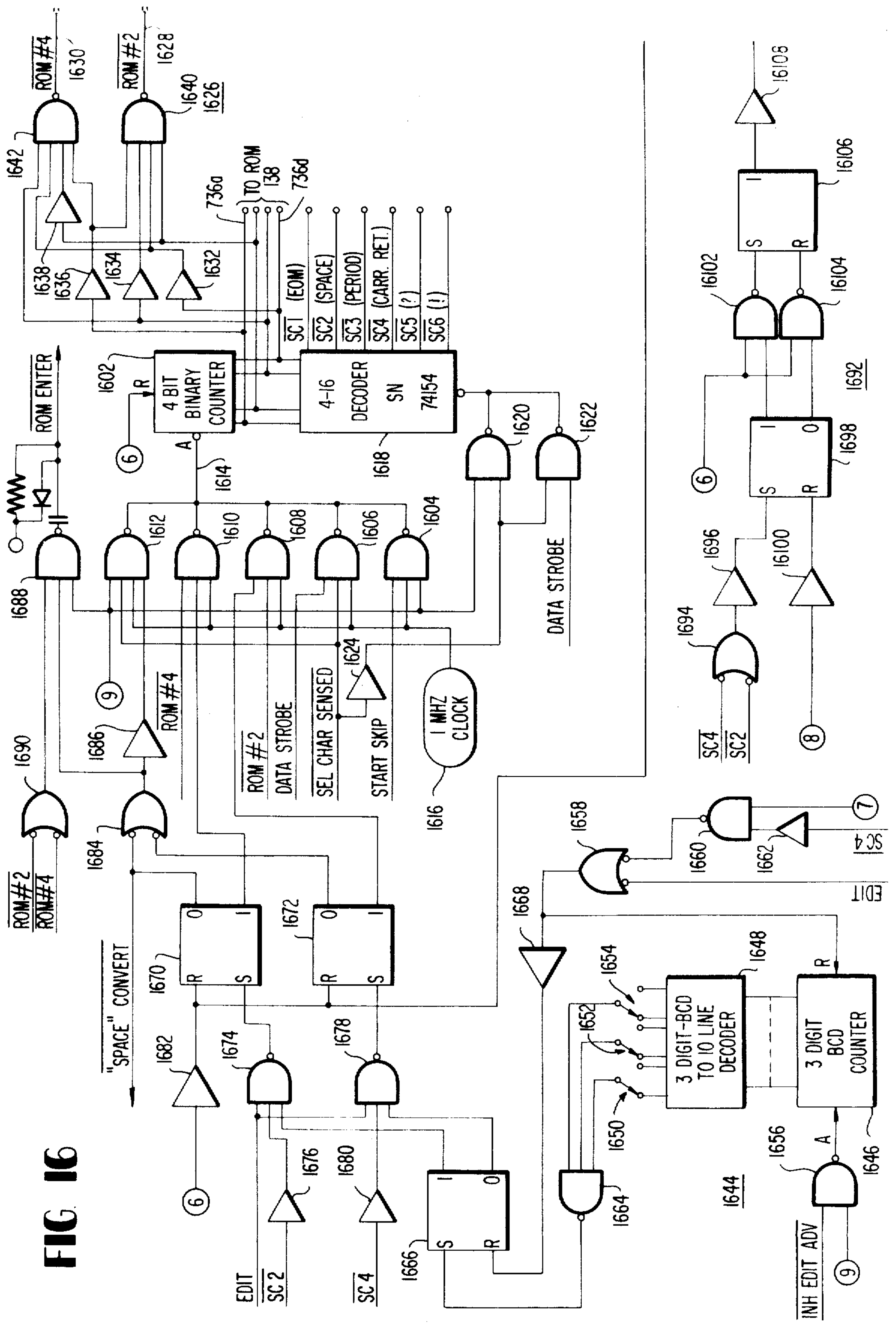

ROM 138 is scanned by the control inputs appearing on lead 736 generated as described below, at a rate substantially in excess of the rate at which data in the shift register changes. Thus, the shift register data is compared successively with each of the words available in the read only memory and a coincidence output is provided if the particular character present in the shift register matches one of those stored in the RAM. This information is used for various purposes during the editing operation, and also for sensing an end of message (EOM) character in the data being received or transmitted. Identification of the recognized word is accomplished by noting which one of the input control addresses was present at the time of coincidence. This is described more fully below in connection with FIG. 16 showing the logic required for the editing operations.

Serial Output Circuit

Referring back to FIG. 5, the serial output circuit, generally denoted 546, functions to add the START and STOP bits to the shift register output prior to serial transmission to a remote receiver or local teletype printer, and to provide the serial input to the editing memory.

Output circuit 546 comprises a J-K flip-flop 548, the J input being provided directly by the Bit-8 output of shift register stage 702 through a NAND gate 550. The K input is provided by NAND gate 550 through an inverter 551, whereby the $\overline{Q}$ output follows the K, and thus reproduces the shift register output. NAND gate 550 is controlled by the PLAY signal from mode selection unit 302 and the ZERO output of a set-reset start pulse flip-flop 552. Flip-flop 552 is set at count 0 of the 88-count cycle of sequence control unit 306 by the No. 6 signal through an inverter 554, and is reset at count 6 by the No. 5 signal through an inverter 556.

The $\overline{Q}$ output of flip-flop 548 provided over lead 226 as the serial data output to a data coupler for "on line" operation, or to a local serial printer and the edit memory for local operation. Signal steering is accomplished in any convenient way, e.g. by a pair of contacts 558 on local-on line selection switch 520.

The clock input for flip-flop 548 is provided by the No. 1 output of sequence control logic unit 306, while the reset input is provided through an inverter 560 by the output of an OR* gate 562. The latter, in turn, is connected to inverter 544 whereby serial data transfer is inhibited by the same operating conditions as during parallel playback. OR* gate 562 also receives the $\overline{\text{PLAY}}$ signal from mode selection unit 302, and the No. 3 output of sequence control unit 306 coupled through an inverter 563 whereby flip-flop 548 is reset during record operations and at the end of an eight bit data shift.

As described above, the shift register advances in response to the trailing edge of each shift pulse.

The J-K flip-flop also changes its output state in response to the trailing edge of its clock pulse so the new output state of the flip-flop is determined by the state of 8th bit position of the shift register prior to its shift, with the result that the flip-flop output is one bit behind the shift register.

As explained above, a shift register advance cycle begins on count 12 of the 88-count cycle with data already present in the shift register. Flip-flop 548 is updated before a shift takes place, so at count 12 flip-flop 548 provides as its output the first bit of the code word in question. [Flip-flop 548 is triggered by the No. 1 output of counter 608 so its first clock pulse occurs at count 4. This, and the operation of flip-flop 552, serve certain formatting functions for teletype code transmission as described in our parent applications. Further detail may be found in these, if desired.]

Mode Selection Unit

Figure 8:
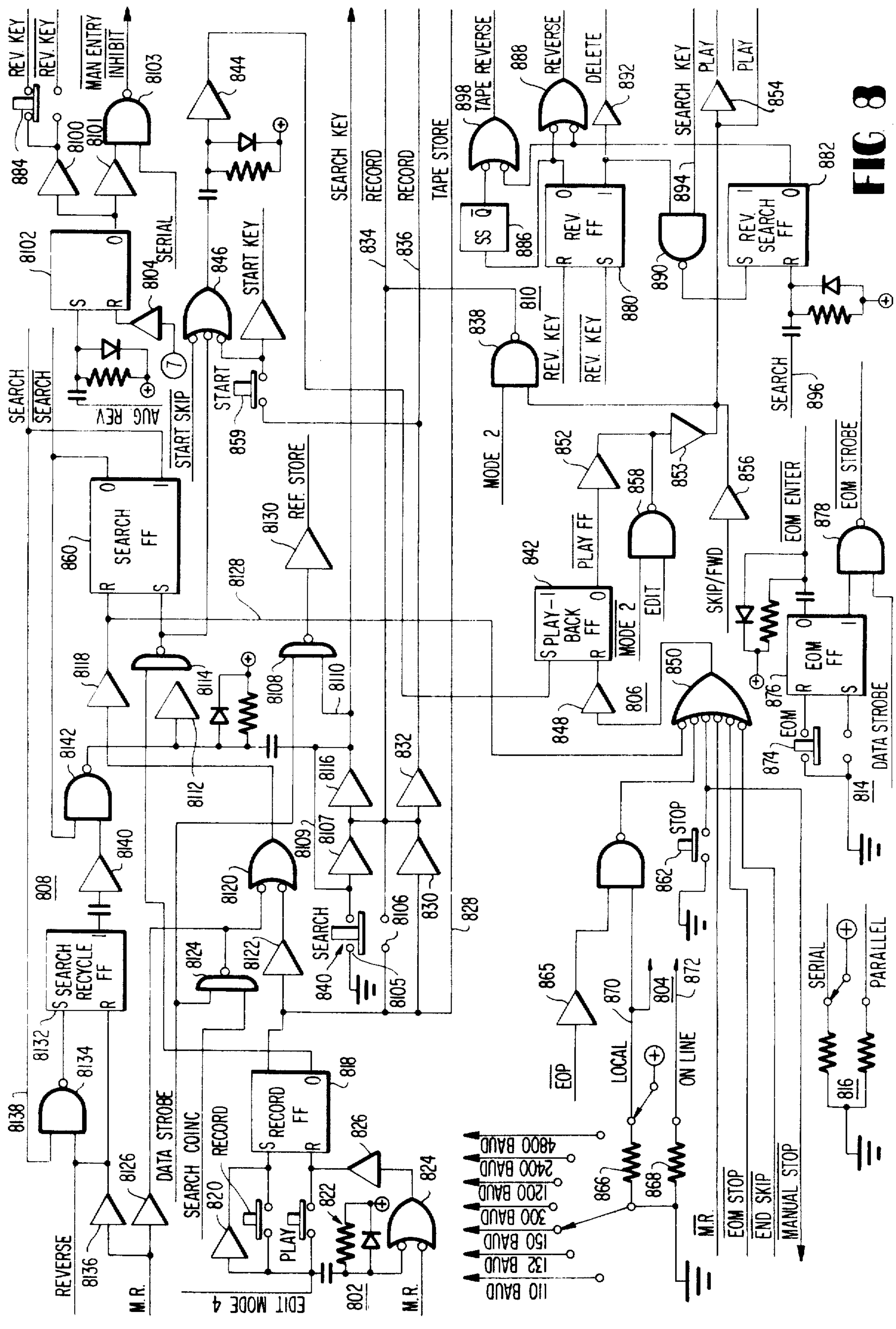
FIG. 8 illustrates the details of part of the operating mode selection logic.

Referring to FIG. 8, mode selection unit 302 includes a playback-record selection circuit 802, local-on line selection circuit 804, playback control circuit 806, search control circuit 808, reverse operation control circuit 810, baud rate selector circuit 812, "end of message" entry control circuit 814, and parallel-serial selection circuit 816.

Playback-record selection circuit 802 comprises a pair of momentary contact switches, labelled RECORD and PLAY, respectively connected to set and reset a record flip-flop 818. The actuating signal is provided by a low level of the EDIT MODE 4 signal (i.e., except during mode 4 of the edit operation.) The input signal is also coupled through an inverter 820 to the set input, thereby setting the flip-flop during edit mode 4, and through an AC coupling circuit 822, an OR* gate 824, and an inverter 826 to reset the flip-flop at the *end* of mode 4. The M.R. signal also resets flip-flop 818 at the beginning of system operation.

Flip-flop 818 provides the TAPE STORE signal at its ONE output over lead 828 to control various data transfer operations. The TAPE STORE signal is also coupled to a pair of inverters 830 and 832, the outputs of which respectively provide the $\overline{\text{RECORD}}$ and RECORD signals on leads 834 and 836. The junction between inverters 830 and 832 is connected to the output of a NAND gate 838, which receives as inputs, the $\overline{\text{PLAY}}$ and EDIT MODE 2 signals. These operate the NAND gate to a low output, and thus a high value RECORD signal and a low value for the $\overline{\text{RECORD}}$ signal when playback flip-flop 842 is reset in edit mode 2, indicating external keyboard entry for the edit operation, as described below, and effectively override the reset state of record/playback flip-flop 818.

The junction between inverters 830 and 832 is also connected to a normally open contact of search key 840. When closed, this couples the TAPE STORE signal to the $\overline{\text{RECORD}}$ lead. Thus, if flip-flop 818 is reset, the $\overline{\text{RECORD}}$ signal goes low, and the RECORD signal goes high, permitting entry of the search reference characters in the shift register.

Playback control circuit 806 includes a playback flip-flop 842 which is set through an inverter 844 AC coupled to an OR* gate 846. The reset input is provided through an inverter 848 by another OR* gate 850. The ZERO output of flip-flop 842 is coupled through a chain of three inverters 852, 853 and 854, the latter, providing the $\overline{\text{PLAY}}$ and PLAY signals respectively, for use elsewhere in the system.

OR-tied to the output of inverter 852 is a NAND gate 858. This is coupled to the $\overline{\text{MODE 2}}$ and EDIT signals, thereby forcing the input of inverter 853 to go low, and the PLAY and $\overline{\text{PLAY}}$ signals to go low, and high, respectively during edit modes 1, 3 and 4, irrespective of the state of playback flip-flop 842.

The purpose of this is to establish a low level of the PLAY signal and a high level for the $\overline{\text{PLAY}}$ signal when the system is in edit but not in mode 2. This allows playback flip-flop 842 to remain set during a succession of edit modes 3, 4, and 1 if set during a previous edit mode 2. Thus, multiple character skip operations, and automotic playback continue from one edit mode 2 to the next, i.e., commencing again automatically at the beginning of a subsequent edit mode 2 if interrupted at the end of a previous edit mode.

A converse condition is produced by an inverter 856 or-tied to the output of inverter 853. The former is connected to the SKIP/FWD signal which is high for the single character advance, and skip operations described below. For these, playback flip-flop 842 is not set, and the output of NAND gate 838, which otherwise would go low as previously described, if held high by the low level at the inverter 853–856 junction. The low level also forces the $\overline{\text{PLAY}}$ and PLAY signals low and high respectively, as if flip-flop 842 was set.

The Local-On Line selection circuit 804 comprises a two-position switch having a moving contract connected to the positive power supply and fixed contracts grounded through respective resistors 866 and 868. The fixed contacts are also connected to leads 870 and 872 to provide the LOCAL and ON LINE signals for use elsewhere in the system. Serial-Parallel selection circuit 816 is similarly constructed, while baud rate selection circuit 812 is a seven-position switch with a grounded selector arm. Inverters (not shown) may be provided to generate complementary values of these selection circuit outputs as required.

End of Message (EOM) entry control circuit 814 comprises a momentary contact double pole switch 874 for setting and resetting a flip-flop 876, the latter serving to eliminate effects of contact bounce. The AC coupled ZERO output of flip-flop 876 provides the $\overline{\text{EOM ENTER}}$ signal to set cycle flip-flop 614 previously described, while the ONE output is coupled as an input to a NAND gate 878. The latter receives as a second input, the DATA STROBE signal, which gates the flip-flop output to provide the $\overline{\text{EOM STROBE}}$ signal. The latter activates the parallel entry circuits for I/O register 702 and NAND gates 508(*a*)–(*h*) to couple the EOM character from the ROM in parallel to the shift register. Because the rest positipn for ROM 138 contains the EOM character code, it is always available when the ROM is at rest.

It may be noted that for operation with a serial external keyboard device entry of EOM in parallel at the end of the shift cycle duplicates the normal serial data entry operation in which the newly entered character is retained in the I/O register. Correspondingly, for operation with a parallel external keyboard device, the normal entry sequence is duplicated by EOM entry at count 4, followed by shifting out of the newly entered character under control of the No. 2 output of 88-bit counter 608 in sequence control logic unit 306.

The reverse operation control circuit 810 comprises a pair of flip-flops 880 and 882, the former being set and reset, respectively, by the $\overline{\text{REVERSE KEY}}$ and REVERSE KEY signals described below. The 0 output of flip-flop 880 is coupled to a single shot 886, and to an OR* gate 888, while the 1 output is coupled to a NAND gate 890 and an inverter. The former, gated by a signal on lead 894 indicating depression of the SEARCH key 840 provides set input for flip-flop 882 while the reset input is provided by the SEARCH signal, AC coupled over lead 896. Thus, when flip-flop 880 is set, and SEARCH key 840 is depressed, indicating the reverse and search operations, respectively, flip-flop 882 is set. At the end of the reverse search, the SEARCH signal goes low causing the flip-flop to be reset.

The 0 output of flip-flop 882 is coupled to OR* gate 888, and, along with the $\overline{Q}$ output of single shot 886, to another OR* gate 898. The former generates the REVERSE signal, while the latter generates the TAPE REVERSE signal.

Inverter 892 produces the $\overline{\text{DELETE}}$ signal, This is AC coupled, as illustrated in FIG. 6, to set cycle flip-flop 614, permitting activation of 88-bit counter 608 for one cycle. As explained hereinafter, this intermediate memory unit 118A or 118B [the one then receiving date from the external source through the I/O register] in such a manner as to return to the memory site corresponding to the beginning of the last recorded character, so a substitute character may be stored.

The $\overline{\text{REVERSE KEY}}$ and REVERSE KEY signals are generated by a momentary contact switch 884, coupled to an inverter 8100, the latter coupled to the 0 output of a flip-flop 8102. This is set by an $\overline{\text{AUG.REV}}$. signal, AC coupled from edit control unit 301, when a keyboard entry sequence is begun during edit operation. Flip-flop 8102 is reset at count 70 by No. 7 output of the sequence control unit, coupled through an inverter 8104. Thus flip-flop 8102 is set for one 88-count cycle.

The 0 output of flip-flop 8102 is connected directly to the normally open contact of switch 884 which provides the REV. KEY signal. Thus, when the flip-flop is set the reverse key is effectively bypassed and reverse flip-flop 880 is set for one 8-bit character shift cycle.

The 0 output of flip-flop 8102, coupled through an inverter 8101 provides an input to a NAND gate 8103, the other input for which is the SERIAL signal from circuit 816. The output of NAND gate 8103 provides the $\overline{\text{MANUAL ENTRY INHIBIT}}$ signal for edit control unit 301 as described below.

Search operation is controlled by circuit 808, including the SEARCH key 840, and search flip-flop 860, previously mentioned, and associated logic circuitry. Specifically, SEARCH key 840 controls a pair of normally closed contacts 8105 and a pair of normally open contacts 8106. Contact pair 8105 grounds the input of an inverter 8107 and one input of a NAND gate 8108 over leads 8109 and 8110. Lead 8109 is also AC coupled through an inverter 8112 as one input of another NAND gate 8114. Lead 8109, and the output of an inverter 8116 also provide the SEARCH KEY signal — a high level when the search key is depressed and a low level under other conditions. Normally open contact pair 8106 is arranged to couple the ONE output of record flip-flop 818 to the junction between inverters 830, 832, 8107 and 8116, which provide the RECORD signal over lead 836. NAND gate 8114 sets search flip-flop 860 whenever the output of inverter 8116 goes low, (due to the AC coupling, and inverter 8112) if the system is not in record, as indicated by a high level of the 0 output of flip-flop 818. In particular, when search key 840 is released, the output of inverter 8116 is low and the outputs of NAND gates 8108 and 8114 are high. When the search is depressed, and flip-flop 818 is set the $\overline{\text{RECORD}}$ signal on lead 834 is held low by inverter 830, and the output of inverter 8116 is high. This keeps NAND gate 8114 inhibited through inverter 8112 and conditions NAND gate 8108 for subsequent operation.

If search key 840 is depressed with record flip-flop 818 reset, the $\overline{\text{RECORD}}$ signal on lead 834 is low, and the outputs of inverters 832 and 8116 are high. Thus, the portions of the system responsive to the RECORD and $\overline{\text{RECORD}}$ signals are unable to detect the difference between a record operation and depression of the search key during playback operation.

NAND gate 8108 controls storage of the search reference characters into latch memory 724 in response to depression of the search key and the DATA STROBE signal from sequence control unit 306, the latter indicating the presence of a complete character in the shift register, as explained above. The actuating signal for the latch circuit, denoted REF. STORE is provided by the output of NAND gate 8108 through an inverter 8130.

When search key 840 is released after entry of the third reference character, the output of inverter 8116 drops low, the resulting negative pulse actuates NAND gate 8114 to set search flip-flop 860, initiating the search operation. The reset input for search flip-flop 860 is provided through inverter 8118 by an OR* gate 8120. This is coupled by an inverter 8122 to the ONE output of record flip-flop 818, and to the output of NAND gate 8124, the latter OR-tied to the M.R. signal through an inverter 8126. NAND gate 8124 is coupled to the DATA STROBE and SEARCH COINCIDENCE signals, and thus operates to indicate completion of a search operation, i.e., location of the reference code on the tape. The output of inverter 8118 is also coupled over lead 8128 to OR* gate 850 to reset playback flip-flop 842 when the search is completed.

As previously pointed out, the reverse search involves the same initial operations as a normal search except that reverse key 884 must also be depressed. During search the tape runs in the opposite direction and data is stored in the intermediate memory unit in reverse order to allow the actual search to be independent of the direction of tape movement. However, because the tape runs backward for reverse search, at the completion of a search, the tape playback head rests at the beginning of the body of data containing the desired reference characters, whereas at the end of a normal search, the tape head rests at the end of that body of data. Accordingly, at the end of a reverse search, the tape is advanced one additional data block so that the playback head is positioned at the end of the data block containing the desired reference code, as in the case of the normal forward search.

The foregoing is accomplished by a circuit comprising a search recycle flip-flop 8132, which is set by a NAND gate 8134 and reset by the OR-tied combination of the M.R. signal coupled through inverter 8136 and the REVERSE signal. The inputs for NAND gate 8134 are also provided by the OR-tied combination signal, and the converted M.R, signal, and by the ONE output of search flip-flop 860 over lead 8138.

The ONE output of flip-flop 9132 is AC coupled through an inverter 8140 as an input to another NAND gate 8142, the other input to which is provided by the ZERO output of search flip-flop 860. The output of NAND gate 8142 is OR-tied to the input of inverter 8112 and operates to set search flip-flop 860 through NAND gate 8114. This assures that when the search flip-flop is reset at the end of a reverse search, it is immediately again set, so the search continues. However, when flip-flop 860 rests at the end of the reverse search, flip-flop 882 resets, so the continuation of the search is in the forward direction, while the data block containing the reference characters is once again scanned.

Tape Operation Control

Figure 9:
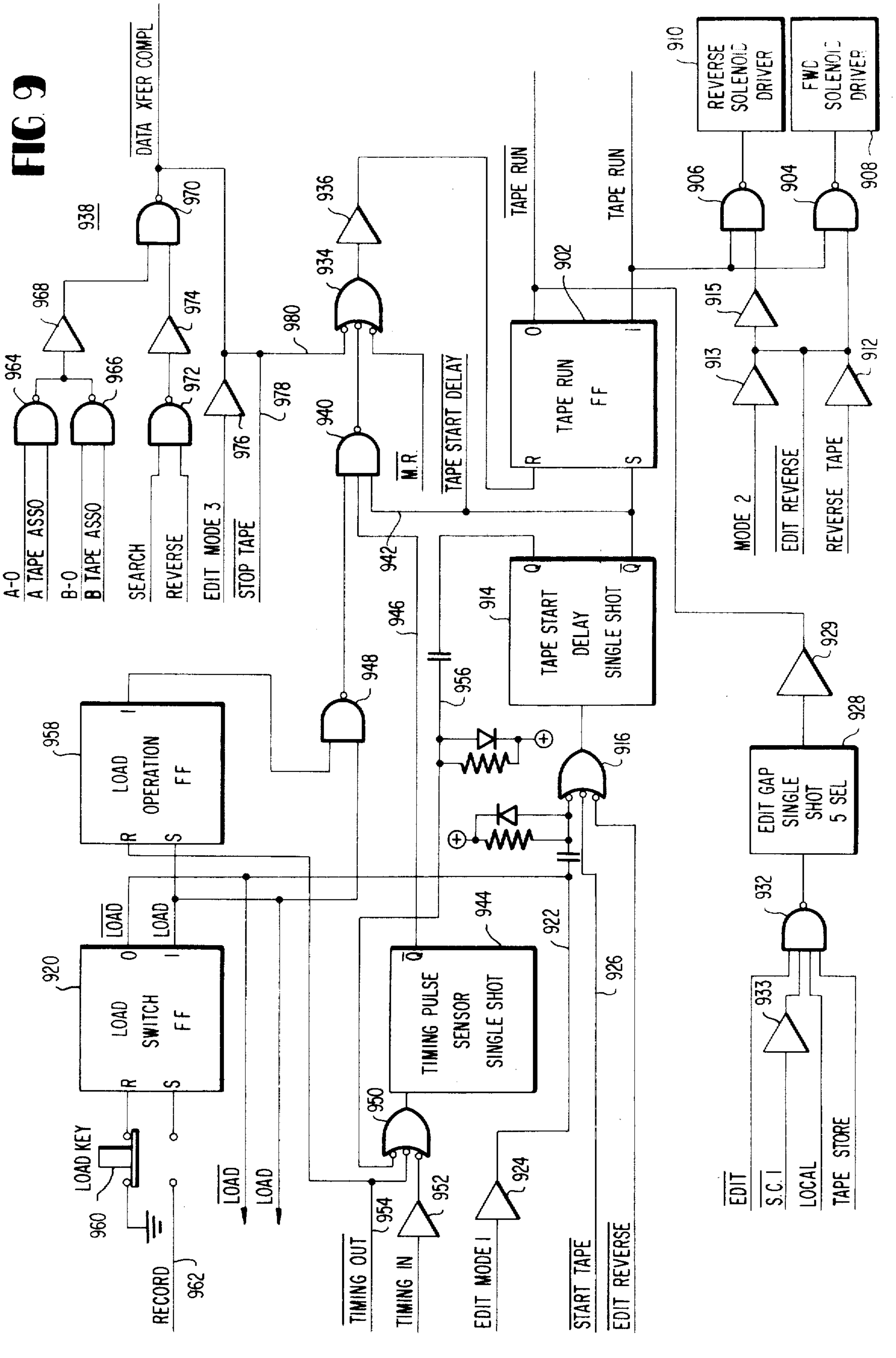
FIG. 9 illustrates the details of the tape memory operation control logic.

FIG. 9 illustrates the details of the construction of tape control logic unit 304.

Control of the on and off conditions of the tape transport mechanism is accomplished by a tape run flip-flop 902, the ONE and ZERO outputs respectively providing the TAPE RUN and $\overline{\text{TAPE RUN}}$ signals for use elsewhere in the system. The TAPE RUN signal also provides inputs to a pair of NAND gates 904 and 906, the outputs of which are respectively connected to forward and reverse drivers 908 and 910 for the tape transport. The other input for NAND gate 904 is provided by the OR-tied combination of the $\overline{\text{EDIT REVERSE}}$ signal, the TAPE REVERSE signal coupled through an inverter 912, and the MODE 2 signal from edit control unit 301 coupled through an inverter 913. The same three OR-tied signals, coupled through another inverter 915 provide the second input to NAND gate 906.

The set input for flip-flop 902 is provided by the $\overline{Q}$ output of a single shot multivibrator 914 having a suitable delay period, such as 100 milliseconds to allow the tape drive mechanism to attain its normal operating speed (e.g. 15 inches/second) before the record and the playback operations are actually permitted to commerce.

Single shot 914 is triggered by the output of an OR* gate 916, one input to which is AC coupled through an inverter 918 from the ONE output of a load switch flip-flop 920, described below. OR-tied to the input of OR* gate 916 over lead 922 is the output of another inverter 924 which receives the EDIT MODE 1 signal from edit control logic unit 301, described below. Inputs to OR* gate 916 are also provided over lead 996 by the $\overline{\text{START DATA TRANSFER}}$ signal from intermediate memory control unit 222, and by the $\overline{\text{EDIT REVERSE}}$ signal from edit control unit 301.

Thus, whenever tape start delay single shot 914 is triggered, its Q output goes low, causing tape run flip-flop 902 to be set. A like function is accomplished by an edit gap single shot multivibrator 928 having its Q output coupled through an inverter 929, to a set input of tape run flip-flop 902. (This is indicated by a connection to the 0 output — see FIG. 4E.) The triggering period for single shot 928 is about 5 seconds, and allows the tape to run for this period at the end of a message. This creates a gap on the tape for storing an augmented message after an editing operation. Single shot 928 is triggered by a NAND gate 932 which receives LOCAL and TAPE STORE as conditioning signals, and an EOM indication S.C.1 coupled through an inverter 933. An inhibit input, provided by the EDIT signal, thereby preventing creation of another gap at the conclusion of an editing operation.

The reset input for tape run flip-flop 902 is provided by an OR* gate 934 coupled through an inverter 936. The inputs for OR* gate 934 are the M.R. and the DATA TRANSFER COMPLETED, STOP TAPE, and EDIT MODE 3 signals, and the output of a NAND gate 940. The latter receives as its inputs, the OR-tied Q̄ outputs of single shots 914 and 928 over lead 942, the Q̄ output of a 4 millisecond timing pulse sensor single shot 944 over lead 946 and the output of a NAND gate 938.

Timing pulse sensor single shot 944 terminates operation of the tape transport after playback of a data block has been completed. This operation occurs both for forward and reverse operation of the tape, and is of principal importance when the tape is reverse during editing and in the case of a special backspace correction described below. Single shot 944 is triggered by the output of an OR* gate 950 which receives as its inputs, the TIMING IN signal coupled through an inverter 952 representing the timing pulses generated for storage on the tape during record operation, the TIMING OUT signal on lead 954 representing previously stored timing pulses being played out of the tape, and finally, the Q output of tape start delay single shot 914 AC coupled over lead 956. Since single shot 944 remains triggered only for the selected timing period unless the new triggering input is received and therefore must receive timing pulses more frequently than the selected five millisecond triggering period for the Q̄ output of lead 946 to remain low. Thus, if timing pulses, either being generated for tape storage, or playback out of the tape are not received in successive 5 millisecond intervals, the signal on lead 946 goes high and actuates NAND gate 940, and OR* gate 934 to reset the tape run flip-flop.

Note, however, that NAND gate 940 is inhibited if either single shot 914 or 928 is triggered thereby preventing reset of tape run flip-flop 902 during the tape start-up and edit gap intervals.

As noted above, tape start delay single shot 914 prevents the reset of tape run flip-flop 902 for a period of 100 milliseconds, and also triggers single shot 944 through OR* gate 950 at the end of the 100 millisecond delay to prevent reset of flip-flop 902 until the first timing pulse is sensed. Thus, it will be appreciated that if the first timing pulse does not retrigger single shot 944 within 5 milliseconds after the 100 millisecond start-up time is completed, tape run flip-flop 902 will be reset and no data will be played back.

In normal operation, this presents no difficulties since timing pulses are recorded on the timing track 100 milliseconds after the beginning of a recording interval.

However, at the beginning of a tape and in particular between messages, a substantial length of unrecorded tape may exist and the start-up period of 100 milliseconds will be exceeded without timing pulses beging detected. To avoid this, a load circuit is provided. This receives a load key 960, a load switch flip-flop 920 and also a load operation flip-flop 958. The latter is set by the ONE output of load switch flip-flop 920, and is reset by the TIMING OUT signal on lead 954. A double pole momentary contact switch 960 resets flip-flop 920 in its released position, and sets flip-flop 920 when depressed if the RECORD signal on lead 952 is low indicating that record flip-flops 920 and 958 are connected to a NAND gate 948, which is connected as one input to NAND gate 940, previously mentioned.

When flip-flop 920 is set, its 0 output triggers tape start single shot 914 and tape run flip-flop 902. [Load operation flip-flop 958 will have been set by the previous low state of the ONE output of flip-flop 920 and the high value of the set input has no effect.] With flip-flop 920 set, NAND gate 948 operates and its output goes low to inhibit NAND gate 940 thereby preventing reset of tape run flip-flop 902. This condition prevails as long as key 960 is depressed or until load operation flip-flop 958 is reset by the first pulse detected in the timing track.

With load flip-flop 920 reset, the output of NAND gate 948 goes high, reconditioning NAND gate 940. By this time, however, the initial timing pulse will have triggered single shot 944, the output of which goes to low. This, in turn, maintains NAND gate 940 inhibited as long as timing pulses continue to be detected (and for a period of 5 milliseconds thereafter).

Similarly if the EDIT MODE 1 signal goes high, then the resulting low output of inverter 924 triggers single shot 914 and also, due to the cross coupled structure of flip-flop 920 (see FIG. 4E) the latter is also set. Again previously set flip-flop 958 activates NAND gate 948 to inhibit NAND gate 930 until timing pulses are sensed on lead 954, after which flip-flop 958 is reset. Thus, the tape continues to run until timing pulses are encountered.

The DATA XFER COMPLETE signal, forming the third input to OR* gate 934 over lead 980 is provided by the STOP TAPE, and MODE 3 signals, and by the output of the reverse search control circuit 938, all OR-tied together. Circuit 938 includes a pair of NAND gates 964 and 966 respectively receiving as inputs the A–O and A-TAPE ASSOCIATED signals and the B–O and B-TAPE ASSOCIATED signals from intermediate memory control unit 222. The outputs of NAND gates 964 and 966 are OR-tied through an inverter 968 as ONE input to a further NAND gate 970 which receives as its second input, the output of a further NAND gate 972 through an inverter 974. NAND gate 972 receives as its inputs the SEARCH and REVERSE signals whereby NAND gate 970 is actuated if the reverse search is in progress, and the intermediate memory then associated with the tape memory reaches its zero address as explained below. Under such circumstances, transfer of a block of data from the tape to one of the intermediate memories has been completed and tape run flip-flop 902 may be reset.

As explained below, the STOP TAPE signal on lead 978 represents the tape stop functions required both during forward search, and in the ordinary record and playback operations indicating that a full block of data has been transferred to or from the tape. The EDIT MODE 3 signal coupled through inverter 976 assures that the tape can not run while this edit mode is in progress.

Intermediate Memory and Its Control

Figures 10, 12:
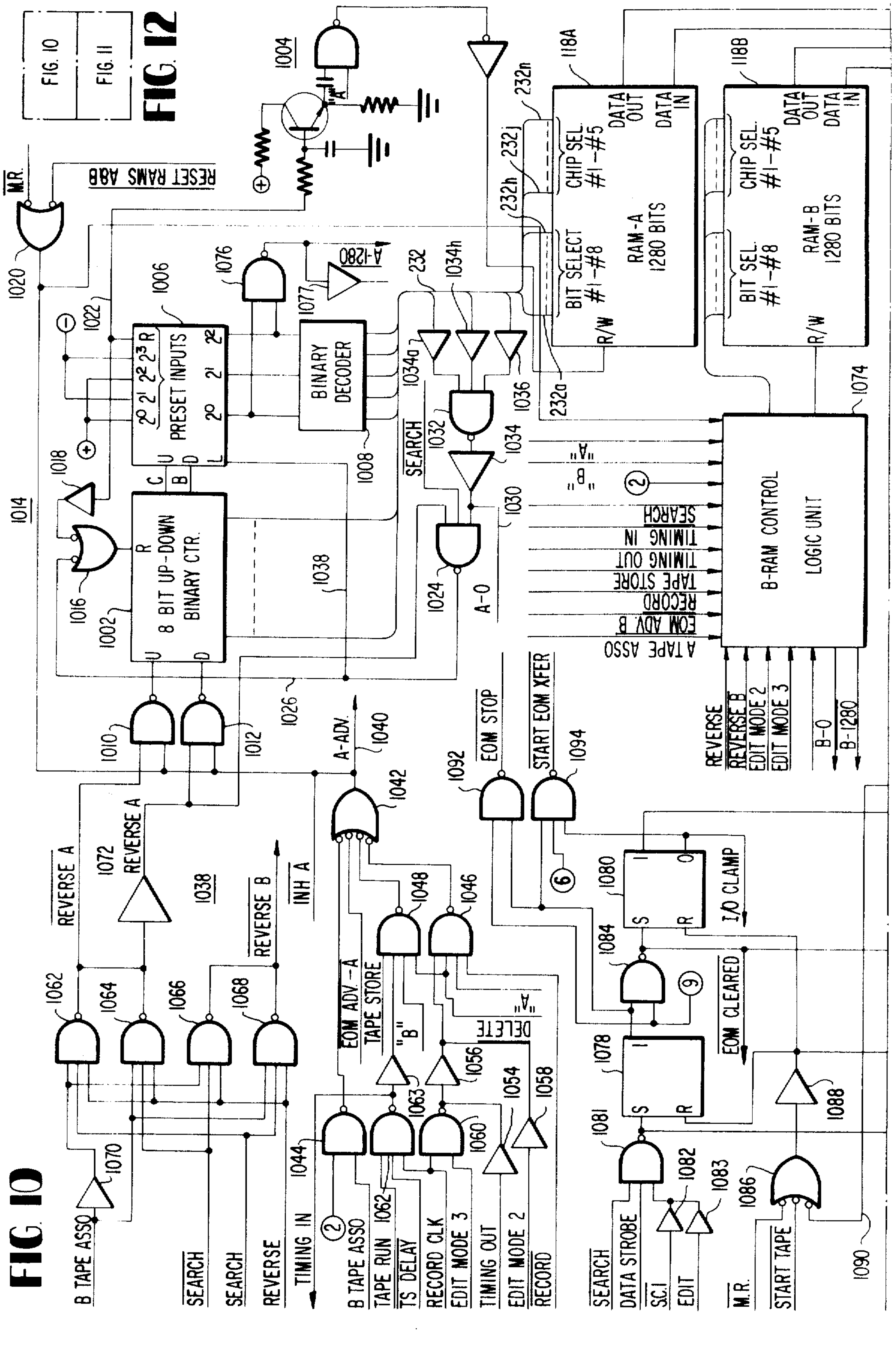
FIGS. 10 and 11, arranged as shown in FIG. 12, illustrate the construction of the intermedite memory and associated control logic, together with part of the data format control logic.
Figure 11:
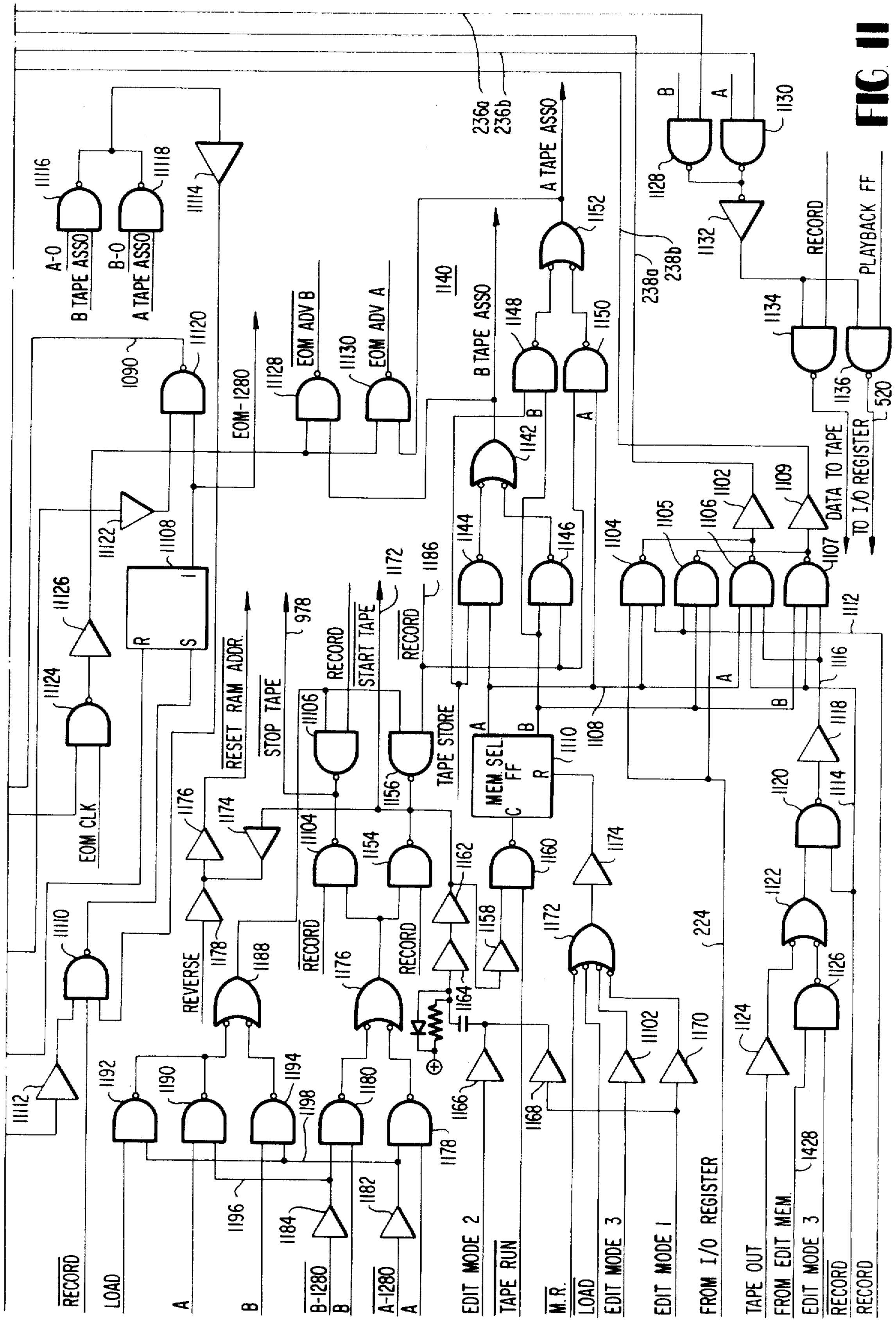

FIGS. 10 and 11 arranged as shown in FIG. 12 illustrate the intermediate memory units 118A and B, and the memory selection and control unit 222.

As described in our parent application Ser. No. 203,245, a particularly advantageous intermediate memory construction includes a pair of integrated circuit random access memories (RAM's), formed of inter-connected RAM subunits, such as Model 1101 256 bit memory units manufactured by Intel Corporation, Mountain View, Calif. For each memory, five such units are connected together providing a total bit capacity of 1,280 bits. Each intermediate memory 118A and B is shown as a single block for convenience in FIG. 10.

For each RAM, access to individual memory sites is controlled by an eight-bit binary address selection pattern provided over eight wires, 232(*a*)–232(*h*), illustrated as part of a multiple wire cable 232. The binary code pattern appearing on leads 232(*a*)–(*h*) is generated by an eight bit up-down binary counter 1002, constructed for example, of a pair of Texas Instruments, Model SN-74193, or the equivalent.

Read/Write control for intermediate memory 118A is provided by a read/write actuating circuit 1004 described in our parent applications. A control signal coupled to the R/W input of RAM 118A is high to actuate the RAM for "write" operation, i.e. to store data, and low otherwise. Data to be stored in RAM 118A is provided at a DATA IN input over lead 238A while data retrieved from RAM 118A in the read mode is provided at a DATA OUT terminal over lead 236A.

Since memory site access for all five subunits in RAM 118A is controlled by the binary signal pattern appearing on leads 232(*a*)–(*h*), simultaneous read or write for five separate memory sites must be prevented. For this purpose each of the RAM subunits includes a chip selection input which actuates the input and output circuitry of that subunit when the associated chip select signal is low. The five chip selection signals generated by a four bit up-down binary counter unit 1006, and a binary decoder circuit 1008, the latter being a logic circuit of any suitable construction to convert a three-bit binary input to a one-of-five output on leads 232(*j*)–(*n*) (shown as part of cable 232).

Counter units 1002 and 1006 each have separate "count up" inputs U, "Count down" inputs D, reset or clear inputs R. Counter 1006 also has a preset or load input L.

Each counter advances at a low to high transition of the U input with the D input maintained high. Down counting is produced by a low to high transition of the D input with the U input held high. The R input is normally held low; a high level forces all of the $2^0$ – $2^3$ outputs to a 0 or low level. The load input L is normally high; a low input presets the counter to the count appearing at a set of preset inputs shown for counter 1006.

Each unit also provides a "carry" ouput of C and a "borrow" output B. The carry output goes to 0 with the next high to low transition of the U input if the output count is binary 1111 (decimal 15) and returns to 1 in response to the succeeding low to high transition, i.e., when the U input returns to 1. Correspondingly, the borrow output goes to 0 with the next high to low transition of the D input if the output count is 0000, and returns to 1 when the D input returns to 1.

The U and D inputs for counter unit 1002 are provided by the outputs of respective NAND gates 1010 and 1012 described below, while the U and D inputs for counter unit 1006 are provided by the respective C and B outputs of unit 1002. Thus, successive count pulses from NAND gate 1010 cause counters 1002 and 1006, together constituting an 11-bit binary register 1014, to store succession of counts up to a maximum of 2,048 ($2^{11}$), the count state being represented by the 11 combined outputs of the register units as indicated above. The count pulses from NAND gate 1012 are employed to count back register 1014 during editing and reverse search as hereinafter explained.

Counter unit 1002 is reset by an OR* gate 1016, the inputs to which are provided through an inverter 1018 by another OR* gate 1020 over lead 1022, and by a NAND gate 1024 over lead 1026. OR* gate 1020 receives as inputs, the $\overline{\text{M.R.}}$ signals, and the RAM ADDRESS RESET signal produced as hereinafter described. The signal on lead 1022 is used directly to reset counter 1006.

NAND gate 1024 receives as its inputs, the $\overline{\text{SEARCH}}$ signal, indicating a search is not in progress, a REVERSE-A signal, and the A-O signal on lead 1030 generated by a NAND gate 1032 coupled through an inverter 1034. NAND gate 1032 is coupled to the eight outputs of counter 1002, through respective inverters 1036(*a*) through 1036(*h*), and the CHIP SELECT signal for the first subunit of RAM 118(A) through inverter 1038 over lead 232(*j*). High outputs of all of inverters 1034(*a*) – 1034(*h*) and 1036 indicates that the first bit position of the first RAM subunit has been selected by address register 1014, i.e., RAM 118(A) is at its rest or zero position.

The output of NAND gate 1024 is also coupled directly over lead 1038 to the load input L of counter 1006. The preset input code for counter 1006 is binary 0101. Since counter 1002 is at count 0 presetting counter 1006 produces a binary count of 010100000000 or 1280 decimal. Further details appear in our parent application Ser. No. 203,245 in connection with the character deletion operation.

The data input for RAM 118A on lead 238A is provided by an inverter 1102, OR-tied to the outputs of a pair of NAND gates 1104 and 1106. NAND gate 1104 receives as its inputs the A memory selection signal over lead 1108 from the Q output of a J-K memory selection flip-flop 1110 hereinafter described, the RECORD signal over lead 1112 from mode selection unit 602 and data output from I/O register 702 over lead 224 (see FIG. 2.) The inputs to NAND gate 1106 are the A signal previously mentioned, the $\overline{\text{RECORD}}$ signal over lead 114 and a serial data signal over lead 1116 provided through an inverter 1118 by a NAND gate 1120.

The inputs to NAND gate 1120 are provided by the $\overline{\text{RECORD}}$ signal, and by the output of an OR* gate 1122. The latter receives the data output from the tape through an inverter 1124, and the output of a further NAND gate 1126. This receives the EDIT MODE 3 signal, and the data output from the edit memory 110.

The data output from RAM 118A on lead 236A is connected to the input of a NAND gate 1128 which receives as an additional input, the B output from memory selection flip-flop 110. The output of NAND gate 1128 is OR-tied to the output of another NAND gate 1130 which receives as inputs, the A selection signal from flip-flop 1110, and the data output from the intermediate memory 118(B). NAND gate 1128 provides data readout from the A memory while the B memory is being filled, while NAND gate 1130 provides data readout from the B memory unit while the A memory is being filled.

The outputs of NAND gates 1128 and 1130 are OR-tied through an inverter 1132, to the inputs of a further pair of NAND gates 1134 and 1136, the second inputs to which are provided by the RECORD and PLAYBACK FLIP-FLOP signals, respectively. NAND gate 1134 provides data for storage on tape over lead 1138. Correspondingly, NAND gate 1136 provides the input for I/O register unit 702 over lead 228.

Referring back to FIG. 10, a logic unit, generally denoted 1038 provides the control inputs for operating A memory address register 1014 in both the "up" and "down" directions. The circuitry for generating the A-ADVANCE signal which actually operates the address register, includes an OR* gate 1042 which receives as its inputs, the $\overline{\text{EOM ADVANCE-A}}$ signal described below, and the outputs of three additional NAND gate 1044, 1046, and 1048. NAND gate 1044 receives the No. 2 output of the sequence control unit 306, and the B-TAPE ASSOCIATED signal, described below. NAND gate 1046 receives as inputs, the $\overline{\text{RECORD}}$, A, and the $\overline{\text{DELETE}}$ signals, and the OR-tied outputs of a pair of inverters 1056 and 1058. Inverter 1058 provides the EDIT MODE 2 signal, while inverter 1056 provides the output of the tape timing track over lead 1052 and inverter 1054, as well as the output of a further NAND gate 1060 which receives the RECORD CLK pulses (see FIG. 6) and the EDIT MODE 3 signal.

NAND gate 1048 receives as its inputs, the $\overline{\text{DELETE}}$ signal, the B signal, the TAPE STORE signal, and the output of a NAND gate 1062 coupled through an inverter 1063. NAND gate 1062 receives the TAPE RUN, $\overline{\text{TAPE START DELAY}}$, and the RECORD CLK signals, and in addition to its function with respect to NAND gate 1048, also provides the TIMING IN signal for storage in the tape timing track during record operation.

As illustrated, the A-ADVANCE signal on lead 1040 is coupled to the inputs of both NAND gates 1010 and 1012 and thus operates register 1014 whether the same is being counted up or down. Determination of the count direction is accomplished by the $\overline{\text{REVERSE-A}}$ signals respectively coupled to NAND gates 1010 and 1012. THE $\overline{\text{REVERSE-A}}$ signal is generated by the OR-tied outputs of a pair of NAND gates 1062 and 1064. NAND gate 1062 receives as inputs, the B-TAPE ASSOCIATED signal coupled through an inverter 1070, the SEARCH signal, and the REVERSE signal. NAND gate 1064 receives as its inputs, the B-TAPE ASSOCIATED signal, the $\overline{\text{SEARCH}}$ signal, and the REVERSE signal. The OR-tied outputs of NAND gates 1062 and 1064 are also coupled through an inverter 1072 to provide the REVERSE-A signal. Thus, when the $\overline{\text{REVERSE-A}}$ signal is low, NAND gate 1010 is inhibited and NAND gate 1012 is actuated through inverter 1072. Correspondingly, when the $\overline{\text{REVERSE-A}}$ signal is high NAND gate 1010 is actuated, and inverter 1012 is inhibited.

A similar circuit comprising a pair of NAND gates 1066 and 1068 provide $\overline{\text{REVERSE-B}}$ signal for use by the B intermediate memory control unit 1074 described below. NAND gate 1066 receives as its input, the B-TAPE ASSOCIATED signal coupled through inverter 1070, the $\overline{\text{SEARCH}}$ signal, and the REVERSE signal. NAND gate 1068 receives as inputs, the B-TAPE ASSOCIATED signal, the SEARCH signal, and the REVERSE signal. The outputs of the two NAND gates are OR-tied together to provide the $\overline{\text{REVERSE-B}}$ signal; an inverter (not shown) provides the signal REVERSE-B.

The second intermediate memory unit 118(B) is identical to intermediate memory unit 118(A), as is the associated control logic unit 1074. For this reason, both units are illustrated as single blocks in FIG. 10 with appropriate inputs and outputs labeled.

Selection of which of memory units 118(A) and (B) is to receive data, is provided by memory selection flip-flop 1110 previously referred to. This is a standard J-K flip-flop wired to provide alternating state transfer (toggling) in response to inputs at the clock or C input. The latter input is provided by a logic circuit including a first pair of NAND gates 1154 and 1146 OR-tied together and connected through an inverter 1158 as one input to a NAND gate 1160. This provides the triggering input for selection flip-flop 1110. The other input to NAND gate 1160 is the $\overline{\text{TAPE RUN}}$ signal from tape control unit 304. Also connected to the junction between NAND gates 1154 and 1156, is the output of an inverter 1162. The EDIT MODE 1 signal coupled through an inverter 1168, and the EDIT MODE 2 signal, coupled through inverter 1166, are OR-tied together, and AC coupled through a further inverter 1164 to the input of inverter 1162.

The OR-tied outputs of NAND gates 1154 and 1156 provide the $\overline{\text{START TAPE}}$ signal over lead 1172. This is coupled to OR* gate 915 (see FIG. 9) to trigger tape start delay single shot 914. The OR-tied $\overline{\text{START-TAPE}}$ signal is also connected through further inverters 1174 and 1176 to provide the $\overline{\text{RESET RAM ADDRESS}}$ signal. This is connected to OR* gate 1020 previously described, and to the comparable OR gate in B RAM control logic unit 1074. To inhibit such reset during reverse operation, a further inverter 1178 couples the REVERSE signal to the junction between inverters 1174 and 1176.

Notice that when the system goes into edit modes 1 or 2, the output of inverter 1162 goes low, thereby starting the tape and resetting the RAM address registers. In addition, when the system enters mode 2, the low level at the junction of NAND gate 1154 and 1156 triggers memory selection flip-flop 1110, but for system entry into mode 1, the triggering operation does not take place because the EDIT MODE 1 signal is simultaneously coupled through inverter 1170, OR gate 1172 and another inverter 1174 to the reset input of flip-flop 1110, thereby maintaining the same in the reset condition with the A output high and B output low.

NAND gate 1154 receives as inputs, the RECORD signal from mode selection unit 302, and the output of an OR* gate 1176. OR* gate 1176 is connected to the output of a NAND gate 1178 which receives as inputs, an $\overline{\text{A-1280}}$ signal coupled through an inverter 1182, and the A signal from memory selection flip-flop 1110, and to the output of a NAND gate 1180 which receives as its inputs, the B signal from memory selection flip-flop 1110, and a $\overline{\text{B-1280}}$ signal, coupled through an inverter 1184.

The $\overline{\text{A-1280}}$ signal is generated by a NAND gate 1076, the inputs for which are provided by the $2^0$ and $2^2$ outputs of counter unit 1006 in A memory address register 1014. As will be understood, when the $2^0$ and $2^2$ outputs of counter 2114 first reach 1 simultaneously, this represents a count of decimal 1,280 — corresponding to the capacity of the memory unit. The direct signal A-1280 is generated by an inverter 1077. The B-1280 signal is similarly generated in control unit 1074. NAND gate 1176 thus operates if the A memory is selected to receive data and the A memory address register 1014 has completed a cycle -- i.e., if the A memory is full. Correspondingly, NAND gate 1180 operates if the B memory address register completes a 1,280 count cycle — i.e., if the B memory is full.

NAND gate 1156 receives as inputs, RECORD signal over lead 1186 and the output of an OR* gate 1188, the inputs to which are provided by three NAND gates 1190, 1192, and 1194. NAND gate 1190 is coupled to the A selection signal from flip-flop 1110, and the B-1280 signal. NAND gate 1192 receives the A-1280 signal and the LOAD signal generated by flip-flop 920 previously described. NAND gate 1194 receives the B signal from memory select flip-flop 1110, and the A-1280 signal.

As mentioned above, memory selection flip-flop 1110 is reset by the inverted output of OR* gate 1172. The latter receives as its inputs, the M.R.signal, the AC coupled LOAD signal and the EDIT MODE 1 and EDIT MODE 3 signals coupled through respective inverters 1170 and 11102. This assures that data is stored in the A memory unit first under normal conditions, and only in the A memory unit for editing.

The control circuit for flip-flop 1110 also includes an additional pair of NAND gates 11104 and 11106. NAND gate 11104 receives as its inputs, the RECORD signal, and the output of OR* gate 1176 previously mentioned. NAND gate 11106 receives as its inputs, the RECORD signal, and the output of OR* gate 1188. The outputs of NAND gates 11104 and 11106 are OR-tied together to provide the STOP TAPE signal over lead 978 the latter being provided as one of the OR-tied inputs over lead 980, OR* gate 934 and inverter 936 to reset the tape run flip-flop 902.

An additional function of the A and B outputs of memory selection flip-flop 1110, is the generation of the A-TAPE ASSOCIATED and B-TAPE ASSOCIATED signals previously mentioned. The purpose of these signals is to indicate when the respective intermediate memory units are either receiving data from the tape, i.e., in a playback mode, or providing data to the tape,i.e., in a record mode. Recalling that flip-flop 1110 is in the A state to indicate that intermediate memory unit 118A is conditioned to receive data, it will be appreciated that the A memory unit is tape associated if flip-flop 1110 is in the A state during playback operation, or if the flip-flop is in the B state during record operation.

To define these conditions, there is provided a pair of NAND gates 1148 and 1150, the former receiving as inputs, the TAPE STORE and B signals, and the latter receiving the RECORD and A signals. The outputs of the two NAND gates are coupled to an OR* gate 1152, the output of which generates the A-TAPE ASSOCIATED signal.

Similarly, to generate the B-TAPE ASSOCIATED signal, there is provided a pair of NAND gates 1144 and 1146, the former receiving as its inputs, the TAPE STORE and A signals, and the latter receiving as inputs, the RECORD, and B signals. The outputs of the two NAND gates are coupled to an OR gate 1142.

The remaining circuitry illustrated in FIGS. 10 and 11 establishes the required data format for storage of the end of message EOM character. Detection of the EOM character terminates playback operation, but with a serial output device, the EOM character must be transferred out through the serial playback circuit 546 before playback is halted. For parallel playback operation this is not necessary since the printer will have by that time processed the EOM character as explained below. For record operation, detection of the EOM character requires transfer of that character into the appropriate one of intermediate memory units 118(A) and 118(B), followed by the transfer of the information in that memory unit to the tape. This is true whether the incoming data is generated remotely or locally, and whether in serial or parellel format.

The circuitry employed to accomplish the foregoing includes three flip-flops 1078, 1080 and 11108. Flip-flop 1078 is set by a NAND gate 1081 which receives as its inputs, the S.C.1 signal, indicating E.O.M. detection as described below, coupled through an inverter 1082, the EDIT signal coupled through another inverter 1083 and the SEARCH and DATA STROBE signals. The EDIT signal functions to inhibit NAND gate 1081, thereby preventing flip-flop 1078 from being set if an EOM is detected during the edit operation.

Flip-flop 1080 is set by a NAND gate 1084 which receives as its inputs, the ONE output of flip-flop 1078, and the 68 count (No.9) output of sequence control unit 306. Flip-flop 11108 is set by a NAND gate 11110 which receives as inputs, the output of a pair of inverters 1112 and 11114, and the RECORD signal. Inverter 11112 is coupled to the output of NAND gate 1080 while inverter 11114 is coupled to the OR-tied outputs of a further pair of NAND gates 11116 and 11118. NAND gate 11116, in turn, receives as its inputs, the A-O and B TAPE ASSOCIATED signals, while the inputs to NAND gates 11118 are provided by the B-O and A TAPE ASSOCIATED signals.

Flip-flops 1079, 1080 and 11108 are all reset by the output of an OR* gate 1086 coupled through an inverter 1088. OR* gate 1086 receives as its inputs the M.R. and START TAPE signals, and the output of a NAND gate 11120. The inputs to NAND gate 11120 are provided by an inverter 11122 coupled to the output of NAND gate 1084 and by the ONE output of flip-flop 11108.

The ONE output of flip-flop 1080, and the EOM CLK signal (see FIG. 6) are coupled to another NAND gate 11124, the output of which is coupled through an inverter 11126 to a further pair of NAND gates 11128 and 11130. The second input to NAND gate 11128 is provided by the B-TAPE ASSOCIATED signal, while the other input to NAND gate 11128 is provided by the A-TAPE ASSOCIATED signal.

The ONE ouput of flip-flop 1078 also provides inputs to a further pair of NAND gates 1092 and 1094. The second inputs to NAND gates 1092 and 1094 are respectively provided by the 68 count (No. 9) signal and the 0 count (No. 6) outputs of the sequence control logic unit. A third input to NAND gate 1094 is provided by the ZERO output of flip-flop 1080.

NAND gate 1092 provides the EOM STOP signal while NAND gate 1094 provides the START EOM XFER signal. The EOM XFER-A and EOM XFER-B signals are provided by NAND gates 11128 and 11130 respectively. The ZERO output of flip-flop 1080 provides the $\overline{\text{I/O CLAMP}}$ signal, while the ONE output of flip-flop 11108 provides the EOM-1280 signal. The $\overline{\text{EOM CLEARED}}$ signal is provided by the output of NAND gate 1084.

Details of the operation of the EOM transfer logic appear in our parent application Ser. No. 203,245, and will not be repeated here.

Editing Operation Control (FIGS. 13-16)

Figure 13:
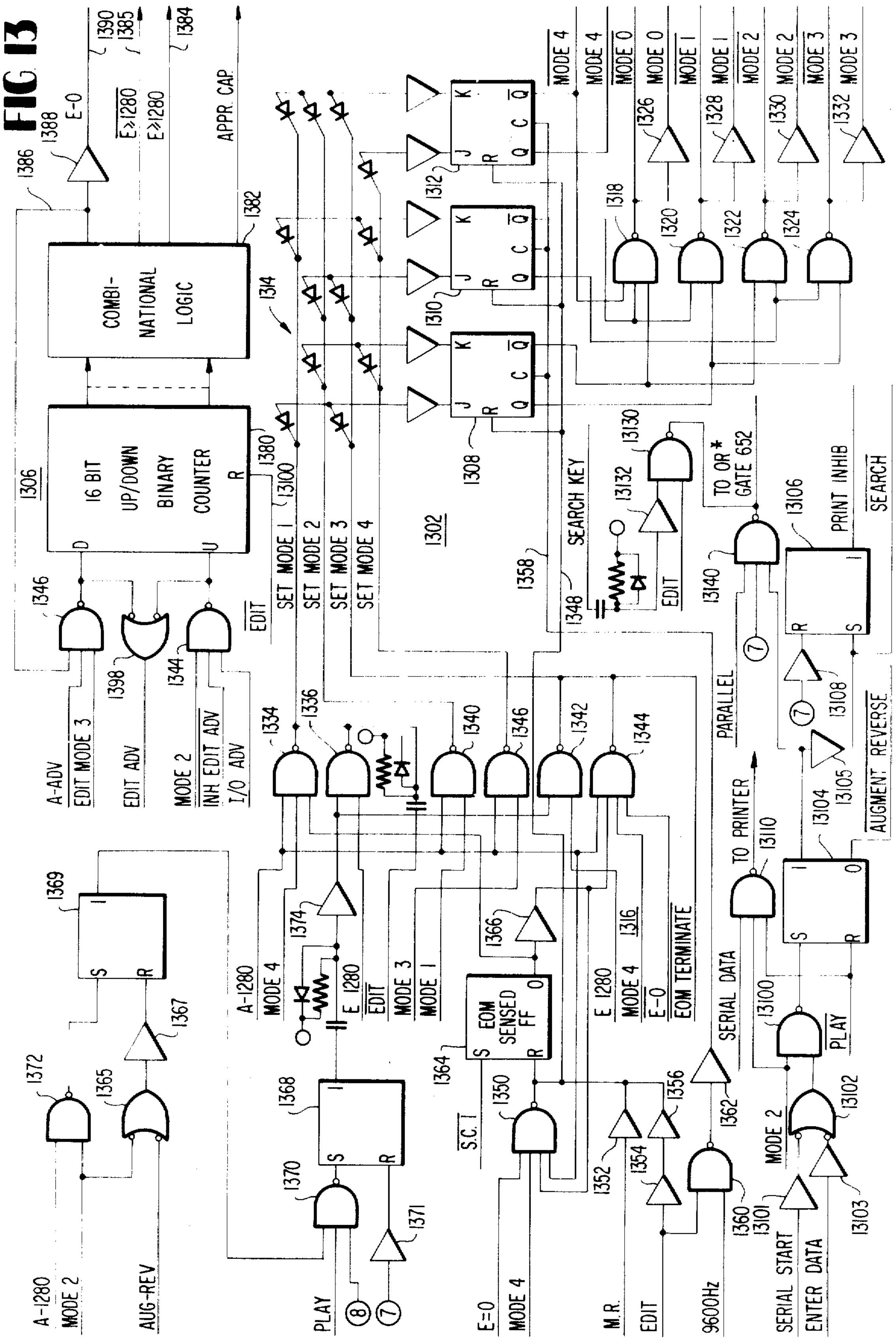
FIGS. 13 – 16 show the details of the edit mode selection logic, the edit control logic, the editing memory, and the ROM control logic.

The circuitry illustrated in FIGS. 13–16 serves to control and implement the editing operations. FIG. 13 shows the edit mode selection and control logic, generally denoted 1302, and a character counter 1306 for editing memory 110.

Referring first to mode selection unit 1302, the operating modes are as follows:

Mode ZERO (Standby) — This mode is selected when the editing operation is not in progress.

Mode ONE (Tape Memory Retrieve) — The tape memory is activated to transfer a complete file or data block to intermediate memory unit 118(A) at the rate of 1,200 characters per second (9,600 Hz.)

Mode TWO (Augment/Delete) — The data file contained in intermediate memory unit 118(A) is transferred to the editing memory and augmentation, deletion, correction, etc., is effected. Data may be transferred automatically, or manually, one character at a time. Data entered in the edit memory is simultaneously printed out for observation by the operator. For deletion, the intermediate memory advances but the data is skipped, i.e. not stored in the editing memory and not printed out. The skip operations include single and multiple character skips allowing deletion of successive characters up to and including the next "space" or carrier return ("Skip Word"), the next "period", "question mark", or "exclamation mark" ("Skip Sentence"), or the next "carrier return" (Skip Line.) Additionally, new characters may be inserted at any desired point by use of the manual keyboard, and the added characters are printed out and stored in the editing memory.

Mode Two terminates when all the data in the intermediate memory unit 118A has been transferred to the editing memory (or discarded as a result of skip operations.) At that time, the system automatically returns to Mode One if the contents of the editing memory is less than the data capacity of the intermediate memory. Otherwise the system automatically switches to Mode Three.

Mode THREE (Return Data to Intermediate Memory) — Here, data is transferred from the editing memory to intermediate memory unit 118A at 1,200 characters per second (1,200 Hz) until the capacity of the latter is reached. If the contents of the editing memory exceeds the capacity of the intermediate memory due to characters added during Mode TWO, the excess is retained, and forms the initial portion of the next data block to be returned to the intermediate memory after the block just entered in the intermediate memory is returned to the tape during Mode Four.

Mode FOUR (Return to Tape) — As suggested above, data transferred to intermedaite memory unit 118A during Mode Three is then returned to the tape during Mode Four at the rate of 1,200 characters per second. Upon completion of this operation, if the EOM character has not been entered into the editing memory, the system automatically returns to Mode One and again cycles through Modes Two, Three and Four. However, if an EOM character appears within the data transferred to the editing memory during the previous Mode Two operation then the system continues to cycle between Modes Three and Four until the entire contents of the editing memory is exhausted, at which time the editing operation stops and the system returns to Mode Zero.

Figure 15:
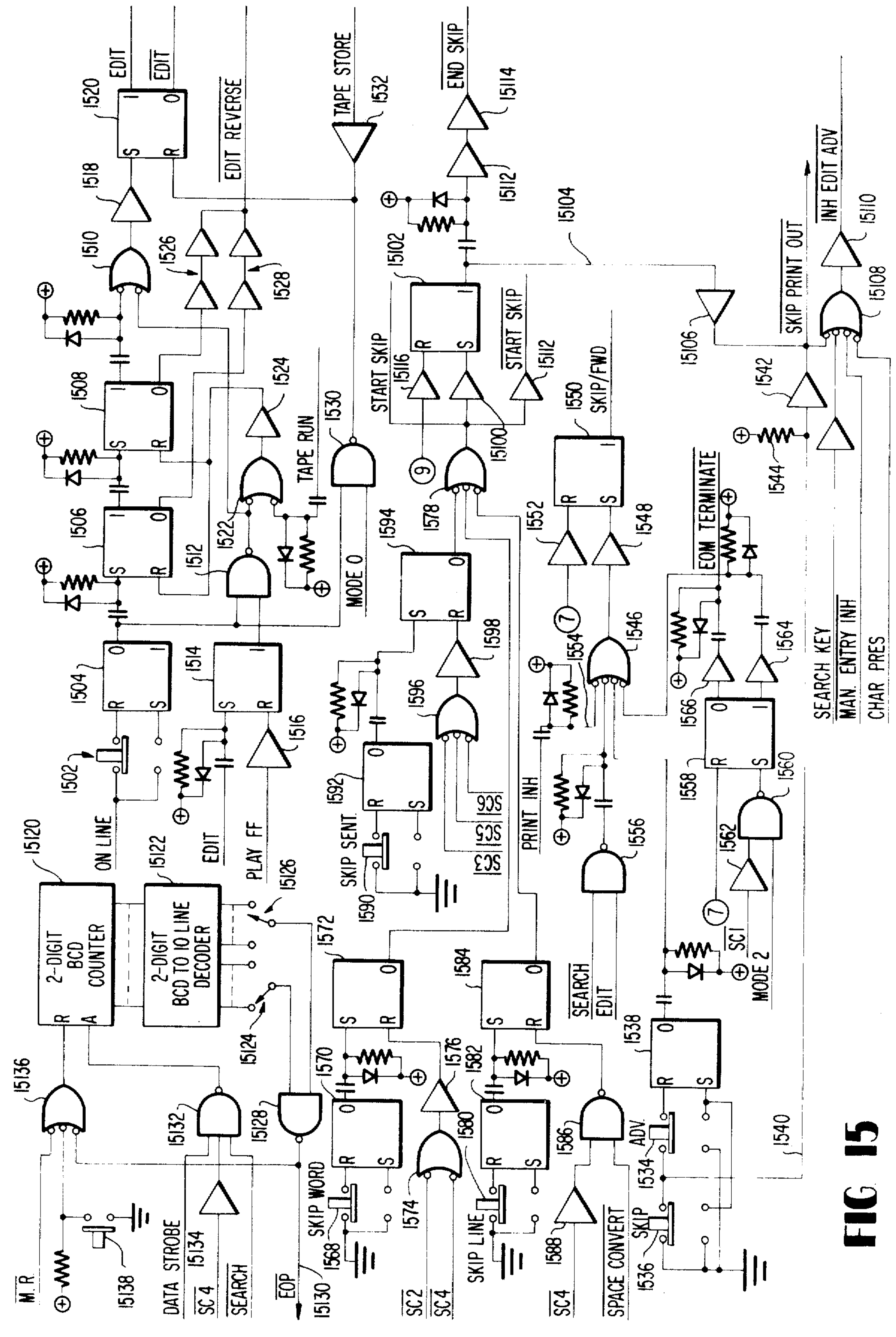

Referring to FIG. 15, initiation of an editing cycle is accomplished by depression of an edit control key 1502. If the system is in the local mode (with the ON LINE signal low) depression of the edit key operates a contact isolation flip-flop 1504, the 0 output of which is A.C. coupled to set another flip-flop 1506. The A.C. coupled 1 output of this, sets another flip-flop 1508, the 1 output of which in turn, is A.C. coupled to an OR* gate 1510.

The other input for OR* gate 1510 is provided by the output of a NAND gate 1512, the latter, in turn, being coupled to the 0 output of flip-flop 1504, and to the 1 output of another flip-flop 1514. The EDIT signal is AC coupled to set flip-flop 1514, while the PLAY flip-flop signal, coupled through an inverter 1516, provides the reset.

The output off OR* gate 1510 is coupled through an inverter 1518 to set another flip-flop 1520, the 1 and 0 outputs of which provide the EDIT and $\overline{\text{EDIT}}$ signals respectively. Reset inputs for flip-flops 1506 and 1508 are provided by an OR* gate 1522 coupled through an inverter 1524. OR* gate 1522 receives as its inputs, the output of NAND gate 1512 previously described, and the A.C. coupled TAPE RUN signal from flip-flop 902 (See FIG. 9). The 0 outputs of flip-flop 1506 and 1508 are connected through respective inverter pairs 1526 and 1528, the outputs which are OR-tied together to produce the $\overline{\text{EDIT REVERSE}}$ signal. Finally, the reset input for flip-flop 1520 is provided by a NAND gate 1530 which receives as outputs, the MODE 0 signal described below and the 0 output of flip-flop 1524. OR-tied to the output of NAND gate 1530 is an inverter 1532 to which is coupled the TAPE STORE from record flip-flop 818 (See FIG. 8).

The purpose of the circuitry described above is to control the position of the tape head in relation to the tape memory at the beginning of an edit operation. As will be recalled from the description of the search operation as set forth above, conclusion of a search operation finds the tape at rest with the heads at the end of the data block following the one containing the search reference characters. This is because the second intermediate memory is automatically loaded from the tape while the intermediate memory containing the reference code is being searched. Thus, in order to initiate an EDIT operation, the tape must be run backward a distance corresponding to two files so that the first "mode 1" of the editing operation will transfer the expected data block into the A-intermediate memory.

On the other hand, consider the possibility of number of editing operations with respect to messages immediately following each other in the principal memory. This could occur, for example, in a case of succession of page length messages, each terminated by an EOM character, perhaps, comprising a longer document such as a report. At the end of such an editing operation, the playback head is located at the end of the last file of the just edited message, rather than two files away as at the end of a typical playback or search operation. Thus, if an editing operation terminates, and a second editing operation begins immediately, it is desired to prevent the double reverse operation of the tape.

Under normal conditions, an edit operation preceded by a search operation, playback flip-flop 842 (FIG. 8) will have been set so the PLAY FLIP-FLOP signal will have been high, resetting flip-flop 1514 through inverter 1516. NAND gate 1512 is thus inhibited, and with the tape not running, the reset inputs for flip-flops 1506 and 1508 are both high.

Initiation of the editing operation, by the depression key 1502, sets flip-flop 1506 through contact isolation flip-flop 1504 and produces a low value for the EDIT REVERSE signal. This initiates a reverse operation of the tape memory through OR* gate 916, inverter 915, etc. With the tape transport in operation, the TAPE RUN signal is high. When the tape has run backward a complete file, the tape stops, and the TAPE RUN signal goes low. This produces a negative going pulse through OR* gate 1522 and inverter 1524 to reset flip-flop 1506. The resulting high to low transition at the 1 output sets flip-flop 1508, making its 0 output low and resulting in generation of a low level for the $\overline{\text{EDIT REVERSE}}$ signal through inverter pair 1526.

When the tape is run backward the distance corresponding to a second data block, the TAPE RUN signal again goes low and resets flip-flop 1508. The resulting high to low transition at the 1 output is coupled through OR* gate 1510 and inverter 1518 to set flip-flop 1520. This produces a high value for the EDIT signal and a low value for the $\overline{\text{EDIT}}$ signal, and represents the actual beginning of the edit operation.

Assume now that an edit operation has just been completed. Edit flip-flop 1520 is then reset (as described below) resulting in a high to low transition of the EDIT signal. This is AC coupled to SET flip-flop 1514 which conditions NAND gate 1512. Then, if EDIT key 1502 is depressed before flip-flop 1514 is reset by a playback opeation as indicated by a high value of the PLAY FLIP-FLOP signal, NAND gate 1512 operates causing flip-flops 1506 and 1508 to remain reset, whereby the $\overline{\text{EDIT REVERSE}}$ signal remains high. At the same time, the output of NAND gate 1512 is coupled through OR* gate 1510 and inverter 1518 again to edit flip-flop 1520. The two tape reverse operations are thus bypassed.

Referring back to FIG. 13, the circuitry for advancing the system through the succession of editing modes compries a three bit programmable binary counter formed of three J-K flip-flops 1308, 1310, and 1312, with flip-flop 1308 representing the least significant bit. A diode matrix 1314 controlled by a lgoic circuit described below drives the J and K inputs of the flip-flops. The output states of the flip-flop are collected by a suitable logic circuit including NAND gates 1318-1324, and inverters 1326-1332. These provide individual outputs representing count states "zero" through "three". Inverters 1326 through 1332, connected to the outputs of NAND gates 1318 through 1324 respectively provide the direct, i.e., MODE ZERO through MODE THREE signals. The MODE FOUR and $\overline{\text{MODE FOUR}}$ signals are respectively provided by the Q and $\bar{Q}$ outputs of flip-flop 1312.

The Clock or C inputs for flip-flops 1308-1312 are provided in common over lead 1358 by a Nand gate 1360, through an inverter 1362. The clock signal is generated at 9,600 Hz whenever the system is in edit.

Diode matrix 1314 controls the J and K inputs of flip-flops 1308-1312 in response to mode selection signals from a logic circuit 1316. In particular, the SET MODE 1 signal is generated by a pair of NAND gates 1334 and 1336 OR-tied together with the AC coupled EDIT signal, the high to low transition of the latter when flip-flop 1520 is set causes initiation of mode 1 after the double tape reverse (or upon depression of edit key 1502 immediately following completion of an edit operation) as described above.

NAND gate 1334 receives as inputs, the A-1280, and MODE FOUR signals, and the 0 output of an EOM sensed flip-flop 1364. This returns the system to mode one operation at the end of mode four unless the EOM character was stored in the editing memory during a previous mode two. In that case, flip-flop 1364 will have been set, as described below, and the low value of the 0 output will inhibit NAND gate 1334.

NAND gate 1336 receives as inputs, the $\overline{\text{E 1280}}$ signal generated by counter 1306 as described below, and the AC coupled output of flip-flop 1368 coupled through an inverter 1374. Flip-flop 1368 is set by the output of a NAND gate 1370, and reset by the 70 count (NO. 7) output of 88-bit counter 608 through an inverter 1371. NAND gate 1370 receives as inputs the 1 output of another flip-flop 1369, the PLAY signal and the 4 count (NO. 8) output of the 88-bit counter 608. Flip-flop 1369 is set by a NAND gate 1372 coupled the A-1280 and MODE 2 signals, and is reset by and OR* gate 1365 coupled through an inverter 1367, OR* gate 1365 receiving as its inputs, the MODE 2 and $\overline{\text{AUGMENT REVERSE}}$ signals. Flip-flops 1369 is thus reset either at the end of mode 2 (when the MODE 2 signal goes low) or when the $\overline{\text{AUGMENT REVERSE}}$ signal goes low, a function described below in connection with the manual entry operation.

The purpose of the above described construction is to overcome the one character "lag" between transfer of data from the intermediate memory (to the I/O register) and entry in the editing memory by preventing switchover from Mode Two to Mode One (or Mode Three as explained below) while a character remains in the I/O register.

For the latter purpose, the ONE output of flip-flop 1368 is AC coupled through an inverter 1374 as the final inputs to NAND gates 1336 and 1342. Accordingly, when intermediate memory unit reaches a 1,280 count in Mode Two flip-flop 1369 is set. When the next character shift occurs, of if the character then in the I/O register is deleted, the 4 count of the 88-count cycle by which the operation is effected sets flip-flop 1368. When that operation is completed, the 70 count $\overline{\text{(No. 7)}}$ signal resets flip-flop 1368, providing a high pulse through inverter 1374. This activates either NAND gate 1336 or 1342, depending on whether Mode One or Mode Three operation is required, as explained below. Data may be entered from the keyboard before the switchover without setting flip-flop 1368 since the $\overline{\text{AUGMENT REVERSE}}$ and PLAY signals maintain flip-flop 1369, reset during a manual entry sequence, also as described below, whereby NAND gate 1370 is inhibited during that time.

Figure 14:
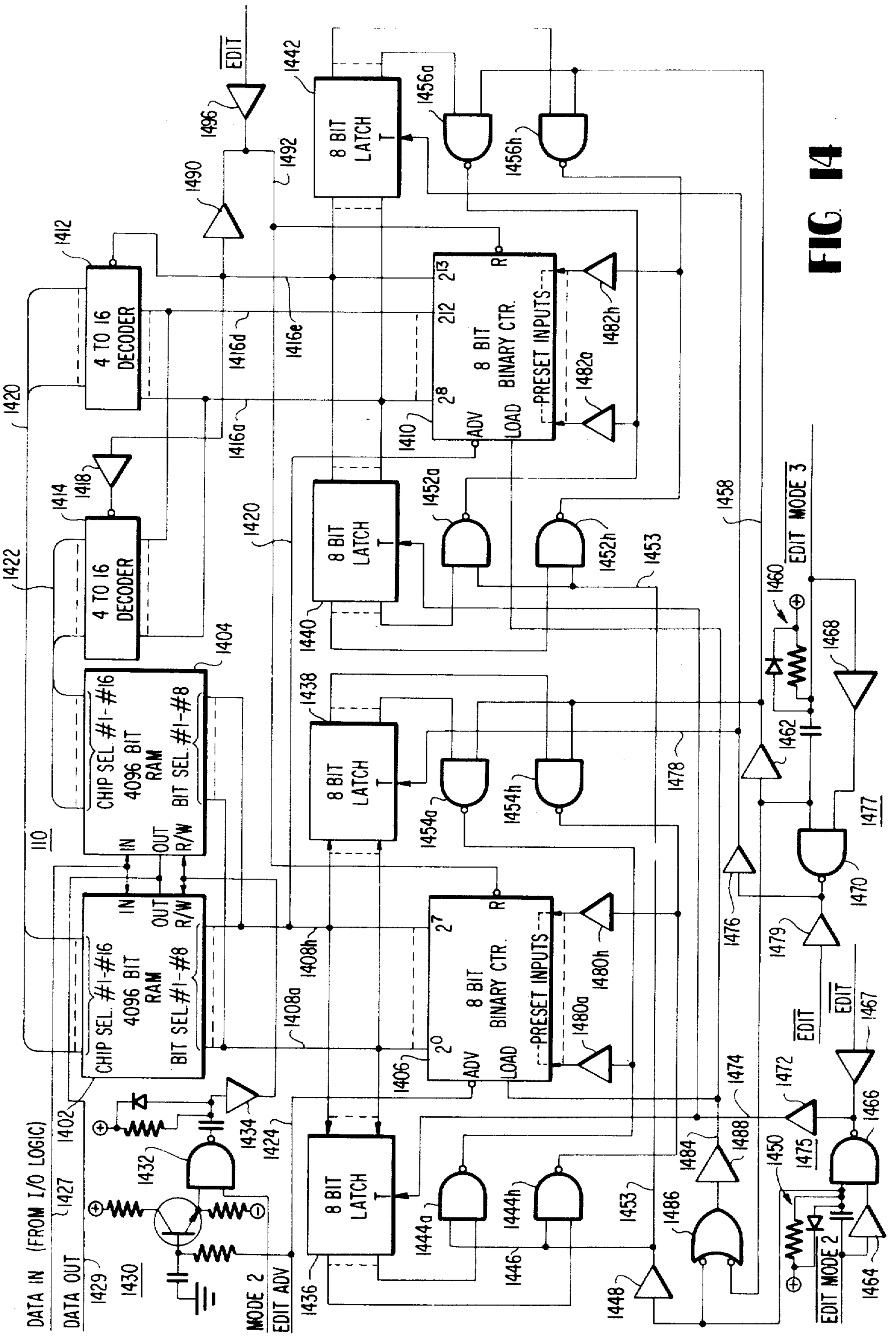

Referring now to FIG. 14, editing memory 110 is comprised of a pair of 4,096-bit random access memory units 1402 and 1404 each comprised of 16 individual random access memory subunits such as the INTEL Type 1101A units used for intermediate memories 118A and 118B. An 8-bit binary coded selection pattern provided by an 8-bit counter 1406 over leads 1408(*a*)–(*h*) selects a particular memory site in all the RAM subunits to which access is obtained. Chip selection signals for activating a particular individual chip or subunit are generated by another 8-bit binary counter 1410. A pair of 4 to 16 line decoders 1412 adn 1414 receive signal inputs over leads 1416(*a*)–(*d*) from the four least significant bits of counter 1410, and gating inputs over lead 1416(*e*), representing the next most significant bit. The gate input for decoder 1412 is provided directly be lead 1416(*e*), while that for decoder 1414 is coupled through an inverter 1418.

The outputs of decoders 1412 adn 1414 are coupled by a pair of 16-wire cables 1420 and 1422 to the chip select inputs of RAM units 1402 and 1404. For decoder units such as Texas Instruments Type SN-74154, a low gate input permits the 4-bit signal input to select the one of 16 outputs high irrespective of signal input.

The state of the signal on lead 1416(*e*) thus selects one of decoders 1412 and 1414 (and consequently, one of RAMS 1402 and 1404) for operation, while the signal pattern on leads 1416(*a*)–(*d*) selects the actual RAM subunit in the selected RAM. Considering the 8-bit capacity of counter 1406 and the effective 5-bit capacity of counter 1410, selection capability of a total $2^{13}$(8192) bits is available. At 8 bits per character, this provides an editing memory capacity of 1,028 characters or about 7 lines on the largest current typewriter, and allows augmentation of a single message by this amount.

The advance input for counter 1406 is provided over lead 1424 by the EDIT ADVANCE signal, described below, while the advance input for counter 1410 is provided by the most significant bit output of counter 1406 on lead 1408(*h*) is in customary fashion.

Incoming data for storage in editing memory 110 are provided in parallel to each of the individual RAM subunits over lead 1429 from the local contact of selection switch 520 (see FIG. 5) while the outputs of all of the RAM subunits are provided over a lead 1429 as one input to NAND gate 1126 (see FIG. 11.) Read-write control for RAM units 1402 and 1404 is provided by a read-write control circuit 1430 essentially like read-write control circuit 1004. This provides a positive pulse through a NAND gate 1432 and inverter 1434 when the former is conditioned by the EDIT MODE 2 signal in coincidence with each EDIT ADVANCE signal.

As will be recalled, a particular memory site is read out or written into prior to advance of the memory address register. This allows the rest count of the register to correspond to the address of the first memory site. Since Counter 1406 and 1410 advance on a high to low transition, actuation of the Read/Write input for the editing memory occurs on the leading edge of each Edit advance signal while the advance of the address register occurs at the trailing edge.

Referring still to FIG. 14, when switching between the four editing modes, it is necessary to retain a record of the next addresses to be written into and read out. For this purpose, there are provided a pair of 9-bit latch circuits 1436 and 1438 associated with counter 1406, and similar pair of 8bit latch circuits 1440 and 1442 associated with counter 1410. Latch circuits 1436 – 1442 are constructed of commercially available elements like those comprising latch unit 724. The data inputs for latch circuits 1436 and 1438 are provided by respective ones of the eight outputs of counter 1406. Similarly, the inputs for latch circuits 1440 and 1442 are provided by respective ones of the outputs of counter 1410.

Latch circuits such as Texas Instruments Type SN-7475 store input data in response to a high to low transition of the control input T, and are cleared when the control input goes high again. The required control signal transitions are provided over leads 1474 and 1478 by gating circuits 1475 and 1477. The former comprises a diode-RC coupling circuit 1450, and inverter 1464, and a NAND gate 1466 or-tied to an inverter 1467. The output is provided by another inverter 1472. The input for circuit 1747 is provided by the $\overline{\text{EDIT MODE 2}}$ signal, coupled to NAND gate 1466 both through coupling circuit 1450 and inverter 1464. Since coupling circuit 1450 is referenced to the positive power supply, as shown, its output goes low only for a brief interval when the $\overline{\text{EDIT MODE 2}}$ signal goes low, i.e., when the system enters Edit Mode Two. Just before that, the output of inverter 1454 is low whereby NAND gate 1466 is inhibited. When the system enters Edit Mode Two, the output of inverter 1454 goes high, but the low output of coupling circuit 1450 continues to inhibit NAND gate 1456 until the capacitor in coupling circuit 1450 returns to its rest level, at which time both inputs to NAND gate 1456 are high. This delays the appearance of the high signal level on lead 1474 until shortly after the system enters Edit Mode Two. When the system leaves Mode Two, NAND gate 1466 is again inhibited, and the signal on lead 1474 again goes low. Latch circuits 1436 and 1440 thus store the count states of counters 1406 and 1410 from the end of Edit Mode Two until shortly after Edit Mode Two begins again.

In addition, because of inverter 1467, the output of NAND gate 1466 is forced low, and correspondingly the signal on lead 1474 is forced high whenever the system is not in EDIT. Under this condition, latch circuits 1436 and 1440 are held open so that they follow the counts contained in counters 1406 and 1410. Since the latter held reset when the sysetm is not in edit by means of an inverter 1496 and lead 1492, it may be seen that the count stored in both latch circuits 1436 and 1440 is 0 at the beginning of an edit operation.

Control circuit 1477 for latch circuit 1438 and 1442 comprises an AC coupling circuit 1460, an inverter 1468, a NAND gate 1470, and inverters 1476 and 1479. This circuit input is the $\overline{\text{EDIT MODE 3}}$ signal; thus the circuit operates precisely like the circuit 1475 except that latch circuits 1438 and 1442 store the count states of counters 1406 and 1410 from the end of Edit Mode Three, until shortly after Edit Mode Three begins again. Like inverter 1467, the $\overline{\text{EDIT}}$ signal coupled through inverter 1479 holds latch circuits 1438 and 1442 at a 0 count when the system is not in edit operation.

The above described delay intervals are to allow counts stored in latch circuits 1436 and 1440 to be preset into counters 1406 and 1410 at the beginning of Edit Mode Two, and correspondingly, to allow the counts contained in latch circuits 1438 and 1442 to be preset into counters 1406 and 1410 at the beginning of Edit Mode Three.

For this purpose, the outputs of latch circuit 1436 are connected to respective ones of eight NAND gates 1444(*a*)–(*h*), control inputs for which are provided over lead 1446 through inverter 1448. This receives as its input, the $\overline{\text{EDIT MODE 2}}$ signal AC coupled through diode-RC circuit 1450. The outputs of the latch circuit 1440 are similarly connected to respective inputs of eight NAND gates 1452(*a*)–(*h*), also controlled by the output of inverter 1448 over lead 1453.

Correspondingly, for latch units 1438 and 1442, the outputs are connected through respective ones of eight NAND gates 1454(*a*)–(*h*) and 1456(*a*)–(*h*) control inputs for which are provided simultaneously over lead 1458 by the $\overline{\text{EDIT MODE 3}}$ signal AC coupled by circuit 1460 to inverter 1462. Because of inverter 1448 and coupling circuit 1450 the signals on leads 1446 and 1453 go high for a brief interval when the system switches into Edit Mode Two. Similarly, because of inverter 1452 and coupling circuit 1460 the signal on lead 1458 goes high for a brief interval following the transition into Edit Mode Three.

During these intervals, the data stored in the latch circuits 1436 or 1438 are coupled respectively through OR-tied NAND gates 1444(*a*)–(*h*) or 1454(*a*)–(*h*) and inverters 1480 (*a*)–(*h*) to the preset inputs of counter 1406. Similarly, the data stored in latch circuits 1440 or 1442 are respectively coupled through NAND gates 1454(*a*)–(*h*) or 1456(*a*)–(*h*) and inverters 1482(*a*)–(*h*) to the present inputs of counter 1410. NAND gates 1444(*a*)–(*h*) and 1452(*a*)–(*h*) operate at the beginning of Edit Mode Two, while NAND gates 1454(*a*)–(*h*) and 1456(*a*)–(*h*) operate at the beginning of Edit Mode Three.

Recalling that data is stored in editing memory 110 during Mode Two and read out during Mode Three, and that a memory site is written into or read out just before the associated address register advances, it may be seen that latch circuits 1436 and 1440 store the address of the next memory site to be written into during the next Edit Mode Two while latch circuit 1438 and 1444 store the address of the next memory site read out during the next Edit Mode Three. This information, when preset into counters 1406 and 1410, allows data to be stored in the next available memory site during the next Mode Two, and permits playback to begin with the first memory site not yet read out during the next Mode Three.

Presetting counters 1406 and 1410 by actuation of the "load" inputs is accomplished over lead 1484 by an OR* gate 1486 coupled through an inverter 1488. The inputs to OR* gate 1486 are provided by AC coupling circuits 1450 and 1460. Since these are the signals that actuate the NAND gates coupling the outputs of the latch circuit counters, it may be seen that whenever one of the groups of NAND gates 1444 and 1452 or 1454 and 1556 are actuated, the load control input for counters 1406 and 1410 are likewise actuated. As will be appreciated, the last address written into and read out of in editing memory 110 continously advances as the message is edited. While the net addition of data to a message can not exceed the number of characters in the editing memroy, it will be appreciated that at some point in the editing cycle a character may be written into the last available memory positions, after which further data must be entered into the beginning of the editing memory. For this reason, and also to permit starting an editing operation at the beginning of the memory, a reset circuit is provided for address counters 1406 and 1410. Functionally, the reset circuit is constructed to follow the count state of counter 1406 and 1410 and to return the counters to zero, i.e., the address of the first memory site, when the capacity of the editing memory is reached. The logic circuitry required to sense the required maximum count, will, of course, depend on the capacity of the memory, and appropriate outputs of the counters selected and combined to provide a control signal at the proper count state can be constructed in an obvious manner.

For the arrangement shown in FIG. 14, with a capacity of $2^{13}$ bits the last address is 8191. The next count, i.e. $2^{13}$ should cause the counters to reset.

The count is easily detected using an inverter 1490 connected to the $2^{13}$ output of counter 1410 on lead 1415(*e*). The output of inverter 1490 is coupled to the reset input of counters 1406 and 1410 over lead 1492, whereby the counters immediately are reset when the count of $2^{13}$ is reached.

Inverter 1490 is OR-tied to the output of another inverter 1496 which receives the EDIT signal whereby the reset signal on lead 1492 is held low when the system is not in the edit mode. This assures that an editing operation always begins with data stored in the first bit position of the editing memory.

Referring back to FIG. 13, memory contents counter logic 1306 provides a running count of the number of bits actually stored in edit memory 110, both to control transfer from one mode to another, and also to alert the operator that the correction capacity for the message is being approached. The circuit comprises a 16-bit up-down binary counter 1380 and a combinational logic circuit 1382 suitably constructed, to combine the counter outputs, and to generate count state indications as required. A high level output E 1280 is provided on lead 1384 whenever the count stored in up-down counter 1380 reaches or exceeds 1,280. The complementary signal $\overline{\text{E 1280}}$ appears on lead 1385. Another output $\overline{\text{E=0}}$ is provided on lead 1386 at a low level whenever the count stored in counter 1380 is equal to zero. The latter is also provided through an inverter 1388 to produce a positive signal E=0 on lead 1390 under the same conditions. A final output on lead 1392, designated APPR. CAP. indicates that the total count is approaching 8,192.

Counter 1380 includes up, down, and reset inputs. The up input is coupled to a NAND gate 1394. This receives as inputs, the I/O ADV. signal from shift register control unit 206, the $\overline{\text{INHIBIT EDIT ADVANCE}}$ signal generated as described below, and the MODE 2 signal provided by inverter 1330. The down input for counter 1358 is provided by and NAND gate 1396 which receives as inputs, the A-ADVANCE signal generated by intermediate memory control logic unit 222, the EDIT MODE 3 signal from inverter 1332, and the $\overline{\text{E=0}}$ output of circuit 1382 over lead 1386. The outputs of both NAND gates 1394 and 1396 are combined by means of an OR* gate 1398 to provide the EDIT ADVANCE signal coupled to edit memory 110 as previously described (see FIG. 14.)

From the above described construction, it may be seen that in Mode Two (with data entering the editing memory) counter 1380 advances, while in Mode Three, with data leaving the editing memory counter 1380 counts down.

Reset for counter 1358 is provided by the EDIT signal on lead 13100 thereby assuring that the counter is reset, indicating no data stored in the editing memory, except during the editing operation.

Referring again to FIG. 15, there is illustrated circuitry for initiating and controlling the various operations required for Edit Mode Two. Initiation of the Single Character Advance and Single Character Skip operations are respectively provided by a pair of double pole momentary contact switches 1534 and 1536 associated with a contact bounce isolation flip-flop 1538. When switches 1534 and 1536 are released, a series connection is provided between ground and the reset input of flip-flop 1538; when either switch is engaged the flip-flop set input is grounded. The junction between the normally closed contact sets of the two switches is connected over lead 1540 through an inverter 1542 to provide the SKIP PRINTOUT signal for utilization by OR* gate 542 (see FIG. 5.) The inverter input is referenced to the positive power supply by a resistor 1544. Thus, with both switches released, or with switch 1536 released and switch 1534 depressed, the output of inverter 1542 is high. However, if switch 1536 is engaged, lead 1540 is decoupled from ground, and resistor 1544 provides a low output for inverter 1542.

The 0 output of flip-flop 1538 is AC coupled through an OR* gate 1546 and an inverter 1548 to set a further flip-flop 1550, the ONE output of which provides the SKIP/FWD signal for utilization by OR* gate 858 previously described. Flip-flop 1550 is reset by the 70 count (No. 7) output of the 88-count cycle of counter 608 coupled through an inverter 1552, and thus remains set for only a single character transfer cycle.

In addition to actuation for the single character skip and advance operations, flip-flop 1550 is set under three additional circumstances, as indicated by the three other inputs to OR* gate 1546. The first of these is the PRINT INHIBIT signal generated by flip-flop 13106 described below and AC coupled over lead 1554. This serves to initiate a single character advance at the end of an edit mode 2 manual data entry sequence. Consider, for example, a single character advance following manual entry. Here, the last character manually entered remains in the I/O register and is actually transferred to the editing memory during the single character advance operation. On the other hand, the operators intention is to advance the single character *following* the last one manually entered and thus a second single character advance must be initiated automatically if the system is to respond as the operators expects.

A similar result is required at the end of an edit search, i.e., the search operation during editing which effectively provides continuous playback until the desired search characters are encountered. From the previous description of the search operation, it will be recalled that recognition of the reference address occurs when the last character of the address appears in bit positions 8-1, i.e., in the I/0 portion of the shift register (the first and second characters respectively appearing in the 24th through 9th bit positions of the shift register.) Because of this, the first two *address* characters will already have been entered into the editing memory from bit position number 8 while the last character remains in the I/0 register. To provide a simple format to the operator, in which edit search results in the system playing until the entire reference code combination has been transferred to the editing memory, it is necessary to initiate automatically a single character advance at the termination of the edit search. This is accomplished by means of a NAND gate 1556 which receives as inputs the SEARCH and EDIT signals. Termination of the edit search results in a high to low transition which is AC coupled through OR* gate 1546 to set flip-flop 1550 and thus initiate the single character advance operation as described above.

The final condition under which a single character advance operation is to be initiated automatically is upon sensing of the EOM character in the I/0 register during edit mode 2. This can occur either as a result of manual entry of the EOM character or if the EOM character is detected during single character advance or continuous playback. In the event that the EOM character is manually entered, the system must respond by automatically transferring the EOM character from the I/0 register to the editing memory, and thereafter transferring the system from MODE TWO to MODE THREE in order to effect return of the edited data from the editing memory to the tape.

The circuitry for generating the required single character advance comprises a flip-flop 1558 which is set by a NAND gate 1560 and reset by the count 70 (No. 7) output of 88 bit couner 608. NAND gate 1560 receives the SC1 signal coupled through an inverter 1562, and the MODE TWO signal. As explained below, a low value of the SC1 signal indicates that the EOM character has been detected in the I/0 register. In the event that this occurs during MODE TWO, flip-flop 1558 is set and its 1 output is connected through an inverter 1563 and AC coupled as the final input to OR* gate 1546. The 0 output of flip-flop 1558 is coupled through an inverter 1566, and thereafter AC-coupled to produce the EOM,TERMINATE signal. As previously mentioned, this constitutes one of the or-tied components of the set MODE THREE signal (see FIG. 13.) As will be appreciated, the EOM TERMINATE signal is a negative going pulse occuring when flip-flop 1558 is reset. This occurs at the end of the single character advance cycle initiated by detection of the EOM signal. Thus, after the EOM character has been transferred to the editing memory, the system switches from mode two to mode three. The final steps of the edit operation i.e., return of the edited data to the tape memory is therefore initiated promptly upon completion of the message being edited without the necessity for cycling any remaining meaningless data out of the intermediate memory. Also, it permits an unwanted remander of a message to be discarded simply by manual depression of end of message key.

The circuitry for controlling the skip word, operation comprises a two-pole momentary contact switch 1568 associated with a contact isolation flip-flop 1570, the 0 output of which is AC coupled to set another flip-flop 1572. This is reset by the SC2 and SC4 signals coupled through an OR* gate 1574 and an inverter 1576. These signals, described more fully below, respectively indicate that a space or carrier return (defining the end of the word being skipped) has been located in the I/0 register. The 0 output of flip-flop 1572 is coupled as one input to an OR* gate 1578, a high output of which indicates a multiple character skip operation to be in progress.

The skip line control circuit comprises a control key 1580 and an associated contact isolation flip-flop 1582. This in turn is AC coupled to set another flip-flop 1584, the 0 output of which is coupled to OR* gate 1578. Flip-flop 1584 is reset by the output of a NAND gate 1586 which receives as outputs, the $\overline{SC4}$ signal coupled through an inverter 1588 and the SPACE CONVERT signal generated as described below in connection with the line length adjustment control circuit. As previously mentioned, the SC4 signal indicates detection of a carrier return in the I/0 register, thus indicating that the end of the line being skipped has been reached. The $\overline{\text{SPACE CONVERT}}$ signal acts as an inhibit control for NAND gate 1586. This signal is low (as described in detail hereinafter) when a space is detected in the unedited message close enough to the end of the line, that proper formatting in the edited message requires conversion to a carrier return. Since the line length adjustment operation proceeds independently of the character skip operations, the unwanted space is converted to a carrier return even as the line skip proceeds. However, since the line to be skipped is a line in the original unedited message, conversion of the space to a carrier return does not indicate that the line in question has been concluded, and the skip operation must proceed irrespective of the fact that a carrier return will be detected in the I/0 register. The low level of the $\overline{\text{SPACE CONVERT}}$ signal indicating that a conversion to a carrier return is about to take place inhibits NAND gate 1586, so detection of the carrier return to be inserted does not reset flip-flop 1586.

The skip sentence control circuit comprises a control key 1590 and a contact isolation flip-flop 1592 AC coupled to set another flip-flop 1594. The 0 output of the latter is coupled to OR* gate 1578, Flip-flop 1594 is reset by an OR* gate 1596 coupled through an inverter 1598. Inputs for OR* gate 1596 are provided by three signals denoted S.C.(3), S.C.(5), and S.C.(6). These signals, described more fully below, indicate termination of the sentence being skipped by a period, question mark, or exclamation point, respectively.

As mentioned above a high output of OR* gate 1578 indicates a multiple character skip operation to be in progress. This signal denoted START SKIP, is coupled through an inverter 15100 to set a flip-flop 15102, the 1 output of which is coupled by lead 15104 and an inverter 15106 to the output of inverter 1542 to provide a low level for the $\overline{\text{SKIP PRINTOUT}}$ signal when one of the skip operations is in progress. The OR-tied outputs of inverters 1542 and 15106 are also coupled as one input to an OR* gate 15108 other inputs to which are provided by the $\overline{\text{SEARCH KEY}}$, $\overline{\text{MANUAL ENTRY INHIBIT}}$ and $\overline{\text{CHARACTER PRESENT}}$ signals. The output of OR* gate 1578 is also coupled through an inverter 15112 to provide the $\overline{\text{START SKIP}}$ signal which sets playback flip-flop 842 (through OR* gate 846, etc.) This actuates the cycle flip-flop 614 generating the $\overline{\text{START PRINTOUT CYCLE}}$ signal through NAND gate 526 when the playback flip-flop is set.

Referring back to flip-flop 15102, the 1 output is A.C. coupled through a pair of series connected inverters 15112 and 15114 to provide the $\overline{\text{END SKIP}}$ signal. Flip-flop 15102 is reset at the count 68 (No. 9) output of 88 bit counter 608 through a further inverter 15116. As will be appreciated, the output of OR* gate 1578 remains high as 'ong as any of flip-flops 1572, 1584 and 1594 are set, indicating a multiple character skip operation to be in progress. During this time, therefore, flip-flop 15102 is held set, and its 1 output is high irrespective of the succession of 68 counts of the character advance cycles of counter 608. As explained below, detection of the various characters by which the $\overline{SC2}$, $\overline{SC3}$, etc., signals are generated occurs at count 70 of each 88 count cycle. Thus, flip-flops 1572, 1584 and 1594 are reset and is not itself reset until count 68 of the subsequent cycle. At that time, the high to low transition of the 1 output is coupled through inverters 15112 and 14114 to produce a high to low transition of the $\overline{\text{END SKIP}}$ signal. As previously described, this resets playback flip-flop 842 and prevents further actuation of cycle flip-flop 614.

The reason for the one cycle delay in resetting flip-flop 15102 can be understood by recognizing that the skip operation is effected by advancing the address of the intermediate memory, and operating the shift register while inhibiting both printout, and storage of date in the editing memory. However, because of the lag between transfer of the character out of the intermediate memory, and its storage in the editing memory (due to the transfer through the I/O register), the last character to be skipped, (i.e., the space for the skipped word operation, etc) is still in the I/0 register when its presence is sensed. To delete this character, the skip operation continues for one additional operating cycle. This is assured by preventing reset of flip-flop 15102 until one character after the last character to be skipped has been sensed.

In addition to deleting the last character to be skipped, the additional data transfer cycle enters the next character to be processed into the I/0 register from the intermediate memory, and permits its immediate utilization as required in the subsequent steps of the editing operation.

Referring now to FIGS. 7 and 16, there is shown the selected character sensing circuitry and control for read only memory 138 which, among its other functions generated the $\overline{SC2}$, $\overline{SC3}$, etc. signals referred to above.

Selection of a particular output address for ROM 138 is controlled by a 4 -bit code appearing on leads 736(*a*)–(*d*). This is provided by the output of a four-bit binary counter 1602 of conventional construction. The counter advance input is provided by the or-tied outputs of five NAND gates 1604-1612 over lead 1614. Reset is provided by the 0 count (No. 6) output of 88-bit counter 608.

NAND gates 1604 and 1612 operate counter 1602 to scan ROM 138 at a rapid rate during certain system operating sequences for which data in the I/0 Register must be compared with that in the ROM, or data from the ROM must be entered in the I/0 Register. The scanning operation is controlled by a 1 megahertz clock 1616, of any suitable construction, which provides one input to all of NAND gates 1604 through 1612.

Referring specifically to NAND gate 1604, additional inputs (beside clock 1616) are provided by the START SKIP signal, and the 68 count (No. 9) output of counter 608. As previously described, the START SKIP signal goes high and remains high throughout the skip operation, i.e., until the particular character signifying termination of the skip has been detected in the I/0 register. NAND gate 1604 is actuated during the 68th count of each transfer cycle and thus, cycles ROM 138 to compare a character just transferred into the I/0 Register with the succession of characters in the ROM.

NAND gate 1606 receives as additional inputs, the $\overline{\text{SELECTED CHARACTER SENSED}}$ signal and the DATA STROBE signal. Since the latter gets high either at count 4 or count 70 of each 88 bit cycle, depending on the system mode of operation, NAND gate 1606 controls scanning of ROM 138 during each data transfer cycle, the scan terminating upon detection of one of the prestored characters, as indicated by the low value of the $\overline{\text{SEL. CHAR. SENSED}}$ signal. Nand gate 1606 serves principally to identify the presence of the EOM character during normal record and playback operations, as well as carrier return for various purposes such as advancing the page length counter and resetting the line length counter as described more fully below.

Remaining NAND gates 1608 through 1612 control the character substitution operations for line length adjustment. These functions are described in more detail below, but for the moment, it may be noted that NAND gates 1608 and 1610 control scanning of ROM 138 to locate the space and carrier return characters, respectively when the position in the line requires a character substitution during the editing operation. NAND gate 1612 operates ROM 138 to identify the character actually in the I/0 Register to determine whether in fact a substitution will be required.

The various character identification operations alluded to above are accomplished not by recognition of the particular code words stored in the ROM, but rather by identification of the ROM address at the time that coincidence is detected between the character in the I/0 Register, and one of the stored characters (or otherwise as in the case of character substitution). Two mechanisms are provided for this purpose. First, there is provided a four to sixteen line decoder 1618 such as Texas Instruments Type SN-74154. This integrated circuit responds to the binary code at the output of counter 1602 and to a low level at the gating input G to provide a low level on the corresponding one of the output leads. For convenient reference, the outputs of decoder 1618 are designated both by the character code stored at the corresponding address of ROM 138, and a "selected character"($\overline{\text{S.C}}$) designation. The output of the decoder corresponding to the 0 count state of counter 1602, and the 0 address of the ROM is the EOM character, ($\overline{\text{S.C.1}}$.) Similary, the output corresponding to the count state 1 represents the character space, and is $\overline{\text{S.C.2}}$. The remaining employed memory positions of ROM 138, corresponding to count state 2–6 of counter 1602, are designated as the $\overline{\text{S.C.3}}$ – $\overline{\text{S.C.6}}$ outputs of decoder 1618. These respectively correspond to the characters period (.), carrier return, question mark (?), and exclamation point (!).

Actuation of the gating input of decoder 1618 is provided by the or-tied outputs of a pair of NAND gates 1620 and 1622. The former receives as its inputs, the 68 count (No. 9) output of 88-bit counter 608, and the SEL. CHAR. SENSED signal provided by 8-bit comparator 734 through an inverter 1624. As noted, the SEL.CHAR. SENSED signal indicates that a match exists between one of the characters stored in ROM 138 and the character in I/0 register 702. Under this condition, decoder 1618 is actuated, and whichever output is low identifies the character then in the shift register.

Since NAND gate 1618 is actuated at count 68, a low output of decoder 1618 will result from a scan of ROM 138 produced either by NAND gate 1604 or 1612, i.e., either as part of the skip or line length adjustment operations.

NAND gate 1622, on the other hand, receives as its inputs, the SELECTED CHARACTER SENSED signal from inverter 1624, and the DATA STROBE signal. Thus, actuation of decoder 1618 by NAND gate 1622 corresponds to a scan of ROM 138 under control of NAND gate 1606 and thus represents a character detected during normal playback and record operations, etc. as described above.

The second mechanism for identifying the state of ROM 138 is a combinational logic circuit generally denoted 1626 which responds directly to the outputs of counter 1602. The circuit comprises four inverters, 1632 through 1638 and a pair of NAND gate 1640 and 1642 connected in an obvious manner to provide a low output on lead 1628 for a count state of 2, and a low signal on lead 1630 for a count state of 4.

Referring again to FIG. 13, as amplified below, the edit search requires establishing a reference search code in the same manner as a normal edit operation. However, because the dit search results in storage in the editing memory of data passing through the I/0 register it will be appreciated that sparious information resulting from use of the I/0 register for establishing the search reference code must not be stored. Accordingly, during edit operation the character present flip flop 638 is set when entry of the search reference code has been completed. For this purpose, there is provided NAND gate 13130 which receives as inputs, the EDIT signal, and the output of an inverter 13132 which receives the AC coupled SEARCH signal. Thus, a high to low transition of the SEARCH KEY signal actuates the NAND gate and set flip flop 638 through OR* gate 652.

Referring still to FIG. 13, during an edit operation, the I/0 register contains the character following that printed out and stored in the editing memory. For Edit Mode Two, manual entry of a character through the external keyboard also requires utilization of the shift register. Because the character to be entered is intended to precede rather than follow the character then in the shift register, a special mechanism is provided to return the character in the shift register to the intermediate memory during manual entry of a first character. This is accomplished by a circuit which senses the beginning of a manual entry operation in Mode Two and causes the address counter for the intermediate memory to count back 8 bit positions. For a serial input, transfer of the character being shifted out of the shift register to the editing memory is inhibited since this is not the desired character. However, for parallel entry the incoming character replaces that previously in the shift register at the beginning of the shift cycle, so the transfer of data from the shift register is pemitted. This allows transfer of the newly entered character into the edit memory. However, since the shift register is now empty, manual or automatic playback of further data from the intermediate memory must be inhibited for one cycle until the shift register is again loaded.

The circuitry for accomplishing these functions includes a NAND gate 13100 which receives as inputs, the MODE 2 signal, and the output of an OR* gate 13102, the latter receiving as inputs, the SERIAL START and ENTER DATA signal, coupled through respective inverters 13101 and 13103. The output of NAND gate 13100 sets a flip-flop 13104, the reset input for which is provided by the PLAY signal. The output of flip-flop 13104 denoted AUGMENT REVERSE, is provided through an AC coupling circuit to set flip-flop 8102, previously described. The 1 output of flip-flop 13104 is coupled byan inverter 13105 to the set input of another flip-flop 13106, the reset input for which is provided by the 70 count (No. 7) output of 88-bit counter 608 through an inverter 13108. The 1 output of flip-flop 13106 constitutes a PRINT INHIBIT signal used in any suitable fashion to inhibit operation of the printer associated with the external keyboard.

The "one" output of flip-flop 13104 is coupled to a NAND gate 13140, or-tied to the output of NAND gate 13130 NAND gate 13140 receives as inputs, the PARALLEL signal and the No. 7 (count 70) output of 88-bit counter 608. Finally, referring to FIG. 8 the 0 output of flip-flop 8102 is coupled through an inverter 8101 to a NAND gate 8103 which also receives the SERIAL signal. NAND gate 8103 produces the MANUAL ENTRY INHIBIT signal.

Considering the operation of the above described circuit, whenever the system is in Edit Mode Two, and the SERIAL START or ENTER DATA signal indicates entry of a character from the external keyboard, flip-flop 13104 is set. This produces a low value for the AUGMENT REVERSE signal, and sets flip-flop 13106 through inverter 13105. The low value of the AUGMENT REVERSE signal flip-flop 8102 and produces a low output across the normally open contacts of reverse key 884 to actuate reverse flip-flop 880. The resulting low level of the 0 output of flip-flop 880. The resulting low level of the 0 output of flip-flop 880 is coupled through OR* gate 888 to count address counter 1014 for intermediate memory unit 118A backward by eight counts in response to the No. 2 output of 88-bit counter 608.

If the manual entry keyboard is serial, the low value of the 0 output of flip-flop 8102, coupled through inverter 8101 and NAND gate 8103 to generate a low value for the MANUAL ENTRY INHIBIT signal, which is coupled through OR* gate 1556 to prevent advance of the editing memory address register.For a parallel entry data source, the MANUAL ENTRY INHIBIT does not go low so the incoming character is transferred to the editing memory. However, when the entry cycle is complete, NAND gate 13140 operates and sets flip-floP 638, thereby indicating the I/0 register to be empty.

The next 4 count for parallel data input generates the DATA STROBE signal since the PARALLEL signal is high, and flip-flop 842 is reset, which operates NAND gate 838 to force the RECORD signal on lead 836 to go high. (The DATA STROBE signal resets flip-flop 638 indicating data is once again present in the I/0 register).

At count 70 the No.7 output of 88-bit counter 608 is also coupled through inverter 8104 to reset flip-flop 8102 thereby causing flip-flop 880 to be reset, and preventing further count back of intermediate memory 118A, even if further characters are provided by the external keyboard. Also with flip-flop 8102 reset, the MANUAL ENTRY INHIBIT signal goes high permitting the editing memory address register again to operate for a serial input. With the PLAY and MODE 2 signals high, NAND gate 13110 couples the serial data input directly to the printer, allowing immediate printout of data being manually entered. A similar arrangement provides direct printout of characters being entered in parallel.

Even though flip-flop 8102 is reset at the end of the first manual entry cycle, flip-flop 13104 remains set as long as the PLAY signal is high. This is the case as long as characters are being manually entered since flip-flop 842 was reset by stop key 862 before manual entry. When a single character advance or reactuation of the playback flip-flop causes the PLAY signal to go low, flip-flop 13104 is reset, and the high to low transition at the 1 output allows flip-flop 13106. The 1 output of flip-flop 13106 is used in any suitable fashion to inhibit actuation of the printer by the output of line flip-flop 548 (or by NAND gate 538 to be reset at count 70 of the next 88-bit cycle. Thus, normal printout is suppressed during the manual entry, and for the first cycle for which data is again transferred into the editing memory under control of the playback start or single character advance keys. This prevents double printing of the character then in the I/0 register, since that character was printed at the time of its entry from the manual keyboard.

Recall that for a parallel entry, count 70 of the cycle for the last character established a set condition for flip-flop 638, indicating the I/0 register to be empty. Thus, with flip-flop 842 again set, a DATA STROBE signal is not generated at count 4 of the first playback or single character advance cycle and flip-flop 638 is not reset. For this cycle, therefore, data is not transferred from the I/0 register in any case, which is necessary since the I/0 register is, in fact, empty. On the other hand at count 70 of the first cycle, NAND gate 646 operates to produce a DATA STROBE signal, which resets flip-flop 638. This permits subsequent playback cycles to proceed normally.

Further,it will be recalled that the AUGMENT REVERSE signal resets flip-flop 1369 at the beginning of a manual entry sequence. As the A-memory address register counts back, the A-1280 signal goes low and inhibits NAND gate 1372. Thus, flip-flop 1369 can not again be set until the last character in the A-memory is again in the I/0 register. This prevents premature transfer out of Mode 2 when the last character in the A-memory is preceeded by one or more manually entered characters.

Referring again to FIG. 15, control of page length, i.e. for playback operation, is accomplished by counting the number of lines as indicated by the sensing of carrier returns. To allow changing sheets of paper, playback is halted after a selected number of lines have been printed. The circuitry for accomplishing this is comprised of a two digit BCD counter 15120 having a pair of four-bit outputs representing the units and tens digits of a two-digit line count. The outputs of counter 15120 is coupled through a BCD to 10 line decoder 15122, to the 10 stationary contacts of each of a pair of selector switches 15124 and 15124 used to select the desired number of lines per page. The moving contacts of switches 15124 and 15126 are coupled to a NAND gate 15128, the output of which provides the end of page indication, designated EOP, on lead 15130.

The advance input for counter 15120 is provided by a NAND gate 15132 which receives as inputs, the SEARCH, DATA STROBE, and S.C.4 signals, the latter coupled through an inverter 15134. As explained, a low value for $\overline{S.C.4}$ indicates detection of a carrier return in the I/0 register. Because substitution or insertion of carrier return as part of the line length adjustment described below occurs during count 68 final determination of the presence of the carrier return is deferred until count 70 of each 88-count cycle during editing. The same count may be used during playback while count 4 is required in parallel data entry for other purposes (such as EOM sensing). The DATA STROBE signal inherently provides selective gating at these times.

Reset for page length counter 15120 is provided by OR* gate 15136 which receives as inputs, the $\overline{EOP}$ signal from lead 1530, the master reset signal $\overline{M.R.}$ Also connected as an input to OR* gate 15136, is a manual switch 15138 arranged to ground the gate input when depressed. As will be appreciated, the master reset input resets counter 15120 at the beginning of system operation, while the EOP signal resets the counter when the desired maximum page length has been typed. Reset key 15138 permits selective manual reset of the counter, e.g., whenever it is desired, for some reason, to type a page shorter than the standard page length.

The remaining circuitry shown in FIG. 16 serves to control the character substitution functions for line length adjustment during the editing operation. As mentioned above, line length adjustment involves substituting a carrier return for a space if the latter is detected within a predetermined number of characters of the end of a line, and substitution of a space for a carrier return if the latter detected more than the predetermined number of characters away from the end of a line.

An exception to the foregoing is in the case of a carrier return designating the end of a paragraph which must be retained irrespective of its position in the line. In that instance, the system is arranged to respond to the presence to either a space for a carrier return to inhibit character substitution for the subsequent character, irrespective of its identity. Thus, if in the original copy, the end of a paragraph is designated by a space followed by a carrier return, or by a pair of carrier returns in succession, the carrier return (or the second carrier return) will not be converted.

Considering the basic character substitution mechanism, it will be appreciated that means are required to determine the position of a particular character in relation to the desired line length. This is accomplished by a simple counter circuit, generally denoted 1644, including a 3-digit BCD counter 1646, a 3-digit BCD to 10 line decoder 1648 and three selector switches, 1650, 1652 and 1654. These switches allow preselection of a desired line length. To simplify use, decoder 1648 and switches 1650 through 1654 wired are preferably so that selection of a particular line length couples the moving switche contact not to the selected count, but to a predetermined count below the desired count, corresponding to the boundary beyond which a space is to be converted to a carrier return.

Advance of line-length counter 1646 is controlled by a NAND gate 1656 which receives its inputs, the $\overline{\text{INHIBIT EDIT ADVANCE}}$ signal generated by inverter 15110 previously described, and 68 count (No.9) output of 88 bit counter 608. Thus, unless advance of the editing memory is inhibited (by a low level of the INHIBIT EDIT ADVANCE signal,) the 68th count of each 8 bit character advance cycle increased the count state of counter 1646 by one count.

Reset of counter 1646 is accomplished by gate 1658 which receives as inputs the EDIT signal, and the output of a NAND gate 1660. This receives as inputs, the 70 count (No.7) output of counter 608, and the $\overline{S.C.4}$ signal coupled through an inverter 1662. Thus, counter 1646 is reset whenever the system is not in edit (i.e. when the EDIT signal is low) or whenever the carrier return character is sensed at count 70 of an operating cycle. As explained below, the character substitution occurs prior to count 70, and thus reset of counter 1646 occurs at the end of a line as edited, i.e. after substitution of a carrier return has been made for an incorrectly located space.

When counter 1646 reaches the predetermined line-length boundary as indicated by the position of switches 1650 through 1654, an NAND gate 1664 operates to set a flip-flop 1666. The flip-flop is reset by the OR* gate 1658 through an inverter 1668, whereby flip-flops 1666 is reset whenever counter 1646 is reset. Thus, it may be seen that the state of flip-flop 1666 indicates whether the number of characters in the line being edited exceeds the preestablished boundary before which a carrier return is converted to a space, and after which, a space is converted to a carrier return. If flip-flop 1666 is set, the boundary has been passed, if flip flop 1666 is reset, the boundary has not been passed.

The 1 and 0 outputs of flip flop 1666 are used to control the character substitution operation. For this purpose, there is provided a further pair of flip flops 1670 and 1672. Flip flop 1670 is set by a NAND gate 1674 which receives as inputs the 1 output of 1666, the EDIT signal, and the $\overline{SC2}$ signal coupled through an inverter 1674. Conversely, flip flop 1672 is set by a NAND gate 1678 which receives as inputs, the 0 output of flip flop 1666, the EDIT signal, and the $\overline{SC4}$ signal coupled through an inverter 1680. Both flip flops 1670 and 1672 are reset by the 0 count (No. 6) output of 88 bit counter 608 coupled through an inverter 1682. Thus, flip flops 1670 and 1672 are reset for each 88 count cycle irrespective of whether or not an improper character has been detected.

From the foregoing description, it may be seen that if the boundary has not been reached, detection of a carrier return signal sets flip flop 1672. On the other hand, if the boundary has been reached, then detection of a space sets flip flop 1670. As previously pointed out, NAND gate 1612 in conjunction with counter 1602 scans ROM 138 at count 68 of each cycle. NAND gate 1612 receives as its inputs, the 68 count signal, the 1 megahertz clock output, the $\overline{\text{SEL. CHAR SENSED}}$ signal, and the output of an OR* gate 1684 coupled through an inverter 1686.

NAND gates 1608 and 1610 control the selection of the characters to be substituted in the event that one of flip flops 1670 or 1672 has been set. In particular, NAND gate 1608 receives as its inputs, the 1 MHZ clock output, the $\overline{\text{ROM No. 2}}$ signal provided over lead 1628, and the 1 output of flip flop 1672. NAND gate 1610 receives as its inputs, the 1 MHZ clock signal, the $\overline{\text{ROM No. 4}}$ signal provided lover lead 1630 and the 1 output of flip flop 1670.

NAND gate 1608 operates counter 1602 to scan ROM 138 until the space character has been reached as indicated by a low value of the ROM No. 2 signal if flip flop 1672 has been set, whereby space is substituted for an existing carrier return. Conversely, NAND gate 1610 operates counter 1602 to scan ROM 138 until the carrier return character has been located, as indicated by a low level of the ROM No. 4 signal, flip flop 1670 has been set, whereby a carrier return is substituted for an existing space.

Actual character substitution is controlled by means of a further NAND gate 1688 by which is generated the ROM ENTER signal previously described. NAND gate 1688 receives as inputs, the 68 count (No. 9) output of counter 608, the output of OR* gate 1684 previously described, and the output of another OR* gate 1690. The latter, in turn, receives as inputs, the ROM No. 2 and ROM No. 4 signals previously mentioned.

The exact nature of the character substitution operation may best be appreciated from the following functional sequence:

At count 68 of a cycle, NAND gate 1612 is actuated to scan ROM 138 at 1 MHZ. If one of the characters stored in the ROM is detected in the I/0 register, the SELECTED CHAR. SENSED signal goes low, and NAND gate 1620 actuates decoder 1618 to produce an output identifying the ROM address corresponding to the character in the I/0 register. At the same time, the low value of the SELECTED CHAR. SENSED signal inhibits NAND gate 1612 thus terminating the scan.

Assume now that flip flop 1666 is not set, thereby indicating that a carrier return detected in the I/0 register is to be converted to a space. With flip flop 1666 reset, NAND gate 1678 is conditioned, and if in fact carrier return is sensed, then the low value of the SC4 signal coupled through inverter 1680 actuates NAND gate 1678 and sets flip flop 1672. At this moment, counter 1602 is in the 4 state and thus the ROM 2 signal is high. NAND gate 1608 therefore operates to reinitiate the scan of ROM 138 until counter 1602 reaches the 2 state. At that time, the ROM No. 2 signal goes low, inhibiting NAND gate 1608 and preventing further scan.

At the same time, however, with flip flop 1672 set, OR* gate 1684 operates to condition NAND gate 1688. When counter 1602 reaches a count of 2, OR* gate 1609 operates, and completes the conditioning for NAND gate 1688. This produces a negative going pulse for the ROM ENTER signal to actuate the I/0 register and to store the character then accessible from the ROM, i.e. the space. Since detection of the carrier return initiated the above described sequence, it may be seen that the effect has been to substitute a space for the carrier return.

Converse operation results if flip flop 1666 is set, indicating that a detected space is to be converted to a carrier return. Thus, with a flip flop 1666 set, NAND gate 1674 is conditioned and responds to detection of the space character indicated by a low value for the SC2 signal to set flip flop 1670. This actuates NAND gate 1610 and causes ROM 138 to scan until counter 1602 reaches a count of 4. At the time, the ROM No. 4 signal goes low, inhibiting NAND gate 1610 and preventing further scanning. Also, OR* gate 1684, conditioned by the low value of the 0 output of flip flop 1670, and OR* gate 1690, conditioned by the low value of the ROM No. 4 signal, actuate NAND gate 1688 to produce the ROM ENTER signal. This inserts the now accessible carrier return into the I/0 register.

As previously mentioned, an exception to the normal character substitution rules occurs at the end of a paragraph, as indicated by the character succession space carrier return or carrier return - carrier return. Under these circumstances, conversion of the second character (carrier return) is to be inhibited. This function is accomplished by means of a circuit generally denoted 1692 comprising on OR* gate 1694, and an inverter 1696 arranged to set a flip flop 1698 if either a space or a carrier return is detected, i.e. if either the SC2 or SC4 signal goes low. Flip flop 1698 is reset at the 4th count of each operating cycle by the No. 8 output of 88 bit counter 608 coupled through an inverter 16100.

A pair of NAND gates 16102 and 16104 are coupled respectively to the 1 and 0 outputs of flip flop 1698. Additional inputs to NAND gates 16102 and 16104 are provided by the 0 count (No. 6) output of counter 608. The outputs of NAND gates 16102 and 16104 are respectively connected to the set and reset inputs of a flip flop 16106, the 1 output of which is coupled through an inverter 16108 in common to the reset inputs of flip flops 1670 and 1672.

If flip flop 1698 has been set, indicating detection of either space or carrier return NAND gate 16102 operates to set flip flop 16106 at the beginning of the next operating cycle. If neither space nor carrier return is detected, NAND gate 16104 operates to reset flip flop 16106, Thereafter, at count 4 of the new cycle, flip flop 1698 is reset.

If flip flop 16106 has been set then a low signal level is coupled to the reset inputs of flip flops 1670 and 1672 thereby holding both flip flops reset irrespective of the states and NAND gates 1674 and 1678. Thus,any time a space or carrier return is detected during one operating cycle, flip flops 1670 and 1672 are prevented from being set during the next operating cycle. Since the setting of one of these flip flops initiates a character substitution, it may be seen that character substitution during two successive cycles is not permitted.

That the foregoing operation assures retention of a carrier return at the end of a paragraph may be seen from the following:

Assume that a space is encountered at a point beyond the conversion boundary. The circuit described operates to convert this to a carrier return, and of course resets counter 1646 indicating the beginning of a new line. However, because of the operation of circuit 1692, a subsequently encountered carrier return is not converted to a space as it should ordinarily be but is retained unaltered. As a result, the edited message now contains the sequence carrier return - carrier return, rather than the sequence space - carrier return.

On the other hand, assume that above-indicated sequence is encountered before the substitution boundary. In that case, the space is not converted to a carrier return, but is retained, and conversion of the carrier return to a space, as would normally be required by the character position relative to the boundary is inhibited. The edited message therefore retains the original space - carrier return combination, and the paragraph indication is not lost. Correspondingly, as will be appreciated, if the message is again edited, the paragraph designation is still retained at the very worst, the space will be converted to a carrier return resulting in the sequence carrier return - carrier return.

DESCRIPTION OF OPERATION

The overall character of system operation can best be appreciated in terms of a sequence beginning with forward or reverse searches, followed by a representative editing sequence.

Forward Search

To initiate the search, the operator resets record flip-flop 818 by depressing the play key, selects local operation by use of circuit 804, and selects serial or parallel operation as appropriate by use of circuit 816. Search key 840 is then depressed. This forces the $\overline{\text{RECORD}}$ signal on lead 834 to go low, and the RECORD and SEARCH KEY signals to go high.

Next, the operator depresses the succession of keys corresponding to the desired reference characters. For a serial input, the incoming data is coupled through switch 520, and signal shaper circuit 522 to provide the SERIAL START signal or lead 528. With the RECORD signal high, NAND gate 524 couples the incoming data through OR* gate 530 to the input of the shift register. The SERIAL START signal actuates cycle flip-flop 614 through OR* gate 628 to generate a 88-bit cycle for counter 608, the No. 2 output of which operates the shift register to enter the incoming data from the keyboard. Operation of the A- and B-memories is inhibited at this time by the $\overline{\text{INH A}}$ and $\overline{\text{INH B}}$ signals, held low by inverters 660 and 670.

When the PARALLEL signal is low, NAND gate 646 provides the DATA STROBE signal at count 70 of the operating cycle. This actuates NAND gate 8108 to provide the REFERENCE STORE signal through inverter 8130 to actuate latch circuit 724. The first character of the search reference code is then stored in the first eight latch elements.

While still depressing the search key, the second and third search reference characters are entered, pass into the shift register and are stored in latch circuit 724. After the third character has been entered, the 24 bit shift register contains the entire search reference code. The third REFERENCE STORE signal places the entire reference code in the proper bit position of the latch circuit.

The search operation is initiated by releasing search key 840. This permits the RECORD signal to go low, and the $\overline{\text{RECORD}}$ signal to go high, and also couples a negative pulse through inverter 8112 and NAND gate 8114 to set search flip-flop 850 and playback flip-flop 842. With the search flip-flop set, the SEARCH signal goes high, and the $\overline{\text{SEARCH}}$ signal goes low. The former actuates frequency division and selection unit 312 to provide the DATA CLK signal on lead 606 at 38,400 Hz.

With the SEARCH signal low, OR* gate 542 and inverter 544, OR* gate 562, and inverter 560 reset line flip-flop 548 thereby preventing printout of data during the search.

To effect the search the data contained in the intermediate memory units 118A and B is played back at high speed and compared with the stored reference characters, the memory unit to be played out being determined by the state of memory selection flip-flop 1110. Assuming the latter to be in the B state, with the RECORD signal high, NAND gate 1146 and OR* gate 1142 provide the high value for the B-TAPE ASSOCIATED signal. This controls playback of the A memory.

With playback flip-flop 842 set, NAND gate 536 provides the $\overline{\text{START PRINTOUT CYCLE}}$ signal whenever 88-bit counter 608 is in the 0 state. This sets cycle flip-flop 614, which initiates a new 88-count cycle. Thus counter 608 runs continuously when the playback flip-flop is set and provides a succession of data transfer pulses for the intermediate memory and the input/output register.

With the B-TAPE ASSOCIATED signal high, the No. 2 output of counter 608 is provided through NAND gate 1044 and OR* gate 1042 as pulse inputs to NAND gate 1010 and 1012. NAND gates 1062 and 1064 are inhibited by a low value of the REVERSE signal so the $\overline{\text{REVERSE-A}}$ signal is high and the REVERSE-A signal at the output of inverter 1072 is low. NAND gate 1010 is thus conditioned, and address register 1014 advances, i.e., "counts up". With flip-flop 1110 in the *B* state, the output of read/write control circuit 1004 is a constant low level, thus maintaining intermediate memory unit 118A in the read condition.

As address register 1014 advances, the data output of RAM 118A is provided through NAND gate 1128, inverter 1132, and NAND gate 1136 to the input/output of 88-bit counter 608 whereby the data being read out the intermediate memory passes through shift register stages 702–706. During this time, the data stored in latch circuit 724 is compared with the data currently in the shift register by means of comparator circuit 728, and if a match occurs, the SEARCH COINCIDENCE signal is provided on lead 730. If the latter coincides with the DATA STROBE signal (at count 70 of an operating cycle) NAND gate 8124, OR* gate 8120, and inverter 8118 operate to reset search flip-flop 860, and playback flip-flop 842, thereby terminating the search operation.

If the match is not found by the time the entire contents of intermediate memory unit 118A has been played out, NAND gate 1076 generates the $\overline{\text{A-1280}}$ signal, which is coupled through inverter 1182 to NAND gate 1194. This is conditioned by the B signal from memory selection flip-flop 1110 and OR* gate 1188, and NAND gate 1156 operates to produce the $\overline{\text{START TAPE}}$ signal on lead 1172, and the $\overline{\text{RESET RAM ADDRESS}}$ signal through inverters 1174 and 1176. The latter signal is coupled through OR* gate 1020, inverter 1018, and OR* gate 1016 to reset A memory address register for the B memory contained in logic unit 1074.

NAND gate 1156 is coupled through inverter 1158, and NAND gate 1160 to switch memory selection into the A state. NAND gate 1150, and OR* gate 1152 produce a high value for the A-TAPE ASSOCIATED signal which prepares intermediate memory unit 118A to receive a new body of data from the tape.

Operation of the tape transport is initiated by the $\overline{\text{START TAPE}}$ signal on lead 926 by setting tape run flip-flop 902 through OR* gate 916 and tape start delay sinle shot 914. With the system not in reverse, the output of NAND gate 912 is high. This conditions NAND gate 904 which operates forward solenoid drive 908 and the tape commences to run in the forward direction.

As the tape runs, the timing pulse output is provided through inverters 1054 and 1056 to NAND gate 1046. This provides the timing data from the tape through OR* gate 1042 and NAND gate 1010 to advance A memory address register 1014. At the same time, the tape data output is coupled through inverter 1124, OR* gate 1022, NAND gate 1120, inverter 1118, NAND gate 1106, and inverter 1102 to the data input of the A memory unit for storage in successive memory sites as address register 1014 advances.

When intermediate memory unit 118A has reached its capacity, the A-1280 signal is generated by NAND gate 1076 and coupled through inverter 1182 to NAND gate 1178. Since memory selection flip-flop 1110 is in the A state, NAND gate 1178 operates, and provides a signal through OR* gate 1175, and NAND gate 11104 to produce the STOP TAPE signal on lead 978. This is coupled through OR* gate 934 and inverter 936 to reset tape run flip-flop 902, and to deactivate the tape drive.

While the new block of data is being entered in the A memory, the control logic unit 1074 for intermediate memory unit 118B operates as described for the A memory unit to play the B memory contents through the shift register. Again, as this is taking place, the outgoing data is compared with the stored in latch circuit 724. If a match is detected the SEARCH COINCIDENCE signal on lead 730 goes high to terminate the search. If a match is not found in the data contained in the B memory unit by the time all the data has been played out, there is produced the B-1280 signal, which is coupled through inverter 1184 to actuate NAND gate 1190, the latter being conditioned by the A output of memory selection flip-flop 1110. Operation of NAND 1190 produces a signal through OR* gate 1188, and NAND gate 1156 to restart the tape, to reset the RAM address register, and to return memory selection flip-flop 1110 to its B state thereby initiating storage of a new file of data in the B memory unit. The new data stored in the A memory unit is then played out, with the above described operation continuing unitl the search is completed.

Reverse Search

Reverse search is essentially like forward search. To initiate the reverse search, both search key 840 and reverse key 884 are simultaneously depressed. The latter sets reverse flip-flop 880 and since the SERACH KEY signal is high, reverse search flip-flop 882 is set by NAND gate 890. This produces a low value for 0 of the flip-flop which is coupled through OR* gate 888 and 898 as the REVERSE and REVERSE TAPE signals respectively. With reverse search flip-flop 882 set, reverse key 884 may be released if desired, but search key 840 must remain depressed while the search reference characters are entered as in the forward search.

When the reference characters have been entered, search key 840 is released and search flip-flop 850 and playback flip-flop 842 are set as previously described.

With the SEARCH *and* REVERSE signals high, NAND gate 8134 sets search recycle flip-flop 8132. If memory selection flip-flop 1110 is in the B state, setting of flip-flops 842 and 850 initiates the playback cycle for memory unit 118A, just as in the forward search.

If a match is not found between the reference characters and the data stored in the A memory unit, address register 1014 completes its cycle, and the A-1280 signal is generated by NAND gate 1076. This starts the tape, and complements memory selection flip-flop 1110 as previously described, but with the REVERSE signal high, the output of NAND gate 1178 is forced low, and the RESET RAM ADDRESS signal at the output of inverter 1176 remains high. Thus, in reverse search, at the end of a playback cycle, the address registers are not reset as in the case of forward search.

The START TAPE signal sets tape run flip-flop 902 as before, but with the REVERSE TAPE signal high, inverter 912 inhibits NAND gate 904 while inverter 915 conditions NAND gate 906, and the TAPE RUN signal operates reverse solenoid driver 910 to run the tape backward rather than in its normal forward direction. Referring to FIG. 11, it may be appreciated that with the tape running backward, the data is played out of the tape in reverse order, i.e., the last bit of a 1,280-bit file is retrieved from the tape first followed by the next to last bit, etc. This data is coupled through inverter 1124, OR* gate 1122, and NAND gate 1120, inverter 1118, NAND gate 1106, and inverter 1102 to the data input of intermediate memory unit 118A.

As in a forward search, timing signals are coupled through inverters 1054 and 1056, NAND gate 1046, and OR* gate 1042 to the inputs of NAND gates 1010 and 1012. At this time, however, with the B-TAPE ASSOCIATED signal low, the output of inverter 1070 is high, as are the SEARCH and REVERSE signals. Thus NAND gate 1062 operates, making the REVERSE-A signal low, and the REVERSE-A signal at the output of inverter 1072 high. This inhibits NAND gate 1010 and actuates NAND gate 1012 whereby the timing pulses count A memory address register 1014 down rather than up. As will be understood, during a previous playback cycle, register 1014 reached a count of 1280, and because the reset was suppressed by inverter 1178, register 1014 remained at a count of 1280 and this is counted down from that point during the next record cycle. Data is thus stored in intermediate memory unit 118A in the reverse of its normal order. Since data is played out of the tape also in the reverse of its normal order, it may be seen that data is stored in the A-RAM with the last bit of the incoming data block in the last memory site, the next to last bit of the data block in the next to last memory site etc. In other words, even though the tape runs backward, data is stored in the intermediate memory unit in its normal order whereby the playback operation and comparison with the search reference characters can be identical for forward and reverse search.

Considering still the transfer of data from the tape to intermediate memory unit 118A, it will be appreciated that when the entire file of data has been transferred from the tape, register 1014 reaches a count of 0. This produces the A-O signal on lead 1030 and since the A memory unit is tape assocaited, NAND gate 964, inverter 968, NAND gate 970, OR* gate 934 and inverter 936 operate to reset tape run flip-flop 902. The tape, of course, comes to reset with the tape head at the beginning of the file entered in the A memory unit rather than at the end of the file as in the case of a forward search.

The search proceeds in a manner described above, with the tape running backward, and data correspondingly being entered in reverse order in the intermediate memories, and thereafter played out in normal forward order for search comparison unit the search coincidence is achieved. At that time, NAND gate 8124, OR* gate 8120, and inverter 8114 reset search flip-flop 860, and plyback flip-flop 842 as in the forward search. With flip-flop 860 reset, a high to low transition is AC coupled to reset reverse search flip-flop 882, and the TAPE REVERSE and REVERSE signals at the output of OR* gates 898 and 888 respectively both go low. With the REVERSE signal low, NAND gate 8134 is disabled, and search recycle flip-flop 8132 is reset. The resulting high to low transition is AC coupled through inverter 8140 to NAND gate 8142. This operates since search flip-flop 860 is also reset and the SEARCH signal is high, which causes a signal to be coupled through inverter 8112, and NAND gate 8114 again to set search flip-flop 840, and playback flip-flop 842. The effect, therefore, is to reinitiate the search; however, in this case, because reverse search flip-floP 882 has been reset, the search now proceeds forward.

To understand the final sequence of events, assume that memory selection flip-flop 1110 is in the A state at the time the reverse search is successfully completed. This means that the A-RAM contains the file preceding that containing the desired search reference characters while the B-RAM contains the file actually being sough. When the forward search is reinitiated, the search of the B-RAM halted by the search coincidence resumes, but by the time the next DATA STROBE signal appears, one of the search reference characters will have passed out of the shift register, and the search continues unsuccessfully to the end of the B-RAM. At that time, flip-flop 1110 is switched to the B state and the tape runs forWard. This loads the data file *preceding* the one being soYght into the B-RAM. Concurrently, this same data file (previously stored in the A-RAM) is searched unsucessfuly. Then flip-flop 1110 again switches to the A state and the data file being sought is loaded into the A-RAM while the data file preceding it (then stored in the B-RAM) is searched.

Again the search is unsuccessful, the flip-flop 1110 is sWitched so that the A-RAM is again searched and the next file (i.e., the one following the one being sought) is loaded into the B-RAM. The search, of course, is successful at this time, and the SEARCH COINCIDENCE signal resets both search flip-flop 860 and playback flip-flop 842 thereby again terminating the search with the data file being sought contained in one of the intermediate memories (in this case, the A memory), the next file contained in the B memory, and the tape head resting at the end of the file following the one sought during the search.

Editing Operation

Assume now that a forward or REVERSE SEARCH or a standard playback operation has been utilized to reach a particular location in a stored message beyond which, changes are to be made. To prepare the system for the editing operation, the operator assureS that record flip-flop 818 is reset, that the 'ocal operation is selected, and that baud rate selector switch 812 is in the proper position. For purposes of description, assume that the input/output keyboard printer unit provides and receives data serially.

The editing operation is actually begun by depression of edit key 1502. With the ON-LINE signal low, flip-flops 1504 and 1506 are set producing a low value for the EDIT REVERSE signal through inverter Pair 1528. This is coupled through OR* gate 916 and tape start delay single shot 914 to set tape run flip-flop 902, and through inverter 950 to condition NAND gate 906. Depression of the edit key therefore starts the tape running backward.

The tape continues to run until single shot 914 times out or until timing pulses fail to set single shot 944 for an interval of 5 milliseconds. When the tape stops running, the TAPE RUN signal goes high, and is coupled through OR* gate 1522 and inverter 1524 to reset fiP-flop 1506. The resulting high to low transition of the flip-flop 1 output is AC coupled to set flip-flop 1508. This causes a repetition of the tape reverse cycle, finally resulting in the reset of flip-flop 1508, and the setting of flip-flop 1502 through OR* gate 1510. The tape is thus run backward by two files, rendering the data to be edited accessIble.

With flip-flop 1520, for the EDIT signal is high, and the EDIT signal is low. Notice also, that prior to this the high value of the EDIT signal maintains updown counter 1380 reset, and by means of inverter 1496, holds counters 1406 and 1410 reset. Latches 1436–1442 are also held open at this time by inverters 1467–1479. As a result, the editing memory 110 is prepared to receive data at its first memory site, and contents counter 1306 initially registers a 0 count.

When the EDIT signal goes high, it is AC coupled to the "Set Mode One" line and cooperates with diode matrix 1314 to set edit mode counter 1302 in the Mode One state.

The EDIT MODE 1 signal is coupled through inverter 924, to trigger single shot 914 which sets tape run flip-flop 902 and starts the tape. The EDIT REVERSE signal is high, so NAND gate 904 is conditioned and the tape runs forward as in a normal playback operation.

Referring to FIG. 11, the EDIT MODE 1 signal is also coupled through inverter 1170, OR* gate 1172, and inverter 1174 to reset memory selection fliP-flop 1110 making its A output high and its B output low. Since the RECORD signal is high, NAND gate 1150, and OR* gate 1152 produce a high value for the A-TAPE ASSOCIATED signal while the B-TAPE ASSOCIATED signal output of OR* Gate 1142 is low.

Referring to FIG. 10, as the tape runs, the timing track output is coupled through inverters 1054 and 1056, NAND gate 1046, and OR* gate 1042 and NAND gate 1010 to advance A memory address register 1014. With the A output of filip-flop 1110 high, the read/write control circuit 1004 conditions memory unit 118A to rceive the tape data output provided through inverter 1124, OR* gate 1122, NAND gate 1120, inverter 111, NAND gate 1106, and inverter 1102.

Operation as described above continues until the entire data block has been entered in intermedaite memory unit 118A. At this time, the A-1280 signal is generated. Referring to FIG. 13, with the sys4em still in Mode One, NAND gate 1340 is activated to produce the SET MODE 2 signal which cooperates with matrix 1314 to set counter 1302 in the Mode Two condition. The high to low transition of the EDIT MODE 2 signal is provided through AC coupling circuit 1450, and inverter 1448 to actuate NAND gates 1444(*a*)–(*h*) and NAND gates 1452(*a*)–(*h*). These couple the outputs of latch circuits 1436 and 1440 to the preset inputs of counters 1406 and 1410. At the same time, AC coupling circuit 1450, OR* gate 1486 and inverter 1488 actuate the load control inputs of counters 1406 and 1410 thereby presetting the counters to the counts stored in the latch circuits (i.e. a count of zero for this initial operation.)

Referring to FIG. 6, the SET MODE 2 signal is also coupled through OR gate 652 and inverter 654 to set CHARACTER PRESENT flip-flop 638. The CHAR- ACTER PRESENT signal goes high, and the CHARACTER PRESENT signal goes low. The latter is coupled through OR* gate 542, and 562, and inverters 544 and 560 to reset line flip-flop 548, and is also coupled through OR* gate 1566 an inverter 1568 to produce a low value for the INHIBIT EDIT ADVANCE signal. The latter inhibits operation of NAND gate 1394 as long as character present flip-flop 638 remains set.

Referring to FIG. 11, the EDIT MODE 2 signa' is coupled through inverters 1166, 1164, 1162, and 1168, and NAND gate 1150 to trigger memroy selection flip-flop 1110, switching it to the B state. At the same time, the output of inverter 1162 is coupled over lead 1172 to produce a low value for the START TAPE signal and through inverters 1174 and 1176 to produce a low value for the RESET RAM ADDRESS signal. This resets A memory address register 1014 to 0 through OR* gate 1020, inverter 1018, and OR* gate 1016.

The START TAPE signal actuates tape run flip-flop 902 as before, but with the MODE 2 signal high, inverters 913 and 915 condition NAND gate 906 whereby the tape runs backward. At this time, the tape erase circuit is actuated to the portion of the tape which contained the data now in the intermediate memory unit A. However, it will be recalled that the playback head is located downstream of the record head. Thus, with the tape running backward, the timing pulse are played out before erasure and maintain single shot 944 triggered (and NAND gate 940 inhibited) unit 5 milliseconds after the beginning of the data block has been reached. At that time, tape run flip-flop 902 is reset and the tape comes to rest with the heads at the beginning of the portion of the tape just erased.

At this point the actual editing operation begins. A typical sequence of events would involve starting automatic printout of data contained in intermediate memory unit 118A and simultaneous entry in editing memory 110 until the portion of the data to be edited approaches. To do this, the operator depresses playback start key 959 which sets playback flip-flop 842 through OR* gate 846 and inverter 844. With the playback flip-flop set, the PLAY signal at the output of inverter 854 is high; this is coupled to NAND gate 536 to generate the START PRINTOUT CYCLE signal which in turn is coupled through OR* gate 628 and inverter 630 to set cycle flip-flop 614 and initiate an 88-bit cycle at the data rate determined by baud rate selector 812.

Since memory selection flip-flop 1110 is now in the B state and with the RECORD signal high, a high value for the B-TAPE ASSOCIATED signal is provided by NAND gate 1146 and OR* gate 1142. This conditions NAND gate 1044 which couple the No. 2 output of 88-bit counter 608 through OR* gate 1042 and NAND gate 1010 to advance A memory address register 1014. With the A signal low, the output of read/write control circuit 1004 conditions the A memory unit foR read-out.

Shift register 204 is also actuated by the No. 2 output of counter 608 and thus the data coupled out of intermediate memory unit 118A is provided through NAND gate 1128, inverter 1132, and NAND gate 1136 to the input of I/O register stage 702. The data passes through the I/O register stage, and is coupled through NAND gate 550, and inverter 551, and line flip-flop 548 to the outut printer, and to editing memory 110. Notice, however, that entry into MODE 2 sets flip-flop 638 so the CHARACTER PRESENT signal coupled through OR* gate 542, etc. maintains flip-flop 548 reset during the first shift cycle, i.e., while the shift register is loaded with the first character from the A-Memory.

The I/O ADVANCE signal at the output of OR* gate 714 is coupled to NAND gate 1394 which actuates counter 1380 in the up direction to register the number of bits stored in the editing memory. As counter 1380 advances, the output of OR* gate 1398 is coupled through inverter 1426 to advance the editing memory address register counters 1406 and 1410. At the same time read/write control circuit 1430 is actuated to condition editing memory 110 in the write mode. Thus, the A memory output is stored in the editing memory and concurrently is printed out.

With flip-flop 638 set during the first shift cycle, the CHAR. PRES. signal, and consequetly the INHIBIT EDIT ADVANCE signals are low, and NAND gate 1394 is inhibited. Thus, for the first playback cycle in Mode Two, neither printout, nor storage in the editing memory takes place.

When the operator reaches a point close to the first correction, automatic playback operation is stopped. This is done by depressing stop key 862 which resets playback flip-flop 842 and prevents further generation of the START PRINTOUT signal by NAND gate 536.

Assume now that by reference to original draft, the operator determines that the last character printed in the "new" draft is one character before a character to be deleted. Because of the one character storage lag in I/O register 702, it will be appreciated that the character before the ene to be deleted is already in the shift register. To print this out, and enter it in the editing memory, the operator depresses the advance key 1534. This sets flip-flop 1550 through OR* gate 1546, and the SKIP/FWD signal goes high. This sets cycle flip-flop 614 through OR* gate 628, and actuates 88-bit counter 608, the No. 2 output of which advances the A memory unit, the shift register, and the editing memory eight bit positions thereby printing out the character in the I/O register, entering that character into the editing memory, and advancing the next character from the A memory unit into the I/O register.

Assuming now that the character in the I/O register is to be deleted, the operator depresses skip key 1536. This again sets flip-flop 1550 and initiates a cycle of 88-bit counter 608 exactly as described above. However, at this time, lead 1540 floats, and the output of inverter 1542 goes low producing a low values for the SKIP PRINTOUT and INHIBIT EDIT ADVANCE signals. The SKIP PRINTOUT signal is coupled through OR* gate 542 and inhibits line flip-flop either thereby preventing transfer of the character to be skipped either to the printer, or to the intermediate memory. The INHIBIT EDIT ADVANCE signal is coupled to NAND gate 1394 and prevents advance of counter 1380, and generation of the EDIT ADVANCE signal at the output of OR* gate 1398. This prevents advance of the editing memory during the skip operation. However, the operation of the A memory, and the I/O register are unaffected. Thus the next character from the A memory is transferred into the I/O register, while the character concurrently shifted out is discarded.

Assume now that it is desired to insert several characters in place of the one deleted. To do this, the operator simply strikes the desired keys, and the characters are printed out and entered in the editing memory. To condition the system for this operation, NAND gate 838 is operated by the EDIT MODE 2 signal, and by the high output of inverter 852 (indicating that playback flip-flop 842 is reset). The resulting low output forces the RECORD signal on lead 834 low, and by virtue of inverter 832, forces the RECORD signal on lead 836 high. This conditions NAND gate 524, and the incoming serial data produced by depression of the first of the characters to be entered is coupled from circuit 522 through OR* gate 530 to the input of the I/O register. At the same time, the SERIAL START signal on lead 528 is coupled through inverter 632, OR* gate 628 and inverter 630 to set cycle flip-flop 614 thereby initiating an 88-count data transfer cycle.

The SERIAL START signal is coupled through inverter 13101, and OR* gate 13102 to operate NAND gate 13100 conditioned by the MODE 2 signal. This sets flip-flop 13104 and produces a low value for the AUGMENT REVERSE signal at the flip-flop O output. The high to low transition for AC coupled to set flip-flop 8102 which in turn sets reverse flip-flop 880 by overriding revers key 884. The 0 output of the flip-flop operates OR* gate 888 producing a high value for the REVERSE signal. Recallng tha the B-TAPE associated signal is high, and with a search not in progress, NAND gate 1064 inhibits NAND gate 1010 and actuates NAND gate 1012. Thus, the eight pulses constituting the No. 2 output of counter 608 are coupled through NAND gate 1044, OR* gate 1042 and NAND gate 1012 to count down A memory address register 1014 while the manually entered character is being loaded into I/O register 702. Since flip-flop 1110 is in a B state, read/write control circuit 1004 maintains the A memory in the read condition. Also, because playback flip-flop 842 is reset, its 1 output is low, and NAND gate 1136 is inhibited thereby preventing data transfer from the A memory to the shift register.

For a serial input unit, with flip-flop 8102 set, the MANUAL ENTRY INHIBIT signal is low, as is the INH EDIT ADV signal produced by inverter 15110. This inibits NAND gate 1394 and the first character shifted out of the shift register during manual entry is not entered in the editing memory. Notice also that the incoming character is coupled directly back to the printer mechanism by means of NAND gate 13110 so that the normal one character lag between entry in the shift register and printout is avoided. For this purpose also, normal operation of the printer is inhibited by flip-flop 13106 which is maintained in the set condition by the 1 output of flip-flop 13104.

At count 70 of the 88-count cycle being described, flip-flop 8102 is reset and the MANUAL ENTRY INHIBIT signal again goes high. Also reverse flip-flop 880 is reset, making the REVERSE signal low, but flip-flop 13106 remains set even though a reset input is provided by inverter 13108 since flip-flop 13104 is still set.

When the next character is typed, the incoming data is entered into the shift register as described above, and provided to the printer by means of NAND gate 13110. The normal operation of the printing mechanism is still inhibited by flip-flop 13106 as described above. However, with the MANUAL ENTRY INHIBIT signal high, the INHIBIT EDIT ADVANCE signal is also high, and NAND gate 1394 operates counter 1380 and OR* gate 1398 to enter the character being shifted out of hte I/O register, i.e., the first character manually entered, into the editing memory.

Because the output of NAND gate 838 forces the RECORD signals low, the B-TAPE ASSOCIATED signal too, is forced low and the No. 2 output of counter 608 does not actuate NAND gate 1044 to advance, the A memory address register. This prevents data from being transferred from the A memory into the shift register during the manual entry sequence.

Operation as described above continues until the desired characters have been entered. Advance key 1534 may then be depressed to set flip-flop 1550 for a single character advance, in which case, the SKIP FWD signal is coupled through inverter 856 to inhibit NAND gate 838. This returns the RECORD and RECORD signals respectivley to low and high levels. The lower output of inverter 856 also forces the PLAY signal low, while the PLAY signal at the output of inverter 854 returns high. Similar conditions result if the start key 859 is depressed to initiate continuous playback.

With the PLAY signal low, flip-flop 13104 is reset, and NAND gate 13110 is inhibited, but flip-flop 13106 remains set. Also, with the RECORD signal again high, the B-TAPE ASSOCAITED signal again goes high. Thus, when the SKIP/FWD signal sets cycle flip-flop 614 through OR* gate 628, and initiates and 88-count data transfer cycle, the A memory, the I/O register, and the editing memory all operate and the last manually entered character is loaded into the editing memory. At the same time a new character is transferred from the A memory to the shift register. Since all printout is still inhibited, the last manually entered character (which was printed out simultaneously with its entry in the I/O register) is not printed twice.

When flip-flop 13106 is reset at count 70 of the last mentioned cycle, the resulting high to low transition of the PRINT INH signal generates another single character advance, by setting flip-flop 1550 through OR* gate 1546. This causes the next character from the intermediate memory to be transferred to the editing memory, thus comPleting the operation intended.

Assume now tha it is desired to skip the remainder of the line then being typed. To effect this, the skip line key 1580 is depressed to set flip-flop 1584 and actuate OR* gate 1578. This results in initiation of three separate sequences of events. First, the high level of the output of OR* gate 1578 is coupled through inverter 15100 to set flip-flop 15102, the 1 output of which is coupled through inverter 15106 to produce low values for the SKIP PRINTOUT and INHIBIT EDIT ADVANCE signals. This inhibits printout of data from the I/O register, and advance of the editing memory as described above. Second, the START SKIP signal conditions NAND gate 1604. Finally, the low output of inverter 15112 is coupled by OR* gate 846, and inverter 844 to set playback flip-flop 842, thereby initiating successive 88-count data transfer sequences by means of NAND gate 536 and cycle flip-flop 614.

This operation continues with data being entered in the I/O register from the A memory and thereafter discarded as long as flip-flop 1584 remains set.

The line skip operation continues until a carrier return is detected in the I/O register, indicating the end of the 'ine. For this purpose at count 68 of each 88-count cycle, NAND gate 1604 and counter 1602 scan ROM 138. The characters stored in the ROM are compared with that in the I/O register, and the SELECTED CHARACTER SENSED signal is generated by inverter 746 If any character match is detected. At that time NAND gate 1620 operates decoder 1618 and produces a low signal at one of decoder outputs indicating which of the stored characters has been matched.

The skip operation continues until the carrier return is detected. At that time, the S.C.4 signal goes low and flip-flop 1584 is reset, unless NAND gate 1586 is inhibited by the SPACE CONVERT signal indicating that a space is to be converted to a carrier return, as explained above.

When flip-flop 1584 is reset, the output of OR* gate 1578 goes low, and the low level applied to the SET input of flip-flop 15102 is removed. This allows the flip-flop to be reset at count 68 of the next cycle after detection of the carrier return in the I/O register. In other words, after detection of the desired character, the skip operation continues one additional cycle to delete the last character (carrier return) to be skipped. When flip-flop 15102 is reset, the high to low transition of the END SKIP slgnal Is AC coupled through inverter 15112 and 15114 resetting playback flip-flop 842 and terminating the skip operation.

As will be appreciated, the sequence of events involved in other multiple character skip operations is essentially similar to that described above except termination depends upon detection of different characters.

Throughout all of the mode two operations, the line adjust logic continually inspects the data passing through the I/O register and converts spaces to carrier returns, or carrier returns to space, as required by the number of characters stored in the editing memory since the last stored carrier return. Thus, at count 68 of each 88 count cycle NAND gate 1612 operates counter 1602 and ROM 138 until one of the ROM characters is detected, as indicated by the low level of the SELECTED CHAR. SENSED signal. (If none of the ROM characters is detected, count 68 terminates without the SELECTED CHARACTER SENSED signal ever going low.)

As explained above, as data enteres the editing memory, the count state of counter 1646 increased once for each character. If the line-length selected by switches 1650–1654 is reached, NAND gate 1664 sets flip-flop 1666; otherwise flip-flop 1666 remains reset. In the former case, NAND gate 1674 is conditioned; in the latter case, NAND gate 167 is conditioned. Conditioning of NAND gate 1674 indicates that 1678 space must be converted to a carrier return. Thus, if detection of a space causes the SEL.CHAR.SENSED signal to go low, the S.C.2 output of decoder 1618 will also go 'ow and NAND gate 1674 operates to set flip-flop 1670. Conversely, if flip-flop 1666 is not set, detection of a carrier return requires conversion to a space. In that event, if the SEL.CHAR.SENSED signal is generated as a result of detection of carrier return, the S.C.4 output of decoder 1618 will be low, and NAND gate 1678 operates to set flip-flop 1672. (It will be recalled, however, that logic circuit 1692 operates to inhibit the setting of either flip-flop 1670 or flip-flop 1672 for any character following a space or carrier return. In that case, the reset inputs of flip-flop 1670 and 1672 are held low by the output of inverter 16108.)

With either flip-flop 1670 or 1672 set, OR* gate 1684 operates, and conditions NAND gate 1686, and also inhibits NAND gate 1612 through inverter 1686. Thus, the scannlnG of ROM 138 controlled by NAND gate 1612 stops if either flip-flops 1670 or 1672 is set (indlcating a conversion to be required.)

Assuming flip-flop 1670 to have been set, the one output actuates NAND gate 1610 and advances counter 1602 and ROM 138 until NAND gate 1642 produces a low output, at which time NAND gate 1610 is inhibited. Note that NAND gate 1642 operates when counter 1602 reaches a count of 4, i.e. the ROM address corresponding to the carrier return character. ROM 138 thus is held at the No. 4 address position. At the same time, OR* gate 1690 is operated by the output of NAND gate 1642, and in turn operates NAND gate 1688 to produce a pulse for the ROM ENTER signal. This actuates the I/O register as described above to accept the character then provided at the output of ROM 138, i.e. the carrier return. The latter is therefore substituted for the space character, detection of which resulted in settinG of flip-flop 1670 originally.

Conversely, if flip-flop was set, NAND gate 1608 operates and advances counter 1602 until the output of NAND gate 1640 goes low. At that time, further advance of counter 1602, and ROM 138 is inhibited.

The editing operation involving various combinations of the above described operation proceeds as required until the last character contained in the A memory is transferred to the I/O register. At that time, the A-1280 signal goes high, and NAND gate 1372 operates to set flip-flop 1369. If the next operation is a skip, or manual or automatic play, the PLAY signal At the output of inverter 854 is high, and count 4 of the ensuinG 88-count data transfer cycle, NAND gate 1370 operates to set flip-flop 1368.

If instead, the next operation is a manual entry, processing of the last character in the A memory is delayed. Recalling that the A memory is reversed for the first manual entry, it may be seen that it is no longer "empty". Accordingly, the low level of the AUG.REV. signal is coupled through OR* gate 1365 to reset flip-flop 1369, thereby inhibiting NAND gate 1370. Until the manual entry is completed, and the last character in the intermediate memory is returned to the I/O register, flip-flop 1369 is not again set, and NAND gate 1370 is not again conditioned. Thereafter, a single character advance or continuous playback sets flip-flop 1368, as noted above.

At count 70 of the 88-count cycle during which flip-flop 1368 is set, a RESET signal is provided through inverter 1371 and the high to low transition of the ONE output of the flip-flop is AC coupled through inverter 1374 to condition NAND gates 1336 and 1342.

At this time, the number of characters contained in the editing memory, as indicated by the count state of counter 1380, determines the next event. Assume that because of deletions, the total number of characters in the editing memory is less and 1,280. The E 1280 signal is therefore low, and the E 1280 signal is high. In that case, NAND gate 1336 operates and the system goes out of Edit Mode Two back into Edit Mode One. The high value of the EDIT MODE 2 signal inhibits NAND gate 1466 and the low signal on lead 1474 engages latch circuits 1436 and 1440. This stores the count states from counters 1406 and 1410 corresponding to the next address to be written into for editing memory 110. Also, the low value of the MODE TWO signal resets flip-flop 1369, returning it to its rest state.

The high value of the MODE TWO signal also casues the PLAY signal to go high through NAND gate 858, thus interrupting any operation such as a ship or playback for which the PLAY signal is normally high. Flip-flop 842 is not reset howeVer, With the system back In Mode One, the EDIT MODE 1 signal is coupled through inverter 924, OR* gate 916, and single shot 914 to set tape run flip-flop 902 and start the tape running. It will. however, be recalled that at the beginning of the previous Edit Mode Two, the data stored in the first file being edited as erased and thus the p'ayback head was positioned an entire file away from the data to be played out. To allow the tape drive mechanism to continue running, the output of inverter 924 is coupled over lead 922 to the $\overline{\text{LOAD}}$ output of flip-flop 920. [Recalling the construction of the flip-flop as indicated in FIG. 4(*e*), it may be seen that a low level at the $\overline{\text{LOAD}}$ output (i.e., the 0 output) is coupled back to the set inut forcing the 1 output high.] since flip-flop 958 was set prior to this NAND gate 948 operates to inhibit NAND gate 840, thereby preventing reset of flip-flop 902 when single shot 914 times out. This allows the tape to continue running past the black space caused by the erasure and to engage the beginning of the next file to be edited. Then, when pulses are sensed, flip-flop 958 is reset and NAND gate 948 is inhibited, thereafter permitting reset of tape run flip-flop 902 when the second file is exhausted.

When the A memory is again full, the A-1280 signal is generated, and the system switches back into Operating Mode Two as described previously. Note, however, at this time, that when the system enters Edit Mode Two, the count preset into counters 1406 and 1410 is not 0, but rather the last count stored in latch circuits 1436 and 1440, i.e., the next address in the editing memory available to be written into.

The Edit Mode Two operations described above are again repeated as required until all the characters in the file have been processed. Notice, however, that if processing of the file ended with a skip operation or automatic playback in progress The same is automatically resumed when the system re-enters Mode Two since there is no provision for resetting playback flip-flop 842 during the interim Mode One operation.

Assume now that upon completion of the processing of the second file there is in excess of 1,280 bits in the editing memory. When the count reaches 1,280, the signal on lead 1384 goes high and the operation of inverter 1374 previously described causes NAND gate 1342 rather than NAND gate 1334 to be actuated. This generates the $\overline{\text{SET MODE 3}}$ signal which cooperates with matrix 1314 to place counter 1302 in the "Three" state. The resulting high to low transition of the $\overline{\text{EDIT MODE 3}}$ signal is AC coupled through circuit 1460 and inverter 1462 to operate NAND gates 1454(*a*)–(*h*) and 1456(*a*)–(*h*) thereby tansferring the count state stored in latch circuits 1438 1422 to the preset inputs of counters 1406 and 1410. At the same time, the output of AC coupling circuit 1460 is coupled through OR* gate 1486 and inverter 1488 to actuate the mode control inputs of the counters thereby entering the address of the next memory site to be read out. (For the first Mode Three operation in an edit sequence, it will be appreciated that the count loaded into counters 1406 and 14110 is 0 indicating that the first memory site in the editing memory is to be read out.) Then, when the output of coupling circuit 1460 returns to the high level, NAND gate 1470, and inverter 1476 operate to producea high output on lead 1478, there-by freeing latch circuits 1438 and 1442 to follow the count state of counters 1406 and 1410.

The high value of EDIT MODE 3 signal is coupled through inverter 11102, etc. to reset memory selection flip-flop 1110 and the A output goes high. The EDIT MODE 3 signal also conditions NAND gate 1396, while the low value of the EDIT MODE 2 signal inhibits NAND gate 1394 preparing counter 1380 to count down in response to the A-ADVANCE signals. Further, the EDIT MODE 3 signals conditions NAND gate 1060 to pass the RECORD CLK signals through inverter 1056, NAND gate 1046, and OR* gate 1042 to produce the A-ADVANCE signals on lead 1040. These actuate NAND gate 1010 since the low value of the REVERSE signal inhbits NAND gates 1062 and 1064 thereby producing a high value for the $\overline{\text{REVERSE-A}}$ signal.

The A-ADVANCE signals actuate the address registers fer the A memory and the editIng memory. The former is conditioned to write data by means of circuit 1004, and the latter is conditioned to read by means of circuit 1430. As data is read out of the editing memory, it is coupled through NAND gate 1126, OR* gate 1122, NAND gate 1120, inverter 118, NAND gate 1106, and inverter 1102 to the data input of the A memory and is successIvely stored in the memory sites addressed by address register 1014. This operation continues until 1,280 bits have been stored in the A memory unit. At that time, the A-1280 signal goes high, and NAND Gate 1346 operates to set counter 1302 in the Mode Four state. When the $\overline{\text{EDIT MODE 3}}$ signal goes high, inverter 1468 inhibIts NAND gate 1470. The signal on lead 1478 goes low, and locks into latch circuits 1438 and 1442 the address of the next memory site to be read out during a subsequent Mode Three operation.

The high value of the EDIT MODE 4 signal is coupled through inverter 820 to set record flip-flop 818, thereby produci0g a high value for the TAPE STORE and RECORD signals, and a low value for the $\overline{\text{RECORD}}$ signal. This prepares the system for restorage of the edited data from the A memory back into the tape.

Since memory selection flip-flop 1110 was in the A state during the just described Mode Three Operation, the A-1280 signal generated when the A memory was loaded operates NAND gate 1178, OR* gate 1176, HAND gate 1154, inverter 1158, and NAND gate 1160 to switch flip-flop 1110 to the B state. Also, since the TAPE STORE signal is high, NAND gate 1148 and OR* gate 1152 produce a high value for the A-TAPE ASSOCIATED signal while a low value for the B-TAPE ASSOCIATED signal is produced by OR* gate 1142. The output of NAND gate 1154 also provides the $\overline{\text{START TAPE}}$ signal on lead 1172 and the memory address register reset through inverters 1174 and 1176. With the REVERSE signal low, NAND gates 1062 and 1064 are inhibited, and the $\overline{\text{REVERSE-A}}$ signal is high thus conditioning NAND gate 1010 to advance A memory address register 1014.

The START TAPE signal sets tape run flip-flip 902 as described above, and after the tape start delay, NAND gate 1062, inverter 1063, NAND gate 1048, and OR* gate 1042 provide a sequence of pulses to advance address register 1014 and thereby play out the data from the A memory. This data is coupled through NAND gate 1128, inverter 1132, and NAND gate 1134 for storage on the tape.

Operation as described above continues until the entire contents of the A memory has been played out. At that time, with memory selection flip-flop 1110 still in the B state, NAND gate 1194, and OR* gate 1188, NAND gate and 1106 produce the STOP TAPE signal on lead 978 to reset tape run flip-flop 902.

Referring to FIG. 13, the A-1280 and MODE 4 signals concurrently now condition NAND gates 1334, and 1350 which, if operated, respectively transfer the system to Mode One, three, or Zero, depending on whether any data remains in the editing memory, and whether each data includes the EOM character.

Specifically, if the EOM character was not sensed during a previous MODE 2 sequence, flip-flop 1364 will not have been set. In that case, NAND gate 1334 operates and the system returns to Mode One for retrieval and editing of additional data from the tape. If the EOM character is sensed, the resulting low value for the $\overline{S.C.1}$ signal sets fliP-flop 1364. The low value of the 0 output inhibits NAND gate 1334 so further entry of the system into Mode One is not permitted. With flip-flop 136 set, the output of inverter 1366 conditions NAND gates 1344 and 1350.

If the message is complete and all data remaining in the EOM character is sensed, assume that more than 1280 characters remain in the editIng memory at the end of the Mode 2 during which the EOM is sensed. Then, when the next Mode Four transfer operation is completed da4a still remains in the editing memory. The E-0 signal is thus high and the E-0 signal is low so NAND gate 1350 Is inhibited, while NAND gate 1344 operates to return the system to Mode Three. A Mode Three operation as described above then takes place with the count state in counter 1380 being decreased for each data bit transferred to the A memory.

As many Mode 3 - Mode 4 cycles are repeted as are necessary to empty the editing memory. At that time, the E-0 signal on lead 1386 goes low, and inhibits NAND gate 1396 retaining the count of O in counter 1380. The low level of the $\overline{\text{E-0}}$ signal also inhibits NAND gate 1344 while the complementary E-0 signal conditions NAND gate 1350. Thus, at the end of the Mode Three operation for which the editing memory is empties, the system returns to Mode Four and the last portion of the message including the EOM character is transferred to the tape.

When the A memory is empty at the end of this Mode Four cycle, NAND gate 1350 operates and resets flip-flop 1364 and counter 1302, thereby returning the system to Mode Zero, ie.e, the "rest" or non-editing state. The high level of the MODE 0 signal is coupled through NAND gate 1514 to reset flip-flop 1508 thereby returning the EDIT and $\overline{\text{EDIT}}$ signal to low and high rest values, respectively.

The final operation not described is the edit search. This actually constitutes a normal Edit Mode Two automatic playback operation which continues until a preselected character combinatIon, i.e., a search reference code, is located. Also like the normal automatic Edit playback, the data being searched is stored in the editing memory (rather than ignored as in a normal search) and the automatic line length adjustment operation takes place subsequent to search, but prior to storage in the editing memory.

The edit search is initiated by depressing the search key and entering the selected reference characters while the system is in Edit Mode Two. As in the case of the previously described searches, the incoming characters pass through the shift register, are stored in latch circuit 704. However, because the system is in Mode Two, the SERIAL START or ENTER DATA signal passes through OR* gate 13102 and NAND gate 13100 to set flip flop 13104. This causes the address counter for RAM 118A to run backward 8 counts in the same manner as during the first manual entry operation during edit. The downcounting of the RAM address register occurs during the entry of the first reference code and not thereafter, thus assuring that the character in the shift register prior to initiation of the edit search is not lost. Notice also, that depression of the search key operates OR* Gate 15108 and inverter 15110 to generate the $\overline{\text{INHIBIT EDIT ADVANCE}}$ signal, thereby preventing operation of the Editing Memory while the search reference characters are being entered.

When entry of the search reference characters is complete, the search key is released, and search flip-flop 860 and playback flip-flop 842 are set as in the case of the normal search to initiate the search operation. Since the system is in Mode Two, setting of playback flip-flop 842 produces an operating state indistinguishable to the system from the normal continuous playback sequence. However, since the edit search proceeds rapidly, I.e., at 38,400 Hz as in the case of a normal search, printout is not possible, and thus the low level of the $\overline{\text{SEARCH}}$ signal is used to inhibit printing operations by maintaining flip-flop 13106 set, independent of attempted re-setting by the No. 7 output of counter 608 through inverter 13108. Notice also that release of the search key sets character present flip-flop 638 by operation of NAND gate 13130. Consequently, OR* gate 15108 operates until the character present flip-flop is reset to inhibit operation of the editing memory for one additional cycle, allowing the last one of the three reference characters in the I/0 Register to be cleared before data is transferred from RAM 118A to the editing memory. The first character stored in the editing memory during the edit search is therefore the character last present in the I/0 Register before entry of the search reference characters is commenced.

The continuous playback described above continues through successive cycles of Edit Modes Two, Three, Four, One, TWo, etc. (with inhibited printout) until search coincidence as described above occurs. At this time, flip-flop 860 is reset, terminating the search, and playback flip-flop 842 is reset, terminating the automatic playback. However, when the $\overline{\text{SEARCH}}$ signal goes high, indicating the search to have been completed, NAND gate 1556, and OR* gate 1546 set flip-flop 1550 to initlate the single character advance operation. This results in transfer of the character in the I/0 Register at the time the search was completed in the editing memory. As will be appreciate, this is required to overcome the one character lag introduced between the RAM and the editing memory by the I/0 Register. The system therefore comes to rest with the last of the three reference characters stored in the editing memory, and next character from the intermediate memory already present in the I/0 Register. Normal Edit Mode Two operations may then proceed as desired.

There has been described above, an improved system or editing and otherwise proce-sing data stored in a magnetic tape cassette memory system. Whi'e a preferred embodiment for implementing the described functions has been presented in detail, it should be appreciated that the variations in the system structure and in the implementation of the various logic functions described will be apparent to one skilled in the art in light of the disclosure. For this reason, the description given should be understood to be illustrative rather than restrictive, and the invention is intended to encompass all variations coming within the scope of the claims set forth below.

What is claimed is:

1. Processing means for digital data in the form of multibit character code words comprising: a principal memory having a magnetic tape as the memory medium; input-output means; an intermediate memory having capacity for storing a data block comprising A plurality of code words; an editing memory having capacity for storing a plurality of data blocks substantially less in number than the principal memory and editing operation control means including means to effect transfer from said principal memory to said intermediate memory of a single block of data, means for transferring data from said intermediate memory to said editing memory, first logic means responsive to external commands to control the quantity of data transferred from said intermediate memory, second logic means responsive to external commands transferring data from said intermediate memory while inhibiting said editing memory to prevent storage of data transferred thereto from said intermediate memory, third logic means for actuating said editing memory to receive data from an external source through said input-output means, fourth means responsive to transfer of said data block from said intermediate memory and to accumulation of complete data block in said editing memory to transfer a complete data block from said editing memory back to said principal memory through said intermediate memory, and means responsive to transfer of said data block to said principal memory to transfer the next unedited data block to said intermediate memory.

2. A data processor as defined in claim 1 wherein said first logic means includes first means responsive to an external command for transferring data from said intermediate memory continuously until halted bY a further external command, and second means responsive to another external command to transfer a single character code word From said intermediate memory.

3. A data processor as defined in claim 1 wherein said second logic means includes means responsive to a first external command to transfer a single character code word from said intermediate memory, and means responsive to other external commands for transferring data continuously from said intermediate memory, means to identify certain characters being transferred from said intermediate memory, and means responsive to particular external commands to halt transfer of data from said intermediate memory upon identification of an associated one of said certain characters.

4. A data processor as defined in claim 3 further including buffer means coupling said intermediate memory and said editing memory, and adapted to receive data one bit at a time, and wherein said identifying means comprises a Read only memory for storing the code words for said certain characters, data comparison means coupled to said read only memory and to said buffer means, and operative to provide an indication whenever dat coincidence is detected, means for scanning the addresses of said read only memory at a rate substantially exceeding the input bit rate to said buffer, and means responsive to a coincidence indication to identify the particular read only memory address for which said coincidence occurred.

5. A data processor as defined in claim 1 further including fifth logic means responsive to an external command and to incoming data from said input-output means to store a search reference responsive to completion of storage of said means responsive reference code to initiate continuous transfer of data from said intermediate memory, and identification means for comparing the data being transferred from said intermediate memory and for halting said transfer upon recognition of said reference code.

6. A data processor as defined In claim 1 wherein said fourth logic means includes means responsive to transfer of a complete data block from said intermediate memory and accumulation of less than a complete data block in said editing memory for transferring the next unedited data block from said principal memory to said intermediate memory.

7. A data processor as defined in claim 1 wherein a plurality of data blocks comprising a complete message carries a particular terminal code word and wherein said fourth logic means includes means responsive to the entry of said terminl code word into said editing memory to transfer all data in said editing memory to said principal memory through said intermediate memory.

8. A data processor as defined in claim 1 including adjusting means for establishing a printout line length format, means for counting the number of characters stored in the editing memory since the end of a previous line and to provide an indication when a predetermined number has been counted, means for identifying first and second character code words being transferred out of said intermediate memory, means for generating the code words for said first and second characters, means responsive to identification of said first character in the absence of said predetermined count indication to suppress entry of said first character in said editing memory and to actuate said generating means to enter the code word for the second character into the editing memory, and means responsive to identification of said second character in the presence of said predetermined count indication to suppress entry of said second characters in said editing memory and to actuate said generating means to enter the code words for the first character into the editIng memory.

9. A data processor as defined in claim 8 further including means responsive to identification of either said first or said second characters to suppress operation of said adjusting means for the immediately following character transferred from saId intermediate memory.

10. A data processor as defined in claim 8 wherein said means for identifying said first and second character code words includes buffer means coupling said intermediate memory to said editing memory, and operable to received data one bit at a time, a read only memory containing the code words for said first and second characters, data comparison means coupled to said read only memory and said buffer and operative to provide an indication whenever data coincidence is detected, means for scanning the addresses of Said read only memory to render accessible to said data comparison means all the data stored in said read only memory, said scanning occurring at a rate substantial'y exceeding the input bit rate for said buffer, and means responsive to said coincidence indication to identify the particular read only memory address for which coincidence occurred.

11. A data processor as defined in claim 10 wherein said generating means comprises said read only memory and the addressing means therefor, the latter being actuated when one ofsaid first or second characters is to be generated, and also including logic means responsive to generation of said first or second character as required to halt the operation of said addressing means.

12. A data processor as defined in claim 1 further including a read only memory for storing code words for a plurality of characters and addressing means for said read only memory comprising counting means having a rest state and a plurality of active states.

13. A data processor as defined in claim 12 including buffer means, means for coupling said buffer means to the input or the output of said intermediate memory, switching means for coupling the output of said read only memory to the input of said buffer means, and means for entering a code word from said read only memory into said buffer means comprising logic means responsive to a command to actuate said addressing means, and means responsive to a particular address being reached for actuating said switching means and said buffer means to receive in the latter, the read only memory output.

14. A data processor as defined in claim 1 wherein said editing operation control means includes means for establishing a sequence of editing modes, a first mode being established responsive to an external command, said control means being responsive to establishment of said first mode to transfer said block of data to said intermediate memory from said principal memory, means responsive to transfer a complete block of data to said intermediate memory for establishing a second editing mode, said control means being responsive to establishment of said second mode and to the various external commands to transfer data out of said intermediate memory, said fourth logic means being operative to establish a third editing mode during which data is returned to said intermediate memory, followed by a fourth mode during which data is transferred from said intermediate memory to said principal memory, and responsive to completion of said fourth mode or to transfer of a complete data block from said intermediate memory, and accumulation of less than a complete data block in said editing memory to return said system to said first editing mode.

15. A data processor as defined in claim 14 Wherein a plurality of data blocks comprising a complete message carries a particular terminal code word, and wherein said fourth logic means includes means for sensing said terminal code word, as it enters said ediing memory when said system is operating in said second editing mode and responsive thereto to transfer said system to said third mode, and thereafter to cycle said system between modes three and four, means for sensing when all data in said editing memory has been transferred to said intermediate memory, and for terminating editing operation At the end of the mode four state following such transfer.

16. A data processor as defined in claim 14 wherein said principal memory includes a tape transport, a playback head and a record head disposed upstream of said playback head, wherein data is stored in said principal memory with gaps separating successive data blocks, and including means responsive to entry of the system into editing operation to reverse said tape transport until the tape Is positioned with the playback head at the beginning of the first data block to be edited, and for thereafter establishing the system in said first editing mode.

17. A data processor as defined in claim 16 including means responsive to termination of editing operation and immediate reestablishment thereof with no intervening operation to inhibit the tape reversal prior to establishment of said first editing mode.

18. A data processor as defined in claim 14 wherein said principal memory includes a tape transport, and playback and record heads, and including means responsive to entry of the system into said second editing mode to reverse said tape transport until said tape is positioned with said record head at the beginning of the data block transferred to the intermediate memory during the immediately previous edit mode one.

19. A data processor as defined in claim 14 wherein said input/output means includes buffer means coupling said intermediate memory to said edlting memory, and means for actuating said buffer means to receive and emit data on a bit by bit basis, and wherein said intermediate memory and said editing memory are each random access memories and each include addressing means comprising counters for rendering accessible the memory sites in a predetermined order for data storage and retrieval.

20. A data processor as defined in claim 19 including data transfer clock means including first means for generating control pulses in groups equal in number to the number of bits in a code word, and second means for generating a continuous succession of control pulses, and means for operating said intermediate memory, said buffer, and said editing memory in response to said groups of control pulses during edit mode two, and for operating said intermediate and editing memories in response to said succession of control pulses during the other edit modes.

21. A data processor as defined in claim 20 including means for inhibiting operation of said editing memory for the first group of control pulses generated during each edit mode two to allow data from the intermediate memory to fill the buffer.

22. A data processor as defined in claim 20 including means for providing data from an external source during edit mode two to the input of said buffer, means responsive to the provision of a first character code word from said external source for inhibiting data transfer to said editing memory until said first code word has been entered in said buffer, means responsive to entry of an external character code word to actuate said buffer and said editing memory in response to a group of control pulses, and logic means responsive to a first group of control pulses for external data entry following an editing operation other than external entry for reducing the count of the addressing means for said intermediate memory for each pulse of said group, and for thereafter inhibiting operation of said intermediate memory until external data entry ceases.

23. A data processor as defined in claim 20 including means for generating a signal in response to the addressing means for the interemdiate memory corresponding to the last bit of a data block, means responsive to said signal during edit mode two for operating said buffer and said editing memory in response to an additional group of control pulses, and means responsive to the end of said additional group of control pulses for transferring the system to the third edit mode.

24. A data processor as defined in claim 20 wherein said first logic means is operative only during edit mode two, and includes means responsive to a first external command to operate said intermediate memory, said buffer, and editing memory in response to successive groups of control pulses, and responsive to a second external command to terminate said operationm and means responsive to termination of an edit mode two during such continuous operation for reinitiating said continuous during the next edit mode two in the editing cycle.

25. A data processor as defined in claim 24 wherein said first logic means further includes means responsive to a plurality of additional external commands to operate said intermediate memory and said buffer in response to said groups of control pulses but to inhibit operation of said editing memory, said means being responsive to a first of said additional commands to operate said intermediate memory and said buffer but to inhibit said editing memory for one group of said control pulses, and additional means coupled to said buffer for indicating the presence of certain character code words therein, said first logic means being responsive to others of said external commands to operate said intermediate memory and said buffer and to inhibit said editing memory in response to successions of groups of control pulses until the presence of respective ones of said character code words has been detected, and for one additional group of control pulses thereafter.

26. A data processor as defined in claim 25 further including means responsive to termination of an edit mode two during one of the aforesaid operations for reinitiating said operation during the next edit mode two in the edit cycle.

27. A data processor as defined in claim 26 wherein said additional means comprises a read only memory containing said certain character code words in respective memory sites, comparison means coupled to the outputs of said buffer and said read only memory, means for addressing said memory sites in succession, means for operating said addressing means at a rapid rate in relation to the repetition rate of said control pulses, means to generate an indication of a match between the data in said buffer and in said read only memory, and means responsive to said match indication to identify the read only memory address for which said match occurred.

28. A data processor as defined in claim 24 wherein said first logic means further includes means responsive to another external command to operate said intermediate memory, said buffer and said editing memory for one group of control pulses.

29. A data processor as defined in claim 19 further including means for entering data from an external source into said buffer, special memory means having its input connected to said buffer, means responsive to a special external command for entering said external data into said special memory, means responsive to entry of a desired number of character code words in said special memory during edit mode two for initiating continuous transfer of data from said intermediate memory through said buffer to said editing memory, and for continuing said transfer through successive entries of the system into edit mode two, comparison means coupled to said special memory and said buffer and responsive to a match between the data therein to generate a control signal, and means responsive to said control signal to advance said editing memory, said buffer, and said intermediate memory to transfer one additional character code word to said editing memory.

30. A data processor as defined in claim 29 including means for inhibiting operation of said editing memory for the first character code word following initiation of said continuous data transfer.

31. A data processor as defined in claim 20 wherein said editing memory is comprised of a plurality of bit storage sites and addressing means for rendering said sites accessible in sequence for data storage, contents counting means comprising an up down counter, means for advancing said up down counter during edit mode two, and means for reducing the count of said up down counter during edit mode three.

32. A data processor ad defined in claim 31 further including first and second count memories connected to said addressing means for said editing memory, means reponsive to the end of an edit mode two for storing the address of said editing memory site last accessed in said first count memory, means responsive to the end of an edit mode three for storing the address of said editing memory site last accessed in said second count memory, means responsive to the beginning of an edit mode two to set the editing memory addressing means to the address stored in said first count memory, and means responsive to the beginning of an edit mode three to set the editing memory addressing means to the address stored in said second count memory.

33. Processing means for digital data in the form of multibit code word comprising: a principal memory having a magnetic tape transport for carrying a magnetic tape as a memory medium, playback and recording heads; an intermediate memory for storing a block of data comprised of a plurality of code words; input/output means including a buffer for storing a predetermined small number of code words, means for selectively coupling the input of said buffer to the output of said intermediate memory or to an external data source; special memory means having a capacity equal to those of the buffer; comparison means connected to the outputs of said buffer and said special memory; and search control logic means including means responsive to an external command to connect said buffer to said external source, means responsive to entry of data to said buffer from said external source to store said data in said special memory, means responsive to storage of said data in said special memory to initiate operation of said tape transport and said playback head to load a data block from said tape to said intermediate memory, means responsive to loading of said intermediate Memory to couple said buffer to said intermediate memory and to transfer data to said buffer, means responsive to a match between the data in said buffer and that in said special memory to terminate data transfer to said intermediate memory, and means responsive to transfer of an entire data block from said intermediate memory without a data match to operate said tape transport and said playback head to transfer another block of data to said intermediate memory.

34. A data processor as defined in claim 33 wherein said intermediate memory comprises a random access memory unit and addressing means comprising an up-down counter, said memory being responsive to a particular count to render accessible a corresponding memory site, for data storage on retrieval, means for setting said counter at a predetermined initial count, and means for advancing said counter from said initial count, and for actuating said random access memory to store the data output of said tape on a bit by bit basis in successive memory sites, and wherein said means for transferring data to said buffer from said intermediate memory comprises means to set said counter to said initial count, and means for advancing said counter, and for operating said random access memory and said buffer to enter the contents of each memory site in turn into said buffer.

35. A data processor as defined in claim 34 wherein said tape transport is run so the tape moves in the same direction as when the data thereon was originally recorded, and further including means responsive to said external command and to another external command to operate said tape transport so the tape runs in the direction opposite to that when the data was recorded.

36. A data processor as defined in claim 35 further including means responsive to said other external command to cause said up-down counter to be set to a count equal to the number of bits in a data block and to operate said counter to reduce the count therein when said random access memory receives data from said tape.

37. A data processor as defined in claim 36 including means responsive to a data match during an operation initiated by both of said external commands to initiate operation of said tape transport in said normal direction, and storage in said random access memory beginning at the memory site corresponding to the initial count of said counter, and for continuing such operation until a match again occurs between the data in said buffer and said special memory.

38. A data processor as defined in claim 37 wherein said intermediate memory comprises two separate random access memories and associated addressing means, and further including cycling means operative to permit transfer of data from one of said random access memories to said buffer while data from said tape is transferred to the other of said random access memories.

* * * * *

PO-1050
(5/69)

UNITED STATES PATENT OFFICE
CERTIFICATE OF CORRECTION

Patent No. 3,764,986 Dated October 9, 1973

Inventor(s) Charles F. Spademan and Joseph P. Marsalka

It is certified that error appears in the above-identified patent and that said Letters Patent are hereby corrected as shown below:

Column 3, line 8, "or" should read --for--; line 18, "processes" should read --processed--.

Column 4, line 65, "uit" should read --unit--.

Column 5, line 25, "nd" should read --and--.

Column 6, lines 23-24, "play-back" should read --"play-back"-- line 64, "38" should read --3B--.

Column 8, line 62, "previous" should read --a previous--.

Column 11, line 67, "inter-mediate" should read --intermediate

Column 12, lines 28 and 29 should be underscored; lin4 50, "(a-(h)" should read --(a)-(h)--.

Column 15, line 56, "provided" should read --is provided--.

Column 17, line 15, "of" second occurrence should read --for--

Column 20, line 18, "rests" should read --resets--; line 61, "Q" should read --$\overline{Q}$--.

Column 24, line 47, "Q" should read --$\overline{Q}$--; line 66, "110" should read --1110--.

Column 26, line 20, "1146" should read --1156--.

Column 28, line 18, "parellel" should read --parallel--.

Column 31, line 40, "opeation" should read --operation--; line 50, "compries" should read --comprises--; line 54, "lgoic" should read --logic--.

Column 32, line 33, "flip-flops" should read --flip-flop--.

Column 33, lines 8 and 15, "adn" should read --and--; line 37, "is in" should read --in--.

Column 34, line 45, "sysetm" should read --system--.

Column 35, line 63, "memroy" should read --memory--.

Column 38, line 35, "1563" should read --1564--; line 42, "occuring" should read --occurring--; line 52, "remander" should read --remainder--.

PO-1050
(5/69)

UNITED STATES PATENT OFFICE

CERTIFICATE OF CORRECTION

Patent No. 3,764,986 Dated October 9, 1973

Inventor(s) Charles F. Spademan and Joseph P. Marsalka

It is certified that error appears in the above-identified patent and that said Letters Patent are hereby corrected as shown below:

Column 39, line 35, "1578," should read --1578.--
Column 40, line 12, "14114" should read --15114--.
Column 41, line 51, "is" should read --is designated--.
Column 42, line 59, "pemitted" should read --permitted--.
Column 43, line 33, and line 34, "The resulting low level of the 0 output of flip-flop 880" should be canceled; line 50, "flip-fłoP" should read --flip-flop--.
Column 44, line 17, "538" should read --538)--.
Column 48, line 34, "and" first occurrence should read --of--.
Column 49, line 19, "or" should read --on--.
Column 51, line 32, "register" should read --registers--; line 36, "unitl" should read --until--; line 42, "SERACH" should read --SEARCH--; line 44, "0" should read --0 output--.
Column 52, line 51, "assocaited" should read --associated--; line 64, "plyback" should read --playback--.
Column 53, line 11, "flip-floP" should read --flip-flop--; line 26, "forWard" should read --forward--; line 27, "soYght" should read --sought--; line 29, "unsucessfuly" should read --unsuccessfully--; line 34, "the" second occurrence should read --and--; line 35, "sWitched" should read --switched--; line 51, "assureS" should read --assures--; line 52, "ocal" should read --local--.
Column 54, line 3, "fiP" should read --flip--; line 8, "1502" should read --1520--; line 10, "accessIble" should read --accessible--; line 32, "fliP-flop" should read --flip-flop--; line 42, "filip-flop" should read --flip-flop--; lines 45-46, "inverter 111" should read --inverter 1118--; line 50, "sys4em" should read --system--; line 66, "OR" should read --OR*--.

PO-1050
(5/69)

UNITED STATES PATENT OFFICE
CERTIFICATE OF CORRECTION

Patent No. 3,764,986 Dated October 9, 1973

Inventor(s) Charles F. Spademan and Joseph P. Marsalka

It is certified that error appears in the above-identified patent and that said Letters Patent are hereby corrected as shown below:

Column 55, line 3, "gate" should read --gates--; line 9, "signa'" should read --signal--; line 27, "pulse" should read --pulses--; line 29, "unit" should read --until--; line 57, "foR" should read --for--; line 66, "outut" should read --output--.

Column 56, line 16, "consequetly" should read --consequently--; line 31, "ene" should read --one--; line 51, "flip-flop" should read --flip-flop 548--; same line, cancel "either"; line 56, "signal" should read --signals--.

Column 57, line 19, "for" should read --is--; line 21, "revers" should read --reverse--; line 24, "Recallng tha" should read --Recalling that--; line 41, "inibts" should read --inhibits--; line 65, "hte" should read --the--.

Column 58, line 2, "signals" should read --signal--; line 14, "respectivley" should read --respectively--; line 17, "dre-" should read --de- --; line 22, "ASSOCAITED" should read --ASSOCIATED--; line 39, "comPleting" should read --completing--; line 40, "tha" should read --that--; line 63, "'ine" should read --line--.

Column 59, line 40, "increased" should read --increases--; line 45, "167" should read --1678--; line 46, "1678" should read --a--; line 49, "'ow" should read --low--; line 65, "scannIng" should read --scanning--; line 67, "indIcating" should read --indicating--.

Column 60, line 16, "settinG" should read --setting--; line 28, "At" should read --at--; line 29, "ensuinG" should read --ensuing--; line 5[illegible], "less and" should read --less than--; line 65, "casues" should read --causes--.

Column 61, line 2, "howeVer" should read --however--; line 3, "In" should read --in--; line 8, "as" should read --was--;

UNITED STATES PATENT OFFICE

CERTIFICATE OF CORRECTION

Patent No. 3,764,986 Dated October 9, 1973

Inventor(s) Charles F. Spademan and Joseph P. Marsalka

It is certified that error appears in the above-identified patent and that said Letters Patent are hereby corrected as shown below:

Column 61, line 9, "p'ayback" should read --playback--; line 16, "inut" should read --input--; line 55, "1438" should read --1438 and--; last line, "producea" should read --produce a--.

Column 62, line 19, "fer" should read --for--; line 24, "118" should read --1118--; line 26, "successIvely" should read --successively--; line 39, "produciOg" should read --producing--; line 47, "HAND" should read --NAND--.

Column 63, line 10, "three" should read --Three--; line 12, "each" should read --such--' line 19, "fliP-flop" should read --flip-flop--; line 22, "136" should read --1364--; line 29, "da4a" should read --data--; line 31, "Is" should read --is--; line 36, "repeted" should read --repeated--.

Column 64, line 27, "I.e." should read --i.e.--; line 46, "TWo" should read --Two--; line 54, "initlate" should read --initiate--; line 66, "or" should read --for--; line 67, "Whi'e" should read --While--.

Column 65, line 15, claim 1, "A" should read --a--; lines 33-34, claim 1, "accomulation" should read --accumulation--; line 43, claim 2, "bY" should read --by--; line 45, claim 2, "From" should read --from--; line 62, claim 4, "Read" should read --read--; line 66, claim 4, "dat" should read --data--.

Column 66, line 8, claim 5, "reference" should read --reference code, means--; line 9, claim 5, "said means responsive" should read --said--; line 15, claim 6, "In" should read --in--; line 26, claim 7, "terminl" should read --terminal--; line 50, claim 8, "editIng" should read --editing--; line 61, claim 10, "received" should read --receive--; line 66, claim 10, "Said" should read --said--.

Column 67, line 1, claim 10, "substantialy" should read --substantially--; line 52, claim 15, "Wherein" should read --wherein--; line 64, claim 15, "At" should read --at--.

PO-1050
(5/69)

UNITED STATES PATENT OFFICE

CERTIFICATE OF CORRECTION

Patent No. 3,764,986 Dated October 9, 1973

Inventor(s) Charles F. Spademan and Joseph P. Marsalka

It is certified that error appears in the above-identified patent and that said Letters Patent are hereby corrected as shown below:

Column 68, line 5, claim 16, "Is" should read --is--; line 24, claim 19, "edIting" should read --editing--; line 66, claim 23, "interemdiate" should read --intermediate--.

Column 69, line 13, claim 24, "operationm" should read --operation--.

Column 70, line 22, claim 32, "ad" should read --as--; line 38, claim 33, "word" should read --words--.

Column 71, line 6, claim 34, "on" should read --or--.

Signed and sealed this 29th day of October 1974.

(SEAL)
Attest:

McCOY M. GIBSON JR.
Attesting Officer

C. MARSHALL DANN
Commissioner of Patents